United States Patent
Xu et al.

(10) Patent No.: US 12,170,836 B2
(45) Date of Patent: Dec. 17, 2024

(54) DEVICE IDENTIFICATION METHOD AND RELATED APPARATUS

(71) Applicant: Huawei Technologies Co., Ltd., Shenzhen (CN)

(72) Inventors: Jie Xu, Shanghai (CN); Jiayu Long, Shenzhen (CN); Siju Wu, Shenzhen (CN); Ke Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 41 days.

(21) Appl. No.: 18/164,170

(22) Filed: Feb. 3, 2023

(65) Prior Publication Data

US 2023/0188832 A1    Jun. 15, 2023

Related U.S. Application Data

(63) Continuation of application No. PCT/CN2021/110906, filed on Aug. 5, 2021.

(30) Foreign Application Priority Data

Aug. 5, 2020    (CN) .......................... 202010779841.2
Aug. 5, 2020    (CN) .......................... 202010782270.8
Oct. 29, 2020    (CN) .......................... 202011183311.8

(51) Int. Cl.
| | |
|---|---|
| H04N 23/63 | (2023.01) |
| G06F 3/04817 | (2022.01) |
| G06F 3/0488 | (2022.01) |
| G06T 19/00 | (2011.01) |

(52) U.S. Cl.
CPC ....... H04N 23/632 (2023.01); G06F 3/04817 (2013.01); G06F 3/0488 (2013.01); G06T 19/006 (2013.01)

(58) Field of Classification Search
CPC . H04N 23/632; G06F 3/04817; G06F 3/0488; G06T 19/006; H04M 2250/52; H04M 1/72412; H04W 4/70; H04W 4/80; H04W 8/005; H04W 76/14
See application file for complete search history.

(56) References Cited

U.S. PATENT DOCUMENTS

| | | | | |
|---|---|---|---|---|
| 6,037,936 | A * | 3/2000 | Ellenby .................. | G06T 15/10 715/764 |
| 11,321,411 | B1 * | 5/2022 | Luan .................. | G06Q 30/0282 |
| 2021/0103366 | A1 * | 4/2021 | Behzadi .................. | H04L 67/06 |
| 2023/0005198 | A1 * | 1/2023 | Lotto .................. | G06Q 10/109 |

* cited by examiner

*Primary Examiner* — Mekonnen D Dagnew
(74) *Attorney, Agent, or Firm* — Conley Rose, P.C.

(57) ABSTRACT

A device identification method includes a first electronic device that receives a first operation, displays a first interface, and starts a camera, where the first interface includes a preview image captured by the camera, and a second electronic device is included in the preview image; the first electronic device determines a second operation is related to the second electronic device in the preview image according to an image recognition technology and a wireless positioning technology; and the first electronic device outputs a second interface when the first electronic device detects the second operation by a user, where the second interface includes one or more controls for controlling the second electronic device such that the second electronic device is presented in real time in an augmented reality display manner.

20 Claims, 66 Drawing Sheets

Communications system 10

Receiving device (Matebook)

DEVICE IDENTIFICATION METHOD AND RELATED APPARATUS

CROSS-REFERENCE TO RELATED APPLICATIONS

This is a continuation of International Patent Application No. PCT/CN2021/110906 filed on Aug. 5, 2021, which claims priority to Chinese Patent Application No. 202010779841.2 filed on Aug. 5, 2020, Chinese Patent Application No. 202010782270.8 filed on Aug. 5, 2020, and Chinese Patent Application No. 202011183311.8 filed on Oct. 29, 2020. All of the aforementioned patent applications are hereby incorporated by reference in their entireties.

TECHNICAL FIELD

This disclosure relates to the field of electronic technologies, and in particular, to a device identification method and a related apparatus.

BACKGROUND

With development of technologies, smart interconnection devices are increasingly popular. A relatively large quantity of users has a plurality of electronic devices, such as a smartphone, a computer, a smart television (TV), a tablet, and a smart sound box. There may also be other electronic devices, such as a smart audio and video device, a router/WI-FI box, a smart cleaning device, a smart kitchen appliance, and a smart lighting system, in the home.

When the user needs to select one or more specific devices for interaction (for example, control, pairing, data transmission, and projection), the user may find and select a target device in the plurality of devices by using a menu/list, a map, near-field communication (NFC), or the like. As a result, user operations are relatively complicated.

SUMMARY

Embodiments of this disclosure provide a device identification method and a related apparatus, to intuitively display identity information of a nearby device by using a simple operation and provide an interaction path between devices, thereby implementing coordination control between a plurality of devices and effectively improving user experience.

It should be noted that, in embodiments provided in this disclosure, there may be a plurality of possible implementations for an execution sequence of steps, and some or all of the steps may be performed sequentially or in parallel.

According to a first aspect, this disclosure provides a device identification method, applied to a first electronic device having a camera. The method includes the following. The first electronic device receives a first operation, the first electronic device displays a first interface in response to the first operation, where the first interface includes a preview image captured by the camera, and the preview image includes a representation of a second electronic device, the first electronic device obtains first location information of the second electronic device relative to the first electronic device, the first electronic device determines a display location of a first label in the preview image based on the first location information and a display area of the second electronic device in the preview image, and displays the first label at the display location, where the first label is used to identify the second electronic device, the first electronic device receives a second operation for the first label, and the first electronic device displays a second interface in response to the second operation, where the second interface includes one or more controls for controlling the second electronic device.

In embodiments of this disclosure, the first electronic device receives the first operation, displays the first interface, starts the camera, and displays, in the first interface in real time, an image captured by the camera. The first electronic device identifies, according to an image recognition technology, an electronic device in the image and a device type (for example, a sound box, a computer, or a tablet computer) of the electronic device, for example, the second electronic device. In addition, the first electronic device obtains location information of the second electronic device relative to the first electronic device according to a wireless positioning technology (for example, ultra-wideband (UWB) positioning, BLUETOOTH positioning, WI-FI positioning, or the like), where the location information includes one or more of a distance, a direction, or an angle. The first electronic device determines the display location of the first label of the second electronic device in the preview image based on the location information, where the first label is used to identify the second electronic device, for example, identify a device name or a device type of the second electronic device, and the display location of the first label is related to a display location of the second electronic device. When the first electronic device detects a user operation for the first label, the first electronic device outputs the second interface, where the second interface includes the one or more controls for controlling the second electronic device, and the second interface may be superimposed on the first interface for display, or the electronic device may jump from the first interface to display the second interface. In this disclosure, a correspondence between the first label and the second electronic device is presented in real time in an augmented reality display manner, and interaction between the first electronic device and the second electronic device is implemented by using the first label, thereby implementing coordination control between a plurality of devices, and improving user experience.

In some possible implementations, that the first electronic device obtains first location information of the second electronic device relative to the first electronic device further includes the following. The first electronic device broadcasts a detection request, where the detection request includes an identity of the first electronic device, and the first electronic device determines the first location information of the second electronic device and the first electronic device based on a detection response when the first electronic device receives the detection response sent by the second electronic device based on the detection request, where the detection response includes an identity of the second electronic device. In this manner, the first location information includes a relative location of the second electronic device relative to the first electronic device, for example, a distance, a direction, or an angle. The first electronic device may calculate a distance between the second electronic device and the first electronic device (the distance is equal to a time difference multiplied by a propagation speed of an electromagnetic wave) based on the time difference between time of sending the detection request and time of receiving the detection response. The first electronic device calculates an angle of arrival of the detection response based on the detection response, and then may determine an orientation angle of the second electronic device relative to the first electronic device.

Optionally, the detection response includes the identity of the second electronic device and the first location information. The first electronic device determines the first location information of the second electronic device and the first electronic device based on the detection response. Further, the second electronic device calculates a relative location of the second electronic device relative to the first electronic device based on the received detection request. The detection request includes sending time. The second electronic device determines a time difference based on the sending time and time at which the second electronic device receives the detection request, to calculate the distance between the second electronic device and the first electronic device. The second electronic device calculates an angle of arrival of the detection request based on the received detection request, and then may determine the orientation angle of the second electronic device relative to the first electronic device. The second electronic device sends the detection response to the first electronic device. The detection response includes the identity of the second electronic device and the first location information.

In some possible implementations, the display location of the first label in the preview image partially or completely overlaps the display area of the second electronic device in the preview image. The first label may be displayed in the display area of the second electronic device, may be displayed at an edge of the display area of the second electronic device, or may be displayed at a location close to the display area of the second electronic device.

In some possible implementations, the method further includes the following. The first electronic device obtains second location information of a third electronic device relative to the first electronic device, the first electronic device detects that the third electronic device is not included in the preview image, and determines, based on the second location information, that the third electronic device is in a viewfinder range of the camera, and the first electronic device determines a display location of a second label in the preview image based on the second location information, where the second label is used to indicate one or more pieces of the following information: identity information of the third electronic device, an obstruction of the third electronic device, and the second location information. In this manner, when the first electronic device detects that a relative location of the third electronic device is in the viewfinder range of the camera, but the preview image does not include an image of the third electronic device, the first electronic device determines that the third electronic device is blocked, and outputs the second label of the third electronic device, to indicate one or more of the identity information of the third electronic device, the obstruction, and a blocked location in the preview interface.

In some possible implementations, the method further includes the following. The first electronic device detects that the third electronic device is not included in the preview image, and determines, based on the second location information, that the third electronic device is not in the viewfinder range of the camera, and the first electronic device determines a display location of a third label in the preview image based on the second location information, where the third label is used to indicate one or more pieces of the following information: the identity information of the third electronic device and the second location information. In this manner, when the first electronic device detects that the relative location of the third electronic device is outside the viewfinder range of the camera, and the preview image does not include the image of the third electronic device, the first electronic device determines that the third electronic device is not in a viewfinder frame, and outputs the second label of the third electronic device, to indicate one or more of the identity information of the third electronic device and a relative location (a direction, an angle, a distance, or the like) relative to the first electronic device.

In some possible implementations, the preview image includes an image of a fourth electronic device, and after that the first electronic device displays a first interface, the method further includes the following. The first electronic device determines, based on the preview image, that a device type of the fourth electronic device is a first type, the first electronic device determines, in an electronic device associated with or bound to an account of the first electronic device, a first target device whose device type is the first type, and the first electronic device displays a fourth label, where the fourth label is used to indicate that the image of the fourth electronic device is associated with the first target device. In this manner, when the first electronic device cannot detect location information of the fourth electronic device, and the image of the fourth electronic device is in the preview image, the first electronic device identifies the device type of the fourth electronic device according to the image recognition technology, and detects whether a target device of the device type exists in devices that log in to a same account (for example, a HUAWEI account) as the first electronic device. If yes, the first electronic device considers that the target device is the fourth electronic device, and the first electronic device outputs the fourth label that identifies the target device.

In some possible implementations, the preview image includes an image of a fifth electronic device, and after that the first electronic device displays a first interface, the method further includes the following. The first electronic device determines, based on the preview image, that a device type of the fifth electronic device is a second type, the first electronic device obtains third location information of the first electronic device, where the first electronic device stores a correspondence between an electronic device and location information, the first electronic device determines, based on the correspondence and the third location information, a second target device whose device type is the first type, where location information of the target device is the same as the third location information, and the first electronic device displays a fifth label, where the fifth label is used to indicate that the image of the fifth electronic device is associated with the second target device. In this manner, when the first electronic device cannot detect location information of the fifth electronic device, and the image of the fifth electronic device is in the preview image, because the first electronic device stores a correspondence between an electronic device and location information (for example, a smart sound box and a living room, a smart desk lamp and a bedroom, a computer and a company, or the like), the first electronic device identifies a device type of the fifth electronic device according to the image recognition technology based on a current geographical location of the first electronic device, and then detects whether a target device of the device type exists in devices that are at a same geographical location as the first electronic device. If yes, the first electronic device considers that the target device is the fifth electronic device, and the first electronic device outputs the fifth label that identifies the target device.

In some possible implementations, the first user interface further includes a first icon, the first icon is associated with to-be-shared data, and the method further includes the following. The first electronic device receives a third operation, where the third operation is an operation for the first label and/or the first icon, and the first electronic device sends the to-be-shared data to the second electronic device in response to the third operation. The third operation includes but is not limited to a drag operation, a tap operation, or the like. A data sharing manner is provided, the second electronic device that needs to be shared is selected in the first interface, and the to-be-shared data is sent to the second electronic device. This simplifies user operations for data sharing, intuitively displays device information, and improves user experience.

In some possible implementations, before that the first electronic device receives a third operation, the method further includes the following. The first electronic device displays the first label in a first display form in the first interface based on data type of the to-be-shared data. The first label in the first display form is used to prompt a user that the second electronic device supports output of the to-be-shared data. The first display form may be highlighting (changing brightness, a color, or the like) a display area of the first label.

In some possible implementations, the preview image includes an image of a third electronic device and a third label, the third label is associated with the third electronic device, and the method further includes the following. The first electronic device receives a fourth operation, where the fourth operation is an operation for the first label and/or a third icon, and the first electronic device outputs a prompt message in response to the fourth operation, where the prompt message is used to prompt a user that the third electronic device does not support output of the to-be-shared data.

According to a second aspect, this disclosure provides an electronic device, including one or more processors and a memory. The memory includes computer instructions, and when the one or more processors invoke the computer instructions, the electronic device is enabled to perform the following operations: receiving a first operation, displaying a first interface in response to the first operation, where the first interface includes a preview image captured by a camera, and the preview image includes a first target device, obtaining first relative location information of the first target device, determining a display location of a first label in the preview image based on the first relative location information and a display location of the first target device in the preview image, where the first label is used to indicate identity information of the first target device, receiving a second operation for the first label, and displaying a second interface in response to the second operation, where the second interface includes one or more controls for controlling the first target device.

In embodiments of this disclosure, the electronic device receives an operation, displays an interface, starts the camera, and displays, in the interface in real time, an image captured by the camera. The electronic device identifies, according to an image recognition technology, an electronic device in the image and a device type (for example, a sound box, a computer, or a tablet computer) of the electronic device, for example, the first target device. In addition, the electronic device obtains location information of the first target device relative to the electronic device according to a wireless positioning technology (for example, UWB positioning, BLUETOOTH positioning, WI-FI positioning, or the like), where the location information includes one or more of a distance, a direction, or an angle. The electronic device determines a display location of a label of the first target device in the preview image based on the location information, where the label is used to identify the first target device, for example, identify a device name or a device type of the first target device, and the display location of the label is related to a display location of the first target device. When the electronic device detects a user operation for the label, the electronic device outputs a second interface, where the second interface includes the one or more controls for controlling the first target device, and the second interface may be superimposed on the interface for display, or the electronic device may jump from the interface to display the second interface. In this disclosure, a correspondence between the first label and the first target device is presented in the first interface of the electronic device in real time in an augmented reality display manner, and interaction between the electronic device and the first target device is implemented by using the first label, thereby implementing coordination control between a plurality of devices, and improving user experience.

In some possible implementations, when the one or more processors invoke the computer instructions, the electronic device is enabled to perform the operation of obtaining the first relative location information of the first target device, where the operation further includes broadcasting a detection request, where the detection request includes an identity of the electronic device, and determining the first relative location information of the first target device based on a detection response when the detection response sent by the first target device based on the detection request is received, where the detection response includes an identity of the first target device.

Optionally, the detection response includes the identity of the first target device and the first relative location information. The electronic device determines the first relative location information, such as, a distance, a direction, or an angle, of the first target device relative to the electronic device based on the detection response. Further, the first target device calculates a relative location of the first target device relative to the electronic device based on the received detection request. The detection request includes sending time. The first target device determines a time difference based on the sending time and time at which the first target device receives the detection request, to calculate the distance between the first target device and the first electronic device. The first target device calculates an angle of arrival of the detection request based on the received detection request, and then may determine the orientation angle of the first target device relative to the electronic device. The first target device sends the detection response to the electronic device. The detection response includes the identity of the first target device and the first relative location information.

In some possible implementations, the display location of the first label in the preview image partially or completely overlaps the display location of the first target device in the preview image. The first label may be displayed in the display area of the first target device, may be displayed at an edge of the display area of the first target device, or may be displayed at a location close to the display area of the first target device.

In some possible implementations, when the one or more processors invoke the computer instructions, the electronic device is enabled to perform the following operations: obtaining second relative location information of a second target device, detecting, by the electronic device, that the second target device is not included in the preview image, and determining, based on the second relative location information, that the second target device is in a viewfinder range of the camera, and determining, by the electronic device, a display location of a second label in the preview image based on the second relative location information, where the second label is used to indicate one or more pieces of the following information: identity information of the second target device, an obstruction of the second target device, and the second relative location information.

In some possible implementations, when the one or more processors invoke the computer instructions, the electronic device is enabled to perform the following operations: detecting, by the electronic device, that the second target device is not included in the preview image, and determining, based on the second relative location information, that the second target device is not in the viewfinder range of the camera, and determining, by the electronic device, a display location of a third label in the preview image based on the second relative location information, where the third label is used to indicate one or more pieces of the following information: the identity information of the second target device and the second relative location information.

In some possible implementations, the preview image includes an image of a third target device, and when the one or more processors invoke the computer instructions, after the electronic device is enabled to perform the operation of displaying the first interface, the electronic device is enabled to further perform the following operations: determining, based on the preview image, that a device type of the third target device is a first type, determining, in an electronic device associated with or bound to an account of the electronic device, identity information of a device whose device type is the first type, and displaying a fourth label, where the fourth label is used to indicate that the image of the third target device is associated with the identity information.

In some possible implementations, the preview image includes an image of a fourth target device, and when the one or more processors invoke the computer instructions, after the electronic device is enabled to perform the operation of displaying the first interface, the electronic device is enabled to further perform the following operations: determining, based on the preview image, that a device type of the fourth target device is a second type, obtaining location information of the electronic device, where the electronic device stores a correspondence between an electronic device and location information, determining, by the electronic device based on the correspondence and the third location information, identity information of a device whose device type is the first type, and displaying a fifth label, where the fifth label is used to indicate that the image of the fourth target device is associated with the identity information.

In some possible implementations, the first interface further includes a first icon, the first icon is associated with to-be-shared data, and when the one or more processors invoke the computer instructions, the electronic device is enabled to further perform the following operations: receiving a third operation, where the third operation is an operation for the first label and/or the first icon, and sending the to-be-shared data to the first target device in response to the third operation. The third operation includes but is not limited to a drag operation, a tap operation, or the like. A data sharing manner is provided, the first target device that needs to be shared is selected in the first interface, and the to-be-shared data is sent to the first target device. This simplifies user operations for data sharing, intuitively displays device information, and improves user experience.

In some possible implementations, when the one or more processors invoke the computer instructions, before the electronic device is enabled to perform the operation of receiving the third operation, the electronic device is enabled to further perform the following operation: displaying the first label in a first display form in the first interface based on data type of the to-be-shared data, where the first label in the first display form is used to prompt a user that the first target device supports output of the to-be-shared data. The first display form may be highlighting (changing brightness, a color, or the like) a display area of the first label.

In some possible implementations, the preview image includes an image of a second target device and a third label, the third label is associated with the second target device, and when the one or more processors invoke the computer instructions, the electronic device is enabled to further perform the following operations: receiving a fourth operation, where the fourth operation is an operation for the first label and/or a third icon, and outputting a prompt message in response to the fourth operation, where the prompt message is used to prompt a user that the second target device does not support output of the to-be-shared data.

According to a third aspect, this disclosure provides a photo sharing method, applied to a first electronic device. The method includes displaying a photographing preview interface of the first electronic device, where the photographing preview interface includes a thumbnail of a first photo and a preview image captured by a camera of the first electronic device, identifying a sixth electronic device included in the preview image, determining a relative location of the sixth electronic device relative to the first electronic device, displaying a label of the sixth electronic device in the preview image based on the identified sixth electronic device and the relative location, where the label is used to identify the sixth electronic device, receiving a fifth operation on the thumbnail of the first photo, in response to the fifth operation, moving the thumbnail of the first photo to a display area of the sixth electronic device that is identified by the label in the preview image, and sending the first photo to the sixth electronic device.

In embodiments of this disclosure, a camera application main interface that is displayed after a user taps an icon of a camera application may be referred to as a "photographing preview interface", and an image presented in the photographing preview interface may be referred to as a "preview picture" or a "preview image".

It should be understood that, in embodiments of this disclosure, the photographing preview interface may represent an interface including the preview image, a photographing shutter button, a local album icon, a camera switching icon, and the like. If displayed content in the interface changes, for example, an identified device label is displayed, the interface may still be referred to as the photographing preview interface. Details are not described again subsequently.

It should be noted that the preview image may be obtained by a front-facing camera or a rear-facing camera of a mobile phone. A camera that shoots a photo is not limited in embodiments of this disclosure. For example, a figure photo is obtained by the front-facing camera of the mobile phone. If the user needs to identify an electronic device by using the rear-facing camera, the user may tap a camera switching button to perform switching. Alternatively, the figure photo is obtained by the rear-facing camera of the mobile phone. If the user needs to identify an electronic device by using the front-facing camera, the user may tap the camera switching button to perform switching. This is not limited in embodiments of this disclosure.

In the foregoing implementation, the mobile phone may determine, in advance, an electronic device included in the preview image, and when the user enables a photo sharing function, the mobile phone may quickly display an identified electronic device name in an interface, thereby increasing a speed of identifying an object in the preview image by the mobile phone. For example, after the mobile phone identifies the sixth electronic device included in the current preview image, the user may drag, according to a requirement of the user, the thumbnail of the first photo to the to-be-shared sixth electronic device.

It should be understood that, for the foregoing implementation process, the mobile phone may detect and identify, in a plurality of different manners such as image detection, a three-dimensional (3D) scanning technology, and machine vision, another electronic device included in the preview image. The manner in which the mobile phone identifies another electronic device in the preview image is not limited in embodiments of this disclosure.

In a possible implementation, the thumbnail of the first photo may be the local album icon. For example, the local album icon displays a latest first photo taken by the user.

In another possible implementation, the thumbnail of the first photo may have a same format or display as the local album icon, and the thumbnail of the first photo is displayed over the photographing preview interface in a floating manner. With reference to the third aspect and the foregoing implementations, in some implementations of the third aspect, the method further includes receiving a sixth operation on the album icon, and in response to the sixth operation, displaying the thumbnail of the first photo over the photographing preview interface in a floating manner.

With reference to the third aspect and the foregoing implementations, in some implementations of the third aspect, the fifth operation is a drag operation on the thumbnail of the first photo, and the sixth operation is a touch and hold operation on the local album icon.

In the foregoing method, the touch and hold operation is used as an example to describe an operation in which the user touches and holds the local album icon to trigger a photo sharing process. It should be understood that in embodiments of this disclosure, the photo sharing process provided in embodiments of this disclosure may alternatively be triggered by using another preset operation, or the mobile phone may be triggered by using another preset operation to identify an electronic device in the preview image, for example, the preset operation is not limited to touching and holding the local album icon, double-tapping the local album icon, or drawing a fixed pattern in the photographing preview interface. This is not limited in embodiments of this disclosure.

With reference to the third aspect and the foregoing implementations, in some implementations of the third aspect, the label of the sixth electronic device is used to identify a name of the sixth electronic device, and/or the label of the sixth electronic device is used to identify a location of the sixth electronic device.

In embodiments of this disclosure, after identifying the sixth electronic device included in the preview image, the mobile phone may determine, based on a display location of the sixth electronic device in the current preview image, a location for displaying the label of the sixth electronic device. In a possible manner, the mobile phone may display the label of the sixth electronic device in an area in which the sixth electronic device is located in the preview image.

Optionally, the label of the sixth electronic device may be displayed in an area near a positioning apparatus of the sixth electronic device. Alternatively, the label of the sixth electronic device may be displayed in a blank area in the preview image, and does not block another object in the preview image.

The foregoing described icon display manner may mark an identified electronic device without blocking another object in the preview image. This does not affect visual and visual perception of the user, and improves visual experience of the user.

According to the foregoing method, in a photo shooting process, the user may enable, by using a preset operation, a device identification function and a positioning function of the mobile phone, and identify, with reference to the identification function and the positioning function of the mobile phone, another electronic device included in the preview image of the camera. The user may directly drag a to-be-shared photo to an area in which the other electronic device is located, to quickly share the photo with another surrounding electronic device. In this process, an operation procedure of sharing a photo is simplified, time of sharing the photo is shortened, and user experience is improved.

With reference to the third aspect, in some implementations of the third aspect, the first electronic device includes a first positioning chip, the sixth electronic device includes a second positioning chip, and the identifying a sixth electronic device included in the preview image, and determining a relative location of the sixth electronic device relative to the first electronic device includes identifying, based on the first positioning chip, the second positioning chip, and the preview image, the sixth electronic device included in the preview image, and determining the relative location of the sixth electronic device relative to the first electronic device. The first positioning chip includes at least one of a BLUETOOTH positioning chip and an UWB positioning chip, and the second positioning chip includes at least one of a BLUETOOTH positioning chip and an UWB positioning chip.

In embodiments of this disclosure, the mobile phone may identify another electronic device in the preview image by using a plurality of possible positioning technologies, and position a location of the other electronic device. Optionally, a positioning technology in embodiments of this disclosure may include one of technologies such as BLUETOOTH-based wireless sensing positioning, UWB sensing-based wireless sensing positioning, and computer vision-based positioning, or a combination of the foregoing listed plurality of positioning technologies, or more other positioning technologies. A manner of positioning another electronic device by the mobile phone is not limited in embodiments of this disclosure.

With reference to the third aspect and the foregoing implementations, in some implementations of the third aspect, the photographing preview interface further includes a photographing shutter button, and the method further includes receiving a seventh operation on the photographing shutter button, and shooting the first photo in response to the seventh operation.

Optionally, in the method, when the user takes a photo by using the camera application, the user may directly share a latest shot first photo with another device, or share a first photo with the latest date in a local album with another device.

With reference to the third aspect and the foregoing implementations, in some implementations of the third aspect, before the photographing preview interface displays the thumbnail of the first photo, the method further includes receiving an eighth operation, in response to the fourth operation, displaying a photo list in the photographing preview interface, where the photo list includes the first photo and a plurality of second photos, and date of the second photo is before data of the first photo, receiving a ninth operation, and in response to the fifth operation, selecting at least one second photo from the photo list. After the moving the thumbnail of the first photo to a display area of the sixth electronic device that is identified by the label in the preview image, the method further includes sending the first photo and the selected at least one second photo to the sixth electronic device.

With reference to the third aspect and the foregoing implementations, in some implementations of the third aspect, the eighth operation is a slide operation along a preset direction by using the local album icon as a start point, and the ninth operation is a tap operation.

According to the foregoing method, in the photo shooting process, the user may enable, by using the preset operation, the device identification function and the positioning function of the mobile phone, and identify, with reference to the identification function and the positioning function of the mobile phone, another electronic device included in the preview image of the camera. The user may select a plurality of to-be-shared photos, and directly drag the plurality of to-be-shared photos to an area in which the other electronic device is located, so as to quickly share the photos with another surrounding electronic device. In this process, an operation procedure of sharing a photo is simplified, time of sharing the photo is shortened, and user experience is improved.

In a possible case, the photos in the photo list may be arranged according to a photographing order of the user. For example, the first photo is a latest photo taken by the user, and photographing time of the second photo is earlier than photographing time of the first photo.

Alternatively, the photos in the photo list may be arranged in another possible arrangement order. For example, if it is detected that a photographing place is a company, a photo whose photographing place is the company may be displayed in the photo list. This is not limited in embodiments of this disclosure.

In a possible case, after the user triggers, by using a swipe-up operation, to display the photo list in the interface, the first photo in the photo list may be selected by default. If the user does not expect to share the first photo, the user may tap a selection box in a lower right corner of the first photo to cancel selection of the first photo. Likewise, if the user expects to share both the first photo and the at least one second photo, the user may tap a selection box in a lower right corner of each second photo to select a plurality of to-be-shared photos. Details are not described herein again.

Optionally, in embodiments of this disclosure, a process of sharing a plurality of photos provided in embodiments of this disclosure may be triggered by using another preset operation, or the mobile phone may be triggered by using another preset operation to identify an electronic device in the preview image, for example, the preset operation is not limited to selecting the local album icon and dragging it upward, double-tapping the local album icon, or drawing a fixed pattern in the photographing preview interface. This is not limited in embodiments of this disclosure.

With reference to the third aspect and the foregoing implementations, in some implementations of the third aspect, when the thumbnail of the first photo is moved to the display area of the sixth electronic device identified by the label, a display effect of the label of the sixth electronic device changes, where the display effect includes one or more of a color, a size, or an animation effect of the label of the sixth electronic device.

Further, the user may drag the thumbnail of the first photo to the location of the sixth electronic device and then release the thumbnail. The icon of the sixth electronic device may be presented in different colors, or display other dynamic effects such as a size change, jumping, and blinking, to remind the user to share the currently taken first photo with the sixth electronic device identified in the preview image.

Alternatively, in a process in which the user drags the thumbnail of the first photo, a reminder control may be further displayed in the preview image. For example, the reminder control may be an arrow or the like, where the arrow may be displayed statically, jumped, or flickered, to prompt the user to drag the thumbnail of the first photo to a location identified by the arrow, so as to implement the photo sharing function. A display manner of the reminder control is not limited in embodiments of this disclosure.

With reference to the third aspect and the foregoing implementations, in some implementations of the third aspect, when the sixth electronic device is blocked in the preview image, or when it is detected that the sixth electronic device is located outside a range corresponding to the preview image, the method further includes displaying prompt information in the photographing preview interface, where the prompt information is used to prompt the user of the location of the sixth electronic device, or the prompt information is used to prompt the user to adjust a location of the first electronic device, so that the sixth electronic device is displayed in the preview image of the first electronic device.

It should be noted that the mobile phone may communicate with another nearby electronic device in a plurality of possible manners such as BLUETOOTH and a WI-FI module. In this case, the mobile phone may sense a nearby electronic device. Alternatively, the mobile phone determines, by using a wireless positioning technology such as UWB, that there is another electronic device nearby, identifies a type and the like of the electronic device, and may display the type of the electronic device in the photographing preview interface. In embodiments of this disclosure, a communication interaction manner and a connection establishment manner between the mobile phone and another nearby electronic device are not limited.

According to the foregoing method, when the mobile phone identifies that there is another electronic device in the preview image and the electronic device is blocked by an obstruction, in a process of sharing a photo by the user, reminder information such as a text or an icon may be displayed in the photographing preview interface, to prompt the user of a location of the blocked electronic device, and the user may further quickly share the shot photo with the blocked electronic device. In this way, a possible way for the user to share a photo with the blocked electronic device is provided, and operation steps of sharing a photo by the user are simplified.

In a possible scenario, the mobile phone may identify, by using a wireless positioning technology, that there is a sixth electronic device nearby, and the sixth electronic device is not displayed in a current preview image of the mobile phone. For this scenario, in embodiments of this disclosure, reminder information may be further displayed in a photographing preview interface, to remind a user that the sixth electronic device exists in a specific orientation.

Optionally, in embodiments of this disclosure, in addition to a text reminder in a reminder window, an icon reminder may be further included. For example, in addition to the reminder window, the photographing preview interface of the mobile phone may further include an icon, such as a statically displayed arrow, a dynamically blinking arrow, or a jumped arrow, that marks a location of the blocked sixth electronic device. This is not limited in embodiments of this disclosure.

Alternatively, in another possible manner, the user may rotate a direction of the mobile phone based in the reminder information in the interface, so that the camera of the mobile phone may obtain the detected sixth electronic device, and display, in the preview image, the sixth electronic device with which the user is to share a photo, so that the shot photo can be quickly shared with another electronic device according to the method described above.

The mobile phone may identify, by using the wireless positioning technology, that there is another electronic device nearby, and if the electronic device is not displayed in a current preview image of the mobile phone, for this scenario, in embodiments of this disclosure, reminder information may be further displayed in a photographing preview interface, to remind a user that another electronic device exists in a specific orientation.

In conclusion, according to the photo sharing method provided in embodiments of this disclosure, in a process of taking a photo or running a camera application, the user may enable a device identification function and a positioning function of an electronic device by using a preset operation. In addition, another electronic device included in the preview image of the camera is identified based in the identification function and the positioning function of the electronic device. The user may select one or more to-be-shared photos by using a shortcut operation, and directly drag the one or more to-be-shared photos to an area in which the other electronic device is located, to quickly share the one or more photos with another surrounding electronic device. In addition, in embodiments of this disclosure, for a plurality of scenarios such as a scenario in which there is another blocked electronic device in the preview image, a user-friendly interaction interface is provided for the user, so that the user can share one or more photos by using a shortcut operation. In this process, an operation procedure of sharing a photo is simplified, time of sharing the photo is shortened, and user experience is improved.

According to a fourth aspect, a first electronic device is provided, including a processor and a memory. The memory stores one or more instructions, and when the one or more instructions are executed by the processor, the first electronic device is enabled to perform the following steps: displaying a photographing preview interface of the first electronic device, where the photographing preview interface includes a thumbnail of a first photo and a preview image captured by a camera of the first electronic device, identifying a sixth electronic device included in the preview image, determining a relative location of the sixth electronic device relative to the first electronic device, displaying a label of the sixth electronic device in the preview image based on the identified sixth electronic device and the relative location, where the label is used to identify the sixth electronic device, receiving a fifth operation on the thumbnail of the first photo, in response to the fifth operation, moving the thumbnail of the first photo to a display area of the sixth electronic device that is identified by the label in the preview image, and sending the first photo to the sixth electronic device.

With reference to the fourth aspect, in some implementations of the fourth aspect, the first electronic device includes a first positioning chip, the sixth electronic device includes a second positioning chip, and when the one or more instructions are executed by the processor, the first electronic device is enabled to perform the following steps: identifying, based on the first positioning chip, the second positioning chip, and the preview image, the sixth electronic device included in the preview image, and determining a relative location of the sixth electronic device relative to the first electronic device. The first positioning chip includes at least one of a BLUETOOTH positioning chip and an UWB positioning chip, and the second positioning chip includes at least one of a BLUETOOTH positioning chip and an UWB positioning chip.

With reference to the fourth aspect and the foregoing implementations, in some implementations of the fourth aspect, the photographing preview interface includes an album icon, and when the one or more instructions are executed by the processor, the first electronic device performs the following steps: receiving a sixth operation on the album icon, and in response to the sixth operation, displaying the thumbnail of the first photo over the photographing preview interface in a floating manner.

With reference to the fourth aspect and the foregoing implementations, in some implementations of the fourth aspect, the fifth operation is a drag operation on the thumbnail of the first photo, and the sixth operation is a touch and hold operation on a local album icon.

With reference to the fourth aspect and the foregoing implementations, in some implementations of the fourth aspect, the photographing preview interface further includes a photographing shutter button, and when the one or more instructions are executed by the processor, the first electronic device is enabled to perform the following steps: receiving a seventh operation on the photographing shutter button, and shooting the first photo in response to the seventh operation.

With reference to the fourth aspect and the foregoing implementations, in some implementations of the fourth aspect, when the one or more instructions are executed by the processor, the first electronic device is enabled to perform the following steps: receiving an eighth operation, in response to the fourth operation, displaying a photo list in the photographing preview interface, where the photo list includes the first photo and a plurality of second photos, and date of the second photo is before data of the first photo, receiving a ninth operation, and in response to the fifth operation, selecting at least one second photo from the photo list. After the moving the thumbnail of the first photo to a display area of the sixth electronic device that is identified by the label in the preview image, the first photo and the selected at least one second photo are sent to the sixth electronic device.

With reference to the fourth aspect and the foregoing implementations, in some implementations of the fourth aspect, the eighth operation is a slide operation along a preset direction by using the local album icon as a start point, and the ninth operation is a tap operation.

With reference to the fourth aspect and the foregoing implementations, in some implementations of the fourth aspect, the label of the sixth electronic device is used to identify a name of the sixth electronic device, and/or the label of the sixth electronic device is used to identify a location of the sixth electronic device.

With reference to the fourth aspect and the foregoing implementations, in some implementations of the fourth aspect, when the thumbnail of the first photo is moved to the display area of the sixth electronic device identified by the label, a display effect of the label of the sixth electronic device changes, where the display effect includes one or more of a color, a size, or an animation effect of the label of the sixth electronic device.

With reference to the fourth aspect and the foregoing implementations, in some implementations of the fourth aspect, when the sixth electronic device is blocked in the preview image, and when the one or more instructions are executed by the processor, the first electronic device is further configured to perform the following steps: displaying prompt information in the photographing preview interface, where the prompt information is used to prompt the user of the location of the sixth electronic device, or the prompt information is used to prompt the user to adjust a location of the first electronic device, so that the sixth electronic device is displayed in the preview image of the first electronic device.

According to a fifth aspect, an embodiment of this disclosure provides a computer storage medium, including computer instructions. When the computer instructions are run in an electronic device, the electronic device is enabled to perform the method according to any possible implementation of the foregoing aspects.

According to a sixth aspect, an embodiment of this disclosure provides a computer program product. When the computer program product is run on a computer, the computer is enabled to perform the method according to any possible implementation of the foregoing aspect.

DESCRIPTION OF EMBODIMENTS

Figure 1:
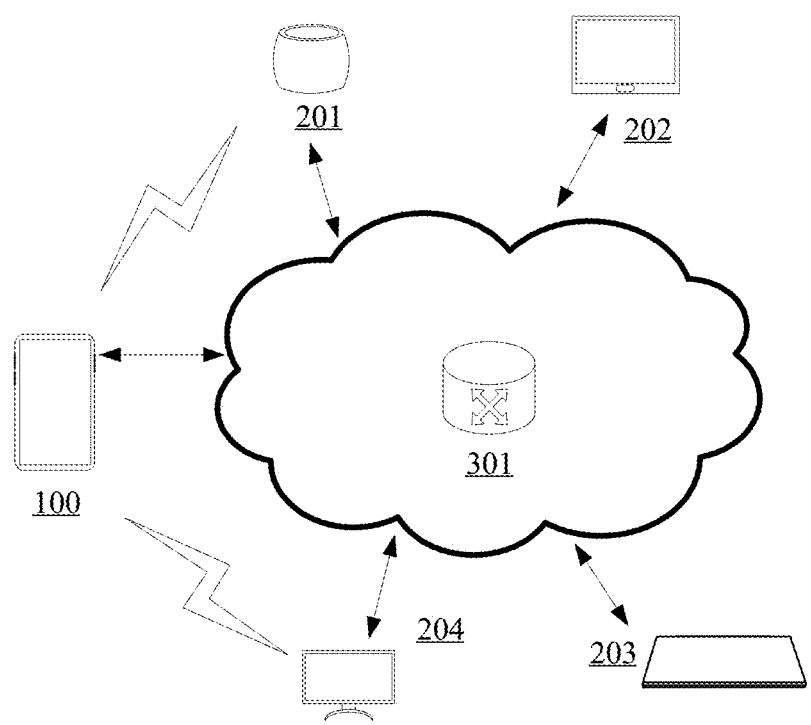
FIG. 1 is a schematic diagram of a system architecture according to an embodiment of this disclosure.

The following describes technical solutions in some embodiments of this disclosure with reference to accompanying drawings. In descriptions of embodiments of this disclosure, unless otherwise stated, "/" indicates "or". For example, A/B may indicate A or B. The term "and/or" in this specification merely describes an association relationship for describing associated objects, and indicates that three relationships may exist. For example, A and/or B may indicate the following three cases: only A exists, both A and B exist, and only B exists. In addition, in descriptions of embodiments of this disclosure, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this disclosure, unless otherwise specified, "a plurality of" means two or more than two.

An embodiment of this disclosure provides a device identification method based on augmented reality. Augmented reality (AR) is a method of superimposing virtual information and a real environment in a same image or same space by using computer graphics and visualization technologies, which integrates a 3D display technology, an interaction technology, a sensor technology, a computer vision technology, a multimedia technology, and the like.

In the provided method, an electronic device 100 enters a first interface, starts a camera, and displays, in the first interface in real time, an image captured by using the camera, and sends a detection request with a wireless positioning technology. The electronic device 100 determines a nearby device of the electronic device 100, a device name of the nearby device, a device type of the nearby device, and a physical distance and an angle between the nearby device and the electronic device 100 based on a received detection response for the detection request. The electronic device 100 performs image recognition on the image captured by the camera, and identifies an electronic device in the image and a device type (for example, a sound box, a computer, or a tablet computer) of the electronic device. The electronic device 100 determines a display area of the image of the nearby device in the first interface based on the physical distance and the angle between the nearby device and the electronic device 100. The electronic device displays a device icon in the first interface in real time in an augmented reality manner. The device icon may be used by the electronic device 100 to interact with the nearby device. For example, the electronic device 100 detects a user operation for the device icon, and in response to the user operation, the electronic device 100 outputs a control interface of the nearby device corresponding to the device icon. According to the method, interaction between the electronic device and the nearby device is implemented, and a correspondence between a device icon and a device is presented in real time in an augmented reality display manner, thereby improving user experience.

In this disclosure, the device icon may alternatively be referred to as a device label.

The following describes a communications system provided in an embodiment of this disclosure.

FIG. 1 is a schematic diagram of an example of a communications system 10 according to an embodiment of this disclosure. As shown in FIG. 1, the communications system 10 includes an electronic device 100, an electronic device 201, an electronic device 202, an electronic device 203, an electronic device 204, and the like. The electronic device 100 may assist a user in selecting and controlling various electronic devices (such as a sound box, a television, a refrigerator, and an air conditioner). In this disclosure, the electronic device 100 may alternatively be referred to as a first electronic device, and the electronic device 201 (or the electronic device 202, the electronic device 203, the electronic device 204, or the like) may alternatively be referred to as a second electronic device.

The electronic device (for example, the electronic device 100, the electronic device 201, the electronic device 202, the electronic device 203, or the electronic device 204) has an UWB communications module, and may further have one or more of a BLUETOOTH communications module, a wireless local area network (LAN) (WLAN) communications module, and a Global Positioning System (GPS) communications module. The electronic device 100 is used as an example. The electronic device 100 may detect and scan an electronic device (for example, the electronic device 201, the electronic device 202, the electronic device 203, or the electronic device 204) near the electronic device 100 by transmitting a signal through one or more of the UWB communications module, the BLUETOOTH communications module, the WLAN communications module, and the GPS communications module, so that the electronic device 100 can discover a nearby electronic device by using one or more NFC protocols such as UWB, BLUETOOTH, WLAN, and GPS, establish a wireless communication connection to the nearby electronic device, and transmit data to the nearby electronic device.

A type of an electronic device (for example, the electronic device 100, the electronic device 201, the electronic device 202, the electronic device 203, or the electronic device 204) is not limited in this disclosure. In some embodiments, the electronic device in embodiments of this disclosure may be a portable device such as a mobile phone, a wearable device (for example, a smart band), a tablet computer, a laptop, a handheld computer, a computer, an ultra-mobile personal computer (UMPC), a cellular phone, a personal digital assistant (PDA), or an augmented reality (AR)/virtual reality (VR) device. The electronic device may alternatively be a device such as a sound box, a television, a refrigerator, an air conditioner, a vehicle-mounted device, a printer, or a projector. An example embodiment of an electronic device includes but is not limited to an electronic device using iOS®, ANDROID®, Microsoft®, or another operating system.

In a possible implementation, the electronic device 100, the electronic device 201, the electronic device 202, the electronic device 203, and the electronic device 204 may directly communicate with each other. In a possible implementation, the electronic device 100, the electronic device 201, the electronic device 202, the electronic device 203, and the electronic device 204 may be connected to a LAN in a wired or WI-FI connection manner. For example, the electronic device 100, the electronic device 201, the electronic device 202, the electronic device 203, and the electronic device 204 are all connected to a same electronic device 301, and the electronic device 100, the electronic device 201, the electronic device 202, the electronic device 203, and the electronic device 204 may indirectly communicate with each other by using the electronic device 301. The electronic device 301 may be one of the electronic device 100, the electronic device 201, the electronic device 202, the electronic device 203, and the electronic device 204, or may be an additional third-party device, for example, a router, a cloud server, or a gateway. The cloud server may be a hardware server, or may be implanted in a virtualized environment. For example, the cloud server may be a virtual machine executed on a hardware server that may include one or more other virtual machines. The electronic device 301 may send data to the electronic device 100, the electronic device 201, the electronic device 202, the electronic device 203, and the electronic device 204 by using a network, or may receive data sent by the electronic device 100, the electronic device 201, the electronic device 202, the electronic device 203, and the electronic device 204.

The electronic device 301 may include a memory, a processor, and a transceiver. The memory may be configured to store a program related to UWB positioning. The memory may be further configured to store an orientation parameter that is of an electronic device (for example, the electronic device 201) and that is obtained by using a UWB positioning technology. The memory may be further configured to store a message exchanged by using the electronic device 301, and data and/or a configuration related to the electronic device 100 and the nearby device. The processor may be configured to, when obtaining orientation parameters of a plurality of nearby devices in the local area network, determine, based on the orientation parameters of the plurality of nearby devices, a target device that makes a response. The transceiver may be configured to communicate with an electronic device connected to the local area network. It should be noted that, in this embodiment of this disclosure, a plurality of nearby electronic devices may be connected to a same local area network, or may not be connected to a same local area network. This is not limited herein.

It may be understood that the structure shown in this embodiment does not constitute a specific limitation on the communications system 10. In some other embodiments of this disclosure, the communications system 10 may include more or fewer devices than those shown in the figure.

The following describes the electronic device 100 in embodiments of this disclosure.

Figure 2:
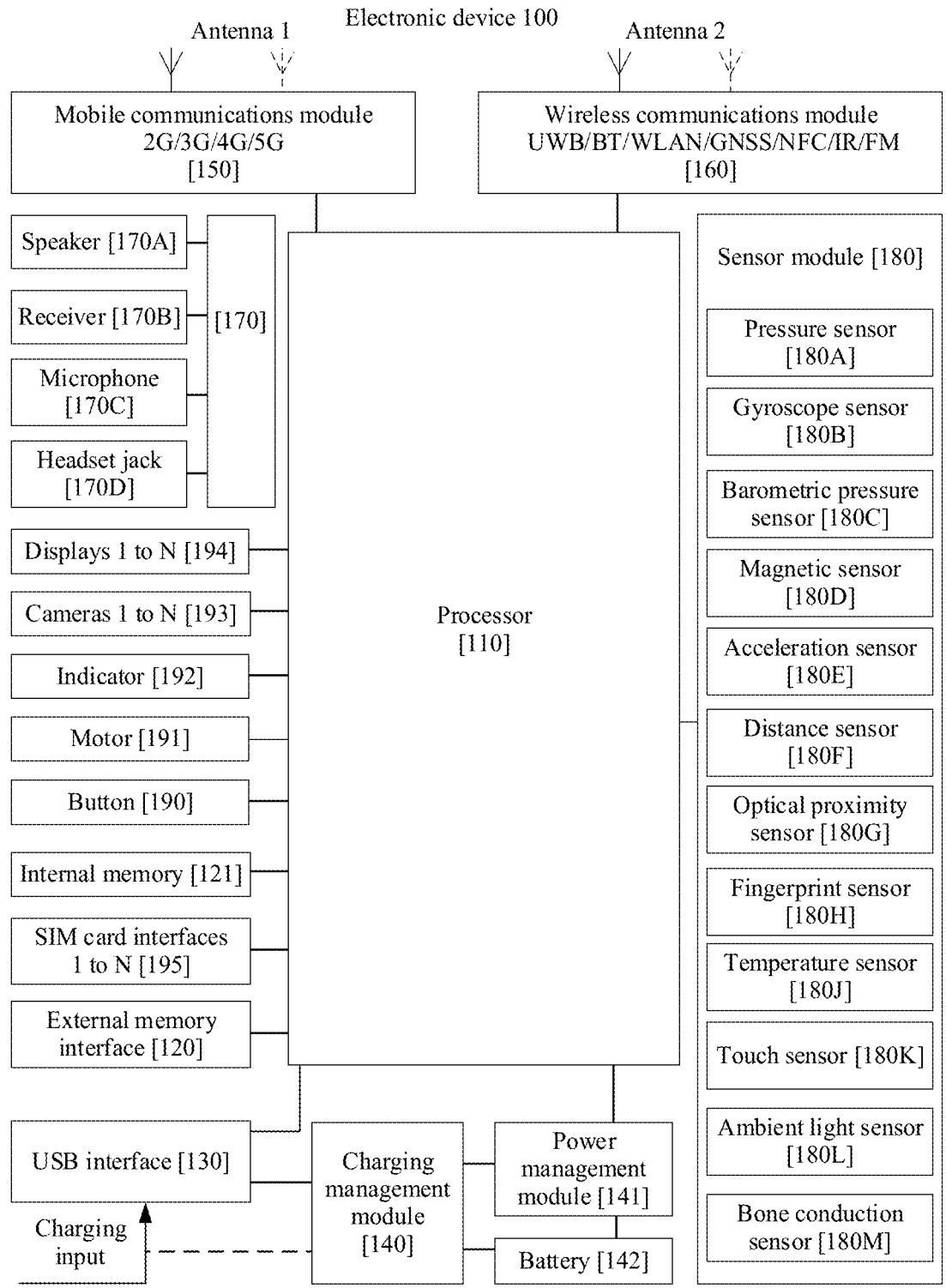
FIG. 2 is a schematic diagram of a structure of an electronic device according to an embodiment of this disclosure.

FIG. 2 is a schematic diagram of a structure of an example of the electronic device 100 according to an embodiment of this disclosure.

The electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure does not constitute a specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store an instruction or data that has been used or cyclically used by the processor 110. If the processor 110 needs to use the instruction or the data again, the processor may directly invoke the instruction or the data from the memory. This avoids repeated access and reduces waiting time of the processor 110, thereby improving system efficiency.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a USB interface, and/or the like.

The I2C interface is a two-way synchronous serial bus, including a serial data line (SDL) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a BLUETOOTH headset.

The PCM interface may also be used to perform audio communication, and sample, quantize, and code an analog signal. In some embodiments, the audio module 170 may be coupled to the wireless communications module 160 through the PCM bus interface. In some embodiments, the audio module 170 may also transmit an audio signal to the wireless communications module 160 through the PCM interface, to implement a function of answering a call through a BLUETOOTH headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a BLUETOOTH module in the wireless communications module 160 through the UART interface, to implement a BLUETOOTH function. In some embodiments, the audio module 170 may transmit an audio signal to the wireless communications module 160 through the UART interface, to implement a function of playing music through a BLUETOOTH headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 via the CSI, to implement a photographing function of the electronic device 100. The processor 110 communicates with the display 194 via the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be further a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset, to play audio through the headset. The interface may be further configured to connect to another electronic device such as an AR device.

It may be understood that an interface connection relationship between the modules shown in this embodiment of this disclosure is merely an example for description, and constitutes no limitation on the structure of the electronic device 100. In some other embodiments of this disclosure, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a solution applied to the electronic device 100 for wireless communication such as second generation (2G)/third generation (3G)/fourth generation (4G)/fifth generation (5G). The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in the same device as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that includes UWB, a WLAN (for example, a WI-FI network), BLUETOOTH (BT), a global navigation satellite system (GNSS), frequency modulation (FM), an NFC technology, an infrared (IR) technology, or the like and that is applied to the electronic device 100. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division CDMA (TD-CDMA), Long-Term Evolution (LTE), BT, a GNSS, a WLAN, NFC, FM, an IR technology, and/or the like. The GNSS may include a GPS, a global navigation satellite system (GLONASS), a BEIDOU navigation satellite system (BDS), a Quasi-Zenith satellite system (QZSS), and/or a satellite-based augmentation system (SBAS).

It should be understood that, in this embodiment of this disclosure, if a photo needs to be shared between two electronic devices, transmission may be performed in any one of the foregoing listed communication manners, for example, in a plurality of possible manners such as BLUETOOTH and a WI-FI module. This is not limited in this embodiment of this disclosure.

UWB wireless communication is a wireless personal area network communication technology with low power consumption and high-speed transmission. Different from a continuous carrier mode used by a common communication technology, the UWB uses a pulse signal to transmit data. UWB uses non-sine wave narrow pulse signals of nanosecond (ns) to picosecond (ps) levels to transmit data, and a time modulation technology can greatly increase a transmission rate. Because very short pulses are used, transmit power of a UWB device is only a few percent of that of a current continuous carrier system during high-speed communication. Therefore, the power consumption is low.

Compared with the conventional narrowband system, a UWB system has the advantages of strong penetration, low power consumption, good anti-multipath effect, high security, low system complexity, and high positioning accuracy. UWB can be used in wireless communication applications that require high-quality services, such as wireless personal area networks (WPANs), home network connections, and short-distance radars. UWB will become a technical means to solve a contradiction between a demand for high-speed Internet access in enterprises, homes, and public places and an increasingly crowded allocation of a frequency resource.

In this embodiment of this disclosure, the electronic device 100 may implement distance and receive signal strength indicator (RSSI) measurement by using one UWB antenna. The electronic device 100 may implement angle of arrival (AOA) measurement by using at least two UWB antennas.

In some embodiments, when the electronic device is in a standby state, a UWB communications module of the electronic device 100 may be in a power-on state.

In some embodiments, the electronic device 100 may implement distance and AOA measurement by using BLUETOOTH.

The electronic device 100 may implement a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, or the like. The display 194 includes a display panel. The display panel may use a liquid-crystal display (LCD), an organic light-emitting diode (LED) (OLED), an active-matrix OLED (AMOLED), a flexible LED (FLED), a mini LED, a micro LED, a micro OLED, a quantum dot LED (QLED), or the like. In some embodiments, the electronic device 100 may include one or N displays 194, where N is a positive integer greater than 1.

In some embodiments of this disclosure, the display 194 displays interface content currently output by a system. The electronic device 100 collaborates with modules such as the GPU, the display 194, and the application processor to display an image, an application interface, a button, an icon, a window, and the like on the display of the electronic device 100, so as to implement a display function of the electronic device. For example, the interface content is an interface provided by an instant messaging application.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal of a standard format such as red, green, and blue (RGB) or luma, blue projection, and red projection (YUV). In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this way, the electronic device 100 can play or record videos of a plurality of coding formats, for example, Moving Picture Experts Group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, can be implemented through the NPU.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and a phone book) created during use of the electronic device 100, and the like. In addition, the internal memory 121 may include a high-speed random-access memory (RAM), or may include a nonvolatile memory, for example, at least one magnetic disk storage device, a flash memory, or a Universal Flash Storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode audio signals. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 millimeter (mm) open mobile electronic device platform (OMTP) standard interface, or a cellular telecommunications industry association of the United States of America (USA) (CTIA) standard interface.

The pressure sensor 180A is configured to sense a pressure signal, and can convert the pressure signal into an electrical signal. In some embodiments, the pressure sensor 180A may be disposed on the display 194. In some optional embodiments of this disclosure, the pressure sensor 180A may be configured to capture a pressure value generated when a finger part of the user touches the display, and transmit the pressure value to the processor, so that the processor identifies a finger part through which the user enters the user operation.

There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a change of the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations performed on different touch locations may correspond to different operation instructions. In some optional embodiments, the pressure sensor 180A may further calculate a quantity of touch points based on a detected signal, and transmit a calculated value to the processor, so that the processor identifies that the user enters a user operation through a single finger or a plurality of fingers.

The gyroscope sensor 180B may be configured to determine a motion posture of the electronic device 100. In some embodiments, an angular velocity of the electronic device 100 around three axes (namely, axes X, Y, and Z of the electronic device) may be determined through the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in navigation and motion sensing game scenarios.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer. In some optional embodiments of this disclosure, the acceleration sensor 180E may be configured to capture an acceleration value generated when a finger part of the user touches the display (or a finger of the user taps a rear side bezel of a side bezel of the electronic device 100), and transmit the acceleration value to the processor, so that the processor identifies a finger part through which the user enters a user operation.

In this embodiment of this disclosure, the electronic device 100 may determine a posture change of the electronic device 100 by using a gyroscope sensor and/or an acceleration sensor, to further identify a user operation. For example, a current user operation is identified as an uplift operation based on the posture change of the electronic device 100. The uplift operation may be that the electronic device 100 is placed horizontally in a horizontal direction (in this case, the display 194 of the electronic device is parallel to the horizontal direction, and an uplift angle is an included angle between the display and the horizontal direction, namely, 0 degrees). The user lifts the electronic device 100 to a vertical horizontal direction within preset time (in this case, the display 194 of the electronic device is perpendicular to the horizontal direction, and the uplift angle is an included angle between the display and the horizontal direction, namely, 90 degrees). In this case, an uplift change angle within the preset time is 90 degrees (90 degrees minus 0 degrees). If the electronic device 100 detects that the uplift change angle within the preset time exceeds a preset angle, the electronic device 100 may consider that the current user operation is the uplift operation. The preset angle may be, for example, 30 degrees.

In some embodiments, if the electronic device 100 detects that the uplift change angle within the preset time exceeds the preset angle, and the uplift angle at a moment within the preset time is within a preset angle range, the electronic device 100 considers that the current user operation is the uplift operation. The preset angle range may be 60 degrees to 90 degrees.

In this embodiment of this disclosure, the electronic device 100 may determine a posture change of the electronic device 100 by using a gyroscope sensor and/or an acceleration sensor, to further identify a static state. The static state may be that an angle change detected by the gyroscope sensor of the electronic device 100 within preset time is within a preset range, and a speed change detected by the acceleration sensor within the preset time is less than a threshold.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include an LED and an optical detector, for example, a photodiode. The LED may be an infrared LED. The electronic device 100 emits infrared light by using the LED. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a display for power saving. The optical proximity sensor 180G may also be configured to automatically unlock and lock a screen in a flip cover mode and a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch operation is an operation that the user touches the display 194 by using a hand, an elbow, a stylus, or the like. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (such as photographing and audio playback) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100.

The following uses the electronic device 202 as an example to describe a structure of another electronic device according to an embodiment of this disclosure.

Figure 3:
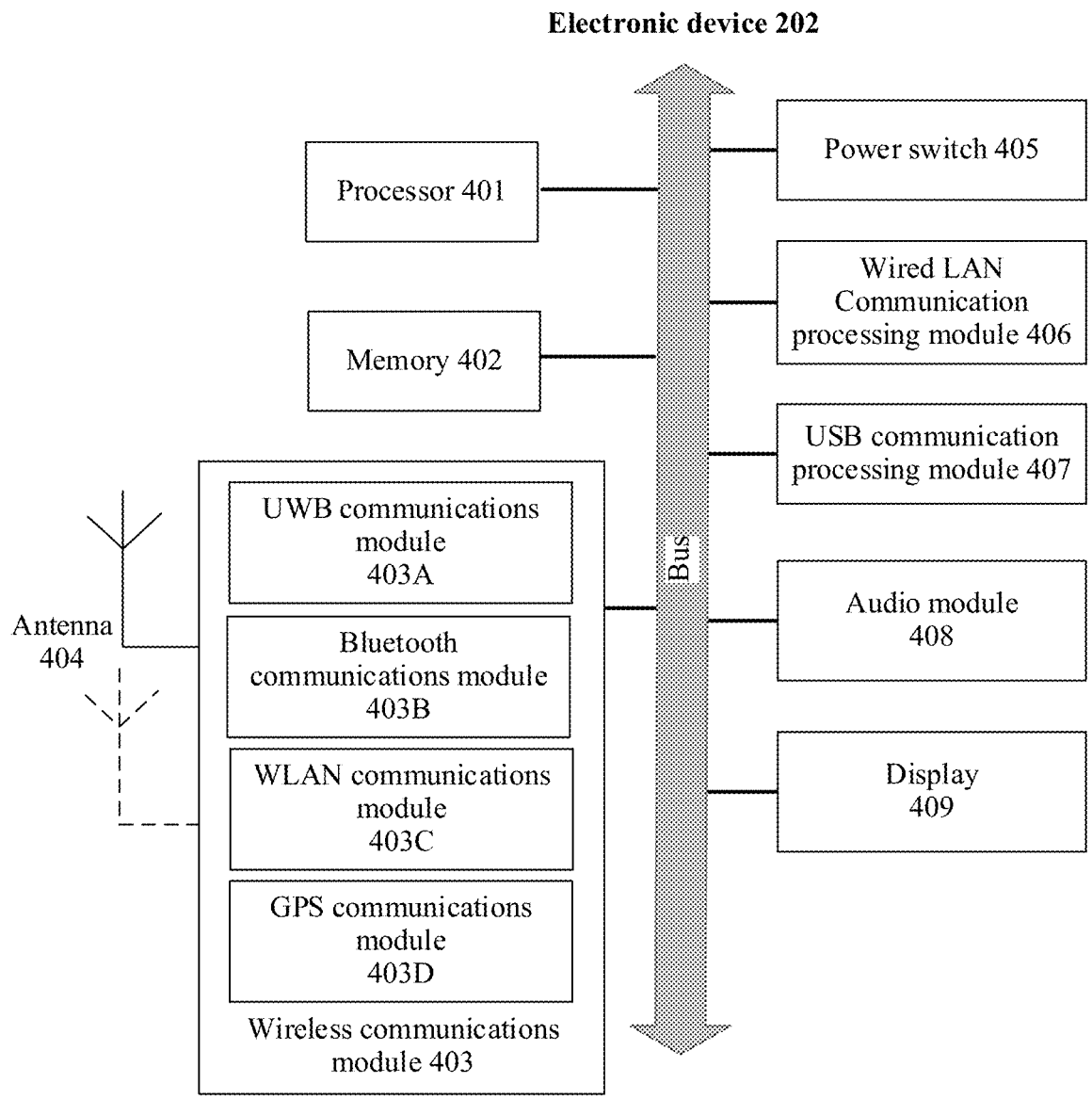
FIG. 3 is a schematic diagram of a structure of another electronic device according to an embodiment of this disclosure.

FIG. 3 is a schematic diagram of an example of a structure of the electronic device 202 according to an embodiment of this disclosure. For the electronic device 201, the electronic device 203, and the electronic device 204, refer to the schematic diagram of the structure shown in FIG. 3.

As shown in FIG. 3, the electronic device 202 may include a processor 401, a memory 402, a wireless communication processing module 403, an antenna 404, a power switch 405, a wired LAN communication processing module 406, a USB communication processing module 407, an audio module 408, and a display 409.

The processor 401 may be configured to read and execute a computer-readable instruction. During specific implementation, the processor 401 may mainly include a controller, an arithmetic unit, and a register. The controller is mainly responsible for decoding instructions and sending a control signal for an operation corresponding to the instructions. The arithmetic unit is mainly responsible for storing a register operand, an intermediate operation result, and the like that are temporarily stored during instruction execution. In specific implementation, a hardware architecture of the processor 401 may be an application-specific integrated circuit (ASIC) architecture, a Microprocessor without Interlocked Pipelined Stages (MIPS) architecture, an Advanced reduced instruction set computer (RISC) Machines (ARM) architecture, a network processing (NP) architecture, or the like.

In some embodiments, the processor 401 may be configured to parse a signal received by the wireless communications module 403 and/or the wired LAN communication processing module 406, for example, a detection request broadcast by the electronic device 100. The processor 401 may be configured to perform a corresponding processing operation based on a parsing result, for example, generate a detection response.

In some embodiments, the processor 401 may be further configured to generate a signal sent by the wireless communications module 403 and/or the wired LAN communication processing module 406, for example, a BLUETOOTH broadcast signal.

The memory 402 is coupled to the processor 401, and is configured to store various software programs and/or a plurality of groups of instructions. During specific implementation, the memory 402 may include a high-speed RAM, and may further include a non-volatile memory, for example, one or more magnetic disk storage devices, a flash device, or another non-volatile solid-state storage device. The memory 402 may store an operating system, for example, an embedded operating system such as Micro-Controller Operating Systems (μC/OS), VXWORKS, or RTLINUX. The memory 402 may further store a communication program, and the communication program may be used to communicate with the electronic device 100, one or more servers, or a nearby device.

The wireless communications module 403 may include one or more of a UWB communications module 403A, a BLUETOOTH communications module 403B, a WLAN communications module 404C, and a GPS communications module 404D. The UWB communications module 403A may be integrated into a chip (or System on Chip (SOC)), and the UWB communications module 403A may alternatively be integrated with another communications module (for example, the BLUETOOTH communications module 403B) based on hardware (or software).

In some embodiments, one or more of the UWB communications module 403A, the BLUETOOTH communications module 403B, the WLAN communications module 404C, and the GPS communications module 404D may listen to a signal transmitted by another device (for example, the electronic device 100), for example, a measurement signal or a scanning signal, and may send a response signal, for example, a measurement response or a scanning response, so that the other device (for example, the electronic device 100) can discover the electronic device 202, and establishes a wireless communication connection to the other device (for example, the electronic device 100) by using one or more NFC technologies of UWB, BLUETOOTH, WLAN, or infrared, to transmit data.

In some other embodiments, one or more of the UWB communications module 403A, the BLUETOOTH communications module 403B, the WLAN communications module 404C, and the GPS communications module 404D may also transmit a signal, for example, broadcast a UWB measurement signal, so that another device (for example, the electronic device 100) can discover the electronic device 202, and establish a wireless communication connection to the other device (for example, the electronic device 100) by using one or more wireless communication technologies of UWB, BLUETOOTH, WLAN, or infrared, to transmit data.

The wireless communications module 403 may further include a cellular mobile communications module (not shown). The cellular mobile communications module may communicate with another device (for example, a server) by using a cellular mobile communication technology.

The antenna 404 may be configured to transmit and receive an electromagnetic wave signal. Antennas of different communications modules may be multiplexed, or may be independent of each other, to improve antenna utilization. For example, an antenna of the BLUETOOTH communications module 403A may be multiplexed as an antenna of the WLAN communications module 403B. For example, the UWB communications module 403A needs to use an independent UWB antenna.

In this embodiment of this disclosure, to implement UWB communication, the electronic device 202 has at least one UWB antenna.

The power switch 405 may be configured to control a power supply to supply power to the electronic device 202.

The wired LAN communication processing module 406 may be configured to communicate with another device in a same LAN by using a wired LAN, and may be further configured to connect to a WAN by using the wired LAN to communicate with a device in the WAN.

The USB communication processing module 407 may be configured to communicate with another device through a USB interface (not shown).

The audio module 408 may be configured to output an audio signal through an audio output interface, so that the electronic device 202 can support audio playback. The audio module may be configured to receive audio data through an audio input interface. The electronic device 202 may be a media playback device such as a television.

The display 409 is configured to display an image, a video, and the like. The display 409 may be an LCD, an OLED display, an AMOLED display, a FLED display, a QLED display, or the like.

In some embodiments, the electronic device 202 may further include a serial interface such as an RS-232 interface. The serial interface may be connected to another device, for example, an audio speaker device such as a sound box, so that the display collaborates with the audio speaker device to play audio and video.

It may be understood that the structure shown in FIG. 3 does not constitute any specific limitation on the electronic device 202. In some other embodiments of this disclosure, the electronic device 202 may include more or fewer components than those shown in the figure, or combine some components, or split some components, or have different component arrangements. The components shown in the figure may be implemented by hardware, software, or a combination of software and hardware.

This disclosure provides a device identification method based on augmented reality. After detecting a first operation, an electronic device 100 enters a first interface, and the electronic device 100 starts a camera, and displays, in the first interface in real time, a preview image captured by the camera. The electronic device 100 identifies a type of a second electronic device (for example, a sound box, a computer, a tablet, or a computer) in the preview image of the first interface by using a computer vision technology. In addition, the electronic device 100 determines, by using a wireless positioning technology (for example, UWB positioning, BLUETOOTH positioning, WI-FI positioning, or GPS positioning), orientation information (for example, latitude and longitude information, or a physical distance and an angle from the electronic device) and identity information (for example, a device name, a device type, and a device attribute) of the second electronic device within a communication range of the electronic device 100.

Figure 4:
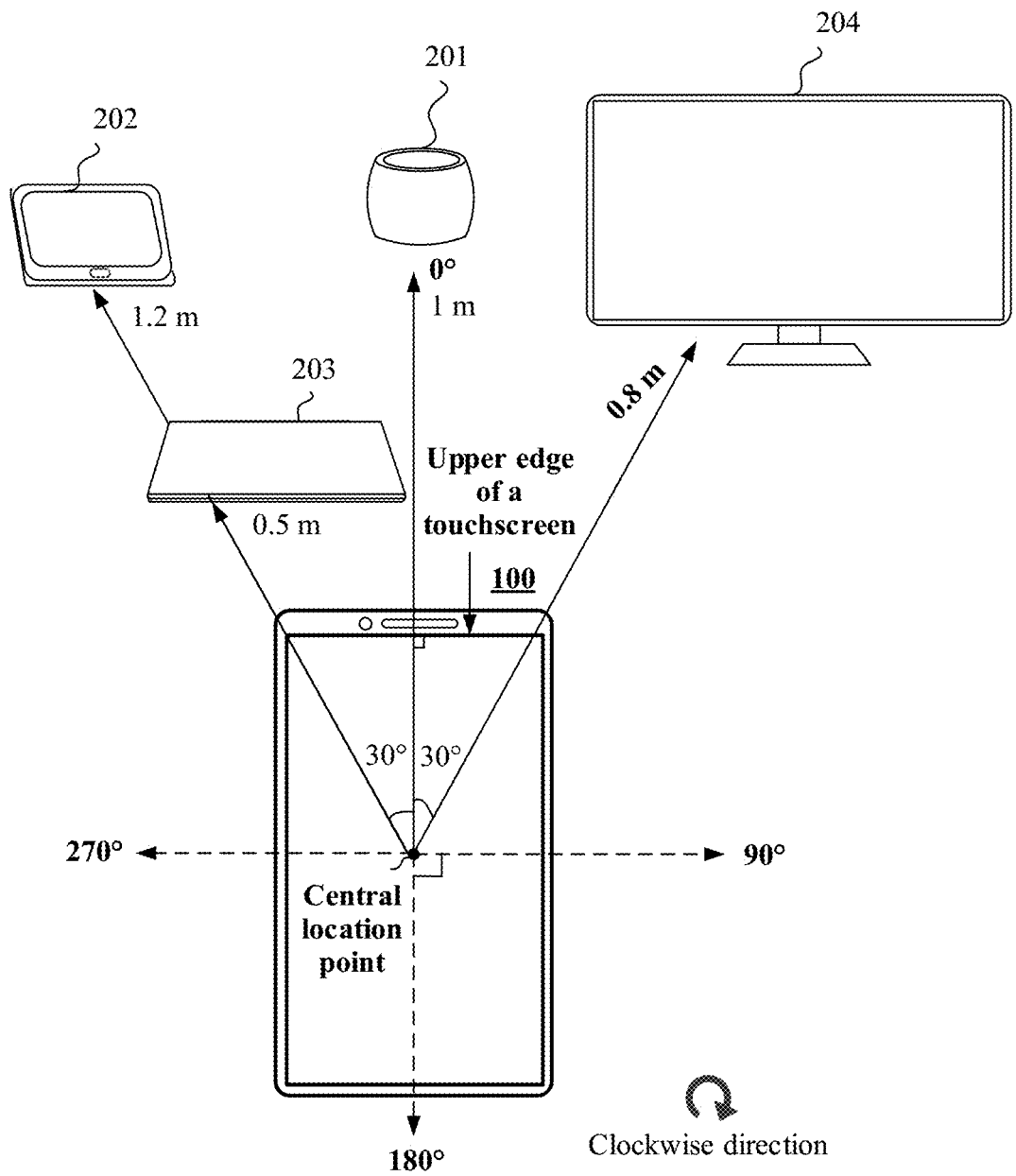
FIG. 4 is a schematic diagram of a scenario of a device identification method according to an embodiment of this disclosure.

The electronic device 100 determines a location of the second electronic device in the preview image based on a relative distance and a relative angle between the second electronic device and the electronic device and a shooting angle range of the camera. For example, as shown in FIG. 4, the electronic device 100 and nearby devices are included in FIG. 4. The nearby devices include an electronic device 201, an electronic device 202, an electronic device 203, and an electronic device 204. The second electronic device may be any electronic device in the nearby devices. FIG. 4 shows an example of location relationships between the electronic device 100, the electronic device 201, the electronic device 202, the electronic device 203, and the electronic device 204 on a horizontal plane in some application scenarios of this disclosure.

In embodiments of this disclosure, to facilitate description of the location relationships between the electronic device 100 and the nearby devices, a reference point (for example, a central location point) on the electronic device 100 may be used to represent a location of the electronic device in a planar diagram. For example, a central location point of the electronic device 100 may be used to represent a location of the electronic device on a horizontal plane. In this embodiment of this disclosure, a direction pointed by a vector that is perpendicular to an upper edge of a touchscreen of the electronic device 100 by using the central location point of the electronic device 100 as a start point may be used as a reference direction of the electronic device 100, or may be referred to as a 0-degree direction of the electronic device 100.

Therefore, as shown in FIG. 4, the electronic device 201 may be 1 m in the 0-degree direction of the electronic device 100, the electronic device 202 may be 1.2 m in a 330-degree clockwise direction of the electronic device 100, the electronic device 203 may be 0.5 m in the 330-degree clockwise direction of the electronic device 100, and the electronic device 204 may be 0.8 m in a 30-degree clockwise direction of the electronic device 100.

Generally, a left-right included angle of a shooting angle of the camera is 60° to 80°, and an up-down included angle is about 45°, which vary depending on different mobile phone brands and camera configurations. If the left-right included angle of the shooting angle of the electronic device 100 is 60°, it can be learned that the electronic device 201, the electronic device 202, the electronic device 203, and the electronic device 204 are all within a shooting range of the electronic device 100. It may be determined, based on lengths, widths, and physical distances from different electronic devices to the electronic device 100, whether the electronic device 201, the electronic device 202, the electronic device 203, and the electronic device 204 are completely displayed or partially displayed in a photographing interface of the electronic device 100.

In this embodiment of this disclosure, there may be more or fewer nearby devices of the electronic device 100, and the nearby devices are not limited to the four electronic devices in FIG. 4. In FIG. 4, the four electronic devices are merely used as an example to explain this disclosure, and should not constitute a limitation. FIG. 4 shows an example of relative location relationships between the foregoing four electronic devices (the electronic device 201, the electronic device 202, the electronic device 203, and the electronic device 204) and the electronic device 100, which is merely an example to explain this embodiment of this disclosure, and should not constitute a limitation.

After determining the orientation information of the second electronic device, the electronic device 100 determines a display image and a display area of the second electronic device in the preview image, and displays a device icon in the first interface in real time in an augmented reality manner. A user triggers the device icon, and the electronic device 100 may output a control interface for the second electronic device, to implement interaction between the user and the second electronic device.

In some embodiments, a display area of the device icon in the first interface corresponds to the display area of the second electronic device in the preview image.

The following describes, with reference to an application scenario, a device identification method based on augmented reality in this disclosure.

In UI embodiments shown in FIG. 5A to FIG. 5F, an example of an operation process in which a first operation of a user triggers a first electronic device to enter a first interface, and an electronic device displays a device icon in the first interface in real time is shown.

Figure 5A:
FIG. 5A, FIG. 5B, FIG. 5C, FIG. 5D, FIG. 5E, FIG. 5F, FIG. 5G, and FIG. 5H are schematic diagrams of a group of interfaces according to an embodiment of this disclosure.

FIG. 5A shows an example of a user interface 510 of the electronic device 100. The user interface 510 may include a status bar 511, a tray 512, and one or more application icons. The status bar 201 may include one or more signal strength indicators 513 of a mobile communication signal (which may alternatively be referred to as a cellular signal), one or more signal strength indicators 514 of a WI-FI signal, a BLUETOOTH indicator 515, a battery status indicator 516, and a time indicator 517. When a BLUETOOTH module of the electronic device 100 is in an on state (that is, the electronic device supplies power to a BLUETOOTH module), the BLUETOOTH indicator 515 is displayed in a display interface of the electronic device 100.

The tray 512 including commonly used application icons may display a "Phone" icon, a "Contacts" icon, a "Messages" icon, and a "Camera" icon. The one or more application icons include: a "Gallery" icon, a "Browser" icon, an "App store" icon, a "Settings" icon, an "Email" icon, a "Cloud share" icon, and a "Notes" icon.

The electronic device 100 can simultaneously start and run a plurality of applications to provide different services or functions for the user. That the electronic device 100 simultaneously runs the plurality of applications means the electronic device 100 has started the plurality of applications, does not close the plurality of applications, and does not delete resources such as memory occupied by the plurality of applications. The plurality of applications simultaneously occupies the resources such as memory in the background. The plurality of applications is not required to simultaneously interact with the user in the foreground. For example, the electronic device 100 sequentially starts three applications: "Email", "Gallery", and "Instant messaging", and simultaneously runs the three applications: "Email", "Gallery", and "Instant messaging".

When the user uses an application, if the application is switched or a home screen is displayed for an operation, the electronic device 100 does not close the application previously used by the user, but retains the previously used application, as a background application, in a multi-task queue.

When the electronic device 100 simultaneously runs a plurality of applications, the electronic device may generate, based on the plurality of applications in the multi-task queue, a card corresponding to each application. A plurality of cards in a multi-task interface are horizontally arranged in parallel according to a preset sequence policy. For example, in a sequence policy, the electronic device 100 arranges, according to a time sequence for running different applications, cards corresponding to the different applications.

The electronic device 100 displays the multi-task interface 520 after detecting a user operation that indicates to open the multi-task interface 520. The multi-task interface 520 includes cards corresponding to a plurality of applications that are running on the electronic device 100. There may be a plurality of user operations for indicating to open the multi-task interface.

Figure 5B:
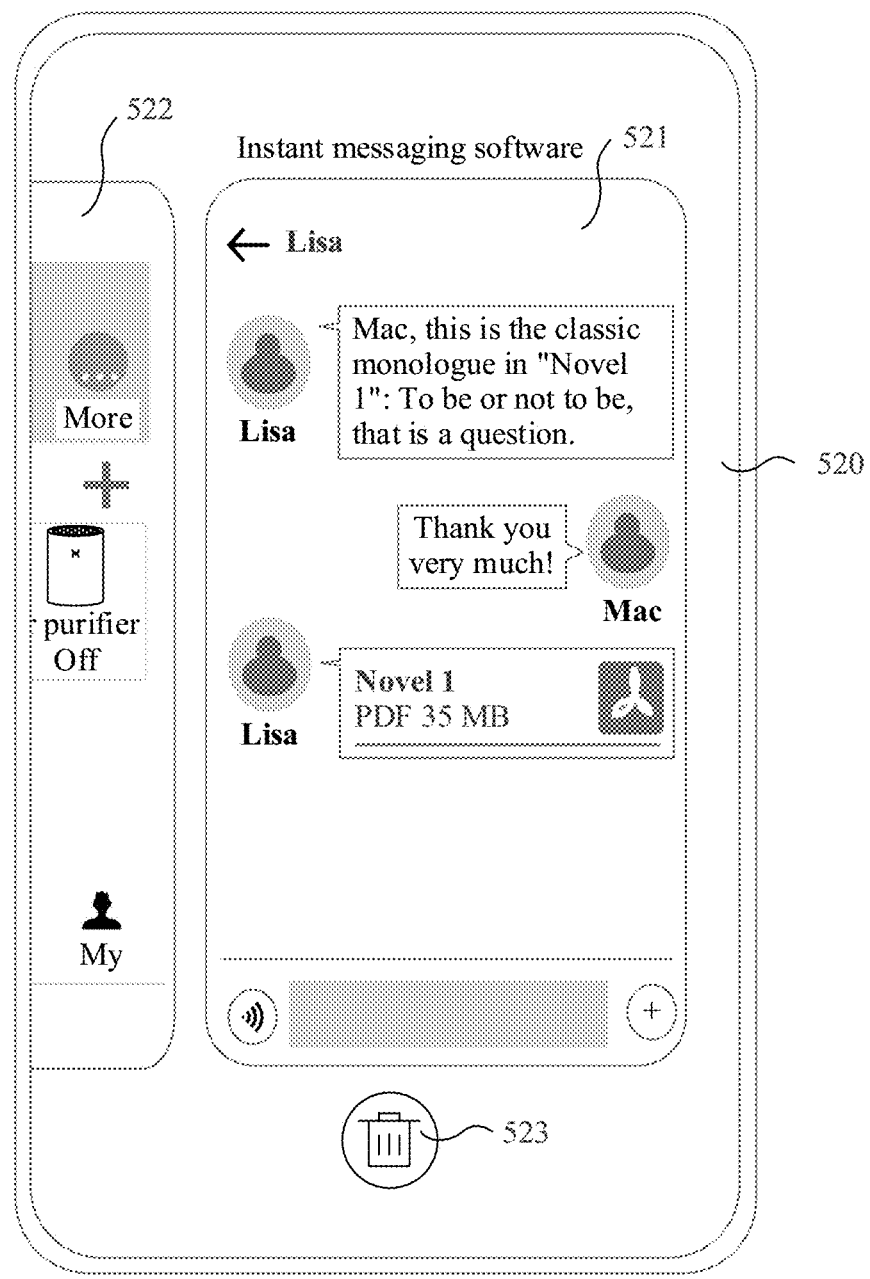

For example, when the electronic device 100 detects an upward sliding operation for the bottom of the electronic device 100, the electronic device 100 displays the multi-task interface 520 in response to the operation, as shown in FIG. 5B.

The multi-task interface 520 may include a card 521, a card 522, and a deletion icon 523. The card 521 is completely displayed, and the card 522 is partially displayed.

The deletion icon 523 may be used to close an application corresponding to the completely displayed card in the current multi-task interface 520. Closing the application means deleting resources such as memory occupied by the application. In some embodiments, the deletion icon 530 may be used to close applications corresponding to all cards in the current multi-task interface 520.

It should be noted that the accompanying drawings are merely example descriptions. The multi-task interface 520 shown in the accompanying drawings is an interface displayed on a touchscreen inside a frame of the electronic device 100. A part of a card inside the frame of the electronic device 100 can be displayed on the touchscreen of the electronic device 100, and a part of a card outside the frame of the electronic device cannot be displayed on the touchscreen of the electronic device 100.

Figure 5C:
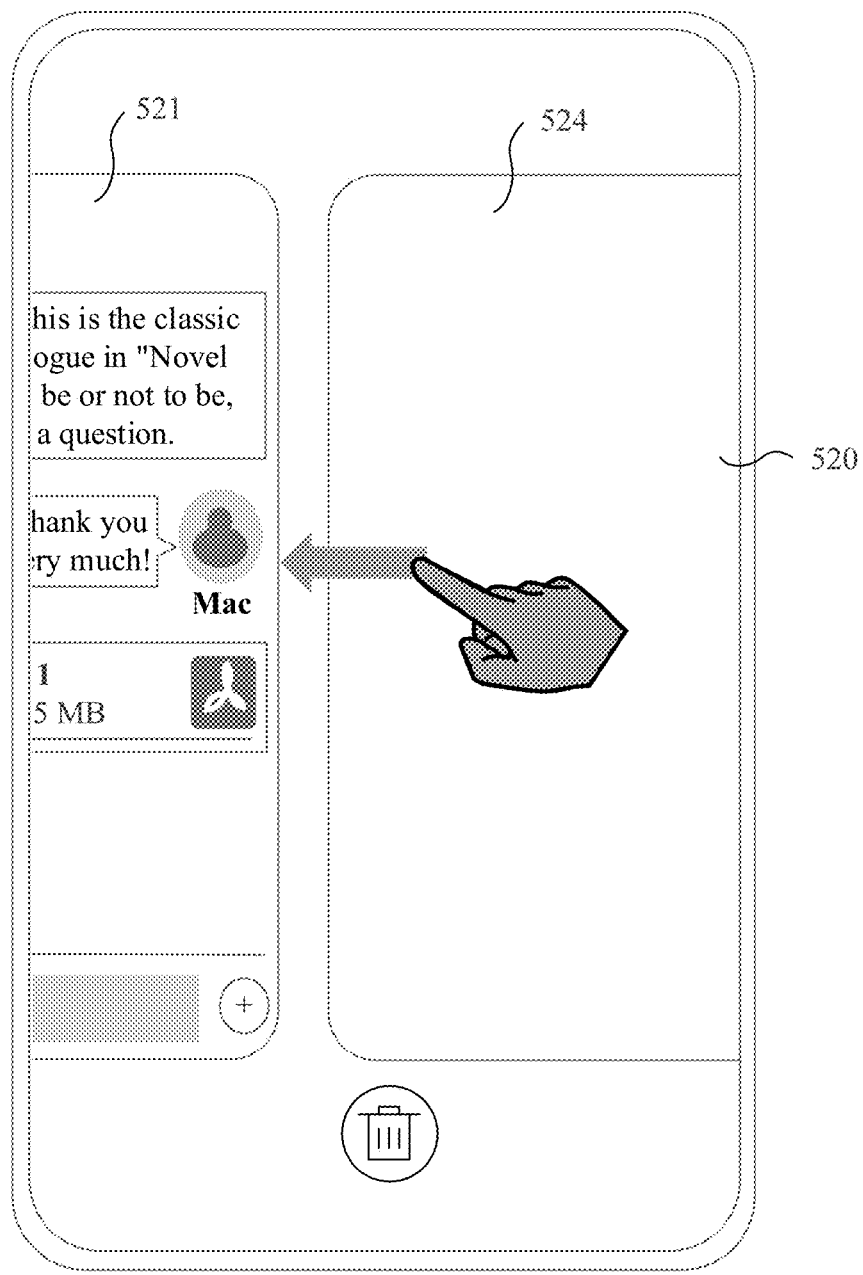
Figure 5D:
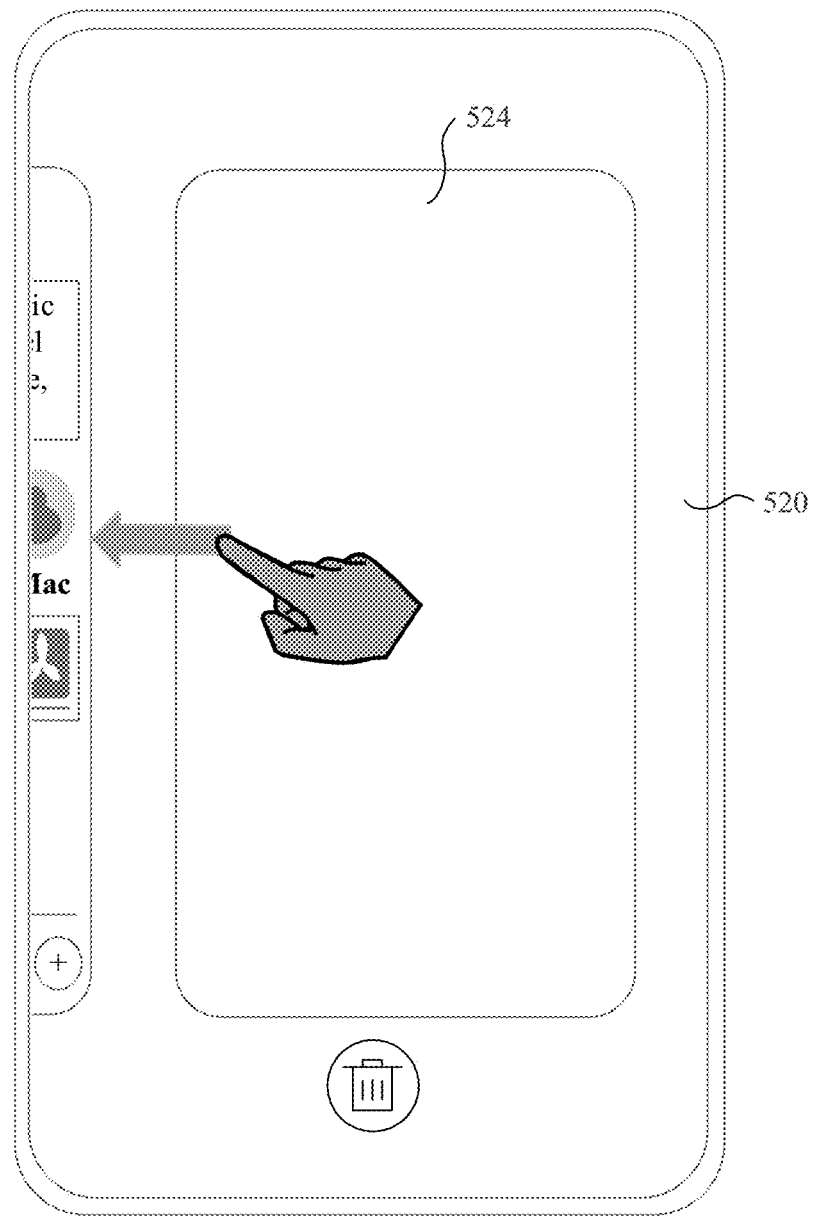

In the multi-task interface 520, the user may switch displaying of cards in a manner of sliding left or right in the multi-task interface 520. For example, when the electronic device 100 detects a rightward sliding operation on the multi-task interface 520, in response to the operation, the cards in the multi-task interface 520 sequentially move rightward. In this case, the electronic device 100 may completely display the card 522, and partially display the card 521. When the electronic device 100 detects a leftward sliding operation on the multi-task interface 520, in response to the operation, the cards in the multi-task interface 520 sequentially move leftwards. Because the card 521 is the first card counted from the right in the multi-task interface 520, and there is no other card on the right of the card 521, the electronic device 100 detects the leftward sliding operation after completely displaying the card 521. As shown in FIG. 5C, in response to the operation, the electronic device 100 partially displays a preset area 524, and continues to slide leftwards, as shown in FIG. 5D, the electronic device 100 completely displays the preset area 524. In some embodiments, in this case, the electronic device 100 triggers display of a viewfinder interface corresponding to the preset area 524. The viewfinder interface may be an image captured by a rear-facing camera of the electronic device 100, or may be an image captured by a front-facing camera.

Figure 5E:
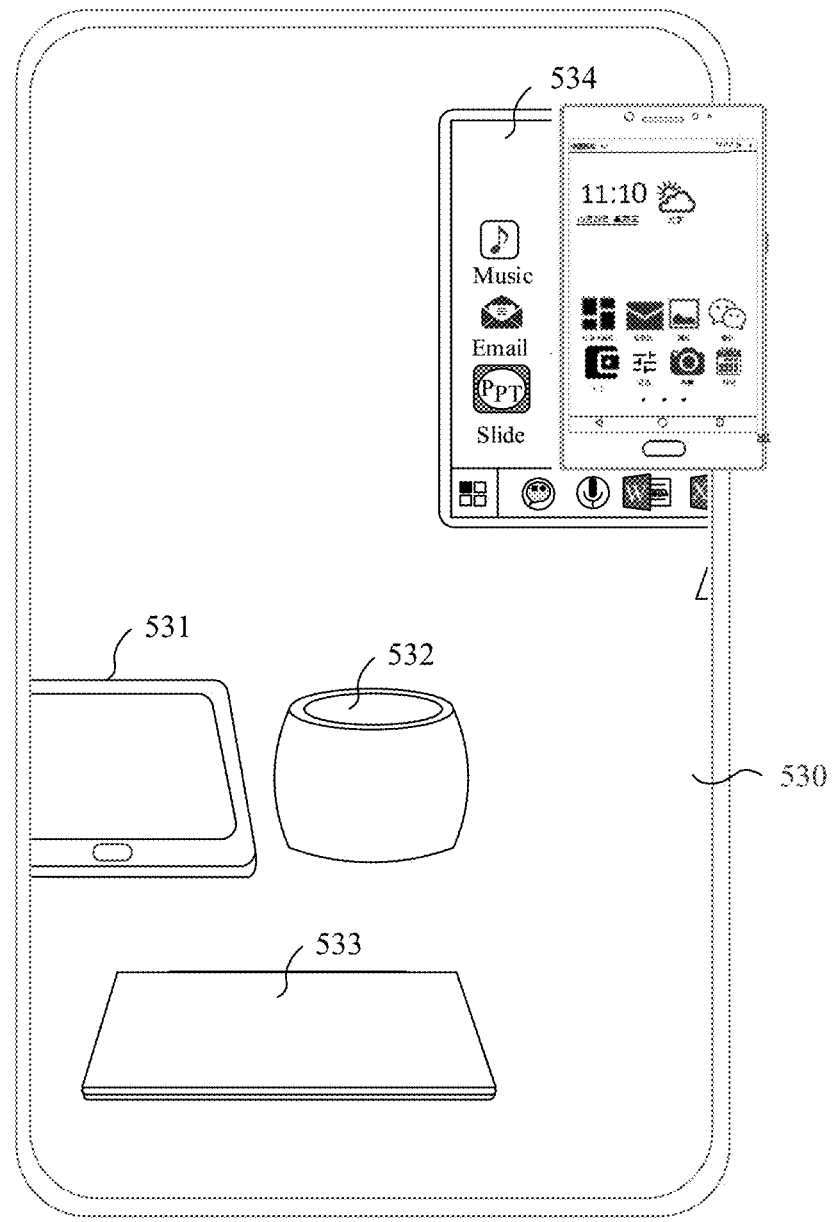

As shown in FIG. 5E, FIG. 5E shows an example of a viewfinder interface 530. An image captured by using the camera is displayed in real time in the viewfinder interface 530. Optionally, the electronic device 100 may further send a detection request with a wireless positioning technology. The electronic device 100 determines a nearby device of the electronic device 100 based on a received detection response for the detection request, and further determines one or more pieces of information of a device name, a device type, and a physical distance or an angle between the nearby device and the electronic device 100. The electronic device 100 performs image recognition on the image captured by the camera, and identifies an electronic device (for example, a sound box, a computer, or a tablet computer) in the image. Displayed content in the viewfinder interface 530 in FIG. 5E is the image captured by the camera, including a device image 531, a device image 532, a device image 533, and a device image 534.

With reference to FIG. 4, in this disclosure, the device image 531 is an image that is displayed in the viewfinder interface 530, that is captured by the electronic device 100, and that is of the electronic device 202, the device image 532 is an image that is displayed in the viewfinder interface 530, that is captured by the electronic device 100, and that is of the electronic device 201, the device image 533 is an image that is displayed in the viewfinder interface 530, that is captured by the electronic device 100, and that is of the electronic device 203, and the device image 534 is an image that is displayed in the viewfinder interface 534, that is captured by the electronic device 100, and that is of the electronic device 202.

The electronic device 100 determines, based on physical distances and angles between the electronic device 201, the electronic device 202, the electronic device 203, and the electronic device 204 and the electronic device 100, a display area of a corresponding device image that is of each device and that is in the viewfinder interface 530. The electronic device 100 displays a device icon in real time in the viewfinder interface 530 in a manner of augmented reality. The device icon indicates an electronic device corresponding to a device image in the viewfinder interface 530. Optionally, a display area of the device icon corresponds to a device image in the viewfinder interface 530.

In some optional manners, the device icon may be displayed at a fixed location in the viewfinder interface 530, or may be displayed correspondingly with the device image, for example, displayed around a corresponding device image, or displayed at a central location of a corresponding device image. The display area of the device icon and a display area of the corresponding device image may completely overlap, may partially overlap, or may not overlap (for example, the display area of the device icon may be displayed in an upper area close to the display area of the corresponding device image).

Figure 5F:
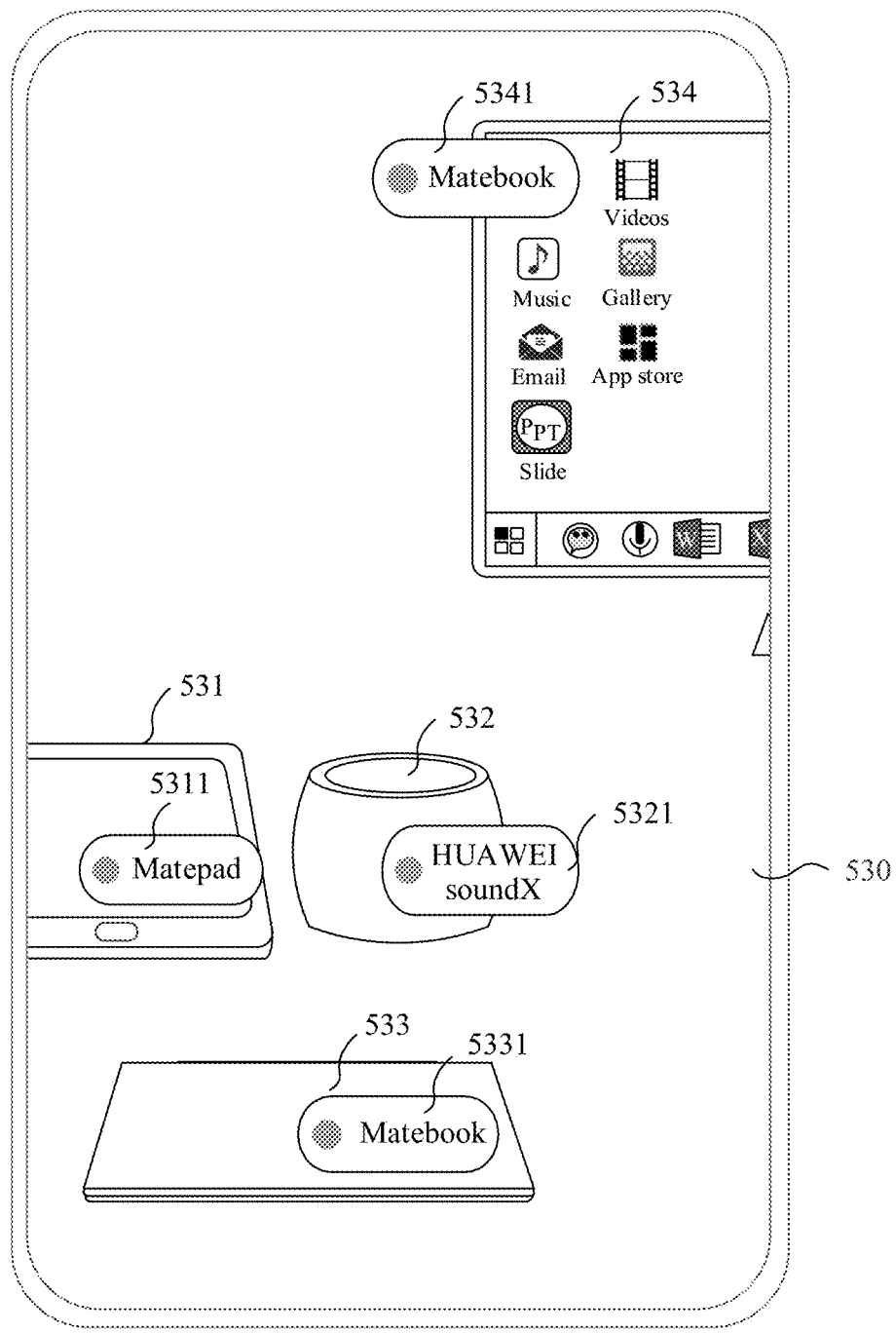

As shown in FIG. 5F, a display area of a device icon 5311 completely overlaps a device image 531, and the device icon 5311 indicates that a device name corresponding to the device image 531 is MATEPAD (or a tablet computer). A display area of a device icon 5321 partially overlaps a device image 532, and the device icon 5321 indicates that a device name corresponding to the device image 532 is HUAWEI soundX (HUAWEI sound box). A display area of a device icon 5331 completely overlaps a device image 533, and the device icon 5331 indicates that a device name corresponding to the device image 531 is MATEBOOK (or a computer). A display area of a device icon 5341 partially overlaps a device image 534, and the device icon 5341 indicates that a device name corresponding to the device image 534 is MATE-BOOK (or a computer).

In this disclosure, the device icon may alternatively be referred to as a device label. When the device 201 is referred to as a second electronic device, the device icon 5321 may alternatively be referred to as a first label.

In some embodiments, a display area of a device icon corresponds to a location of a positioning chip (for example, a UWB chip or a BLUETOOTH chip) of a device in a device image. The electronic device 100 receives a detection response from a positioning chip of the electronic device 201, and determines an orientation (a physical distance and an angle from the electronic device 100) of the positioning chip of the electronic device 201. The electronic device 100 determines, based on an orientation of the positioning chip of the electronic device 201, a corresponding location of the positioning chip of the electronic device 201 in the viewfinder interface 530, and the electronic device 100 displays the device icon of the device 201 at the corresponding location. For example, the device icon 5311 is displayed at the location of the positioning chip inside the electronic device corresponding to the device image 531. This case is similar for the device icon 5321 and the device icon 5331.

In some embodiments, a location of a positioning chip of the device is not in the viewfinder interface 530. For example, a positioning chip of the electronic device 504 corresponding to the device image 534 is not in the viewfinder interface 530. The electronic device 100 may calculate, based on a location and a size of the electronic device 504, a physical distance and an orientation of an appearance key point (for example, four corners of a screen) of the electronic device 504 relative to the electronic device 100. When the electronic device 100 shoots one or more appearance key points, the electronic device 100 displays a device icon in the viewfinder interface 530.

Figure 5G:
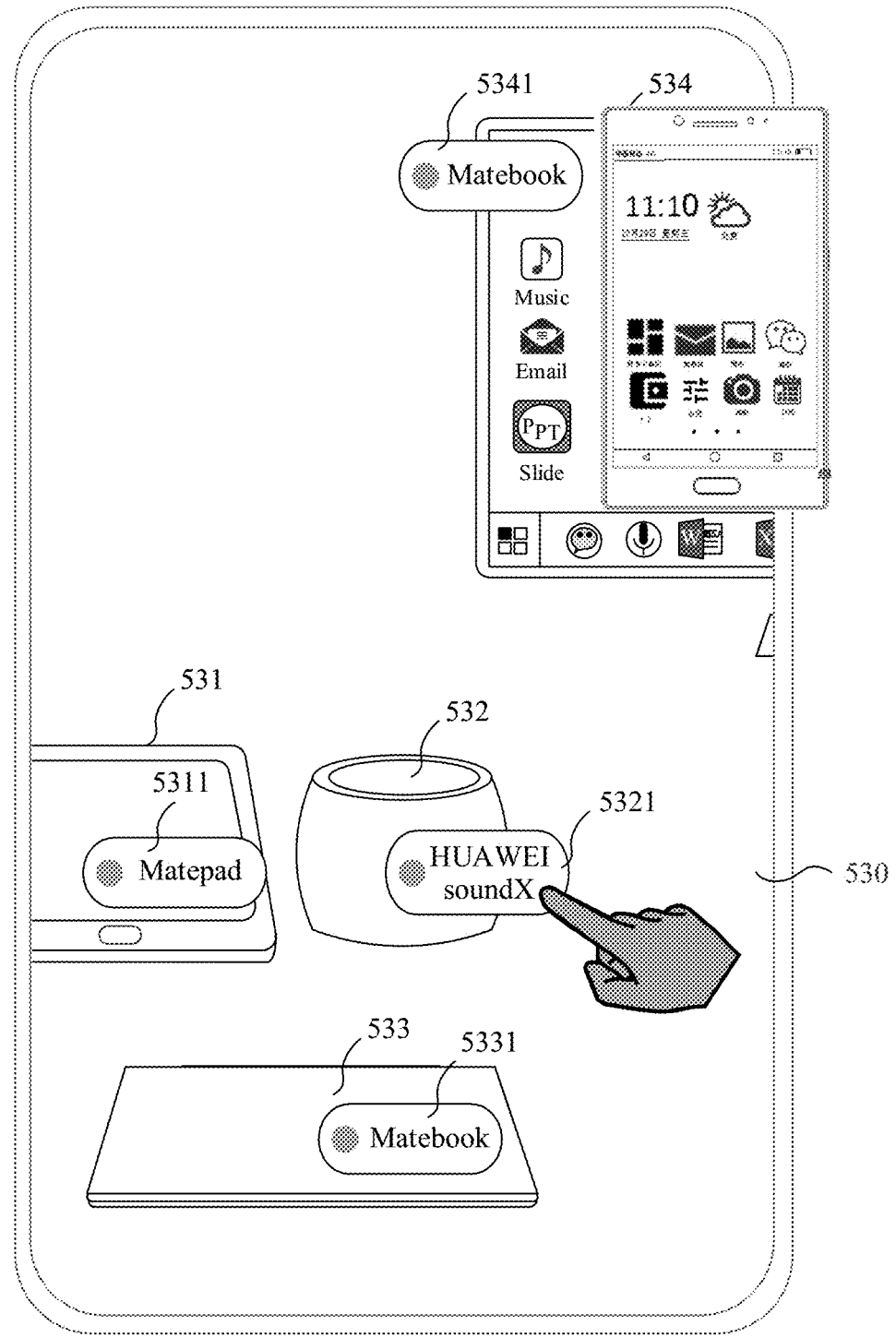
Figure 5H:
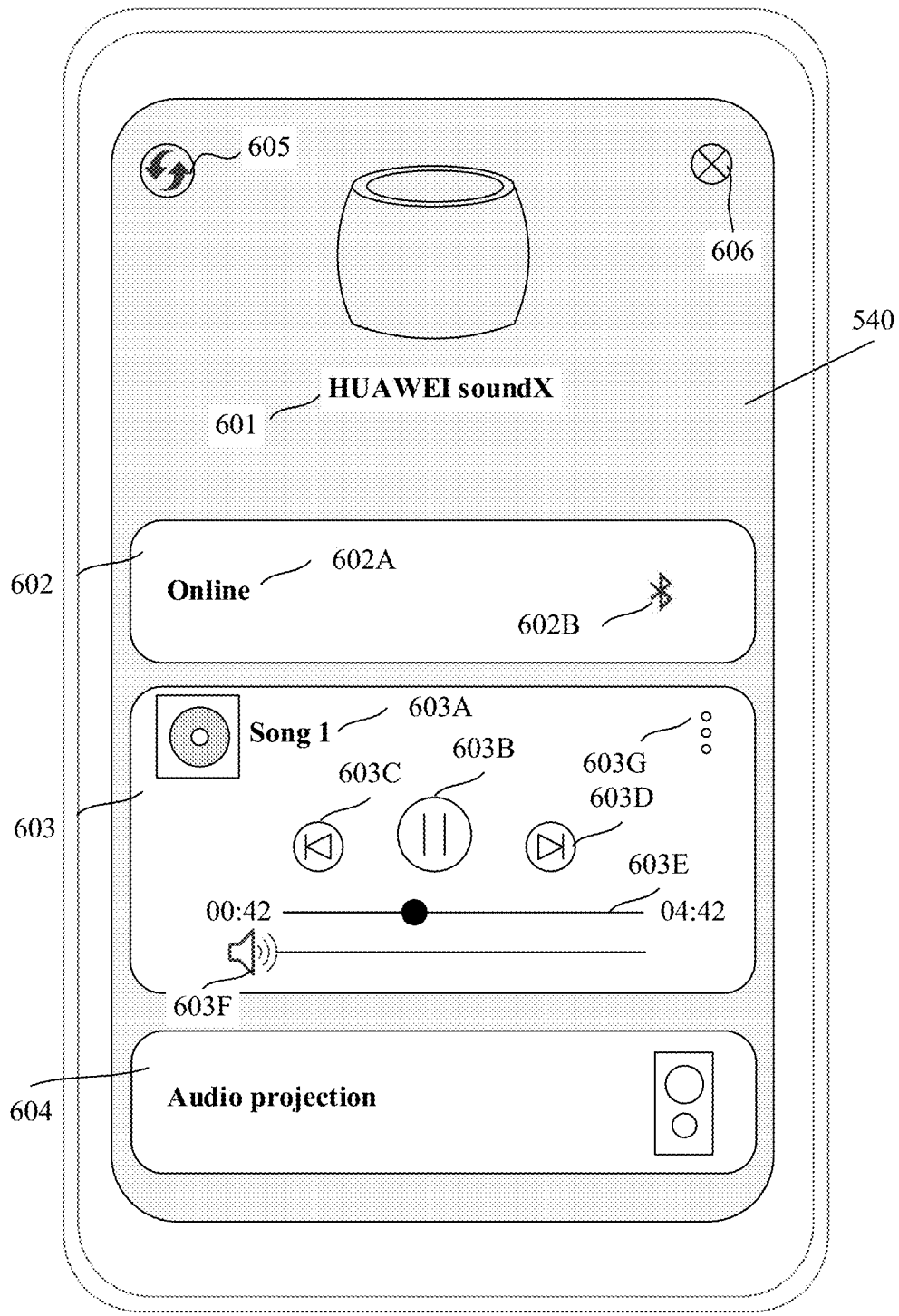

In some application scenarios, the device icon may not only indicate identity information of a device corresponding to the device image, but also may be associated with a control card of the device corresponding to the device image. When the electronic device 100 detects a user operation for a device icon, the electronic device 100 outputs a control card of a device corresponding to the device icon. As shown in FIG. 5G, when the electronic device 100 detects a user operation on a device icon 5321, an electronic device associated with the device icon 5321 is HUAWEI soundX. As shown in FIG. 5H, the electronic device 100 outputs a control card 540 of HUAWEI soundX. The control card 540 may include one or more of the following: an application title bar 601, a connection card 602, a music card 603, an audio projection card 604, a refresh control 605, and a close control 606.

The application title bar 601 indicates that the device of the control card 540 is HUAWEI soundX.

The connection card 602 may include indication information 602A and a connection manner 602B. The indication information 602A is used to indicate whether a device (the electronic device 201) corresponding to the device image 532 is currently in an online state or an offline state. The online state means that the electronic device 201 is currently connected to the Internet, and the offline state means that the electronic device 201 is currently not connected to the Internet. The connection manner 602B is used to indicate a current connection manner between the electronic device 201 and the electronic device 100. When the current connection manner between the electronic device 201 and the electronic device 100 is a BLUETOOTH connection manner, the connection manner 602B may be presented as a BLUETOOTH icon. When the current connection manner between the electronic device 201 and the electronic device 100 is a WI-FI connection manner, the connection manner 602B may be presented as a WI-FI icon.

The music card 603 may include a music name 603A, a pause control 603B, a previous control 603C, a next control 603D, a progress bar 603E, a volume 603F, and a more control 603H.

The pause control 603B may receive an input operation (for example, a tap operation) of a user, and in response to the detected user operation, the electronic device 201 pauses playing music.

The previous control 603C may receive an input operation (for example, a tap operation) of the user, and in response to the detected user operation, the electronic device 201 may play a song previous to a playing song in a music list.

The next control 603D may receive an input operation (for example, a tap operation) of the user, and in response to the detected user operation, the electronic device 201 may play a next song of a playing song in a music list.

The progress bar 603E may indicate total duration (for example, 04:42) and played duration (for example, 00:42) of the playing song.

The volume 603F may receive an input operation (for example, a slide operation) of the user, and in response to the detected user operation, the electronic device 201 adjusts a playback volume of the electronic device 201.

The more control 603H may receive an input operation (for example, a slide operation) of the user, and in response to the detected user operation, the electronic device 100 may display more functional options of a music card, for example, sharing, deleting, and downloading.

The audio projection card 604 is configured to indicate the electronic device 100 to output audio to the electronic device 201. When the electronic device 100 detects a user operation on the audio projection card 604, audio of the electronic device 100 is output to the electronic device 201 in response to the operation.

The refresh control 605 is configured to refresh a display interface of the current control card 540, and the electronic device 100 re-obtains a current status of the device 201.

The close control 606 is configured to close the control card 540. When the electronic device 100 detects a user operation on the control 606, the card 540 is closed, and the electronic device 100 displays a viewfinder interface 530 shown in FIG. 5G.

In addition to the manner of controlling the card 540 of the device image 532 shown in FIG. 5H, the electronic device 100 may interact with the device image 532 in another manner. This is not limited herein. For example, when the electronic device 100 detects a user operation on the device icon 5321, the electronic device 100 may directly open and jump to application software associated with the electronic device corresponding to the device image 532, and display an application interface of the application software of the device image 532, for example, application software such as Smart Life and Fitness & health.

In this disclosure, the viewfinder interface 530 may alternatively be referred to as a first interface. The electronic device 100 determines orientation information of a nearby device of the electronic device 100 by using a computer identification technology and a wireless positioning technology, determines a display image and a display area of the nearby device in a preview image of the viewfinder interface 530, and displays a device icon in real time in a photographing interface in a manner of augmented reality, thereby achieving a real-time preview effect. The user may trigger the device icon, and the electronic device 100 outputs a corresponding control interface of the electronic device, to implement interaction between the user and the nearby device.

In some application scenarios, no application runs in the background of the electronic device 100, and no application runs in the multi-task queue. In other words, the multi-task interface 520 does not include the card 521 or the card 522. When the electronic device 100 displays the user interface 510 and detects an upward sliding operation for the bottom of the electronic device 100, the electronic device 100 displays the multi-task interface in response to the operation. Because there is no card in the multi-task interface, the electronic device 100 directly enters the viewfinder interface 530. The electronic device 100 starts the camera, collects an image in real time by using the camera, and displays the image in the viewfinder interface 530.

Figure 6A:
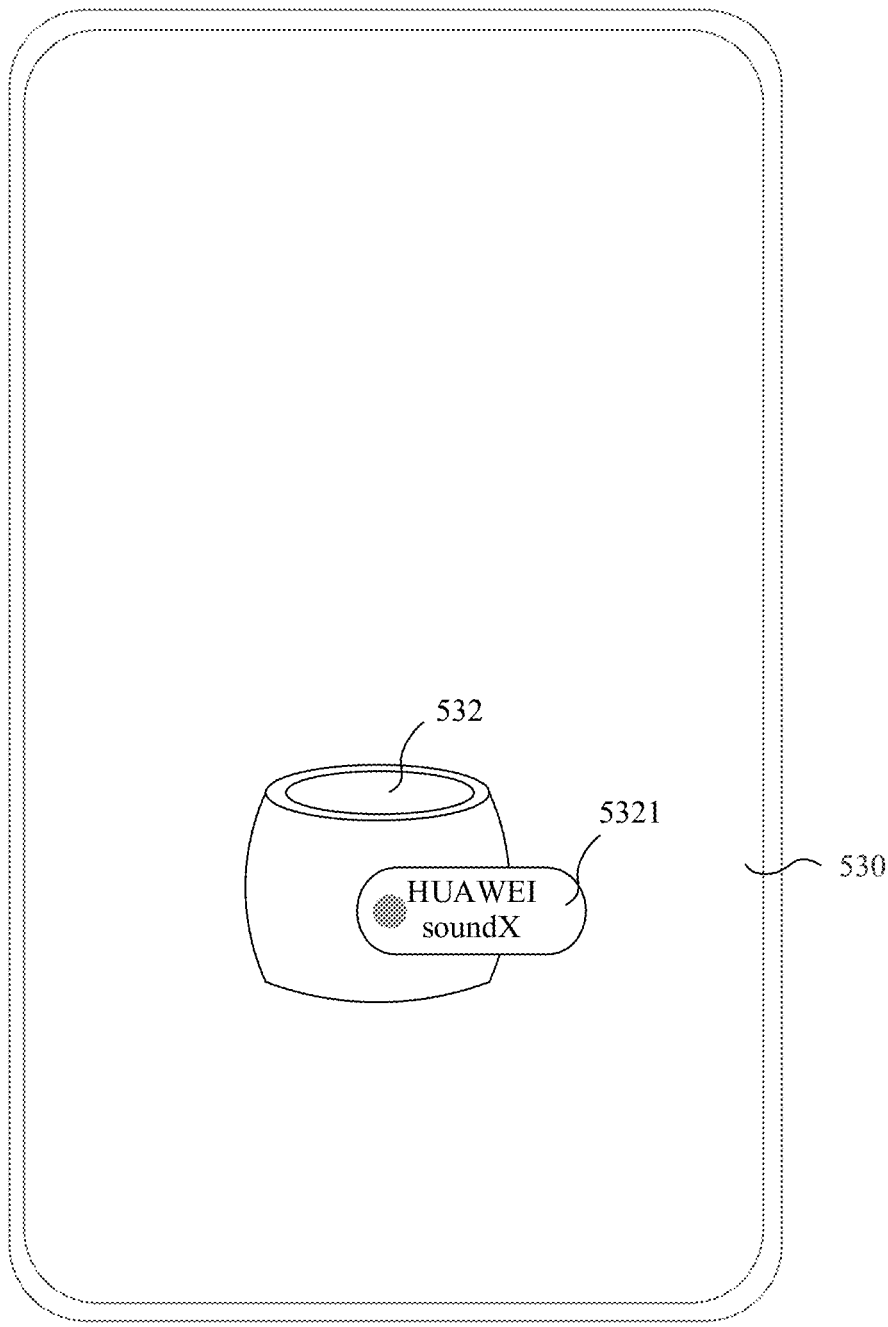
FIG. 6A and FIG. 6B are schematic diagrams of another group of interfaces according to an embodiment of this disclosure.
Figure 6B:
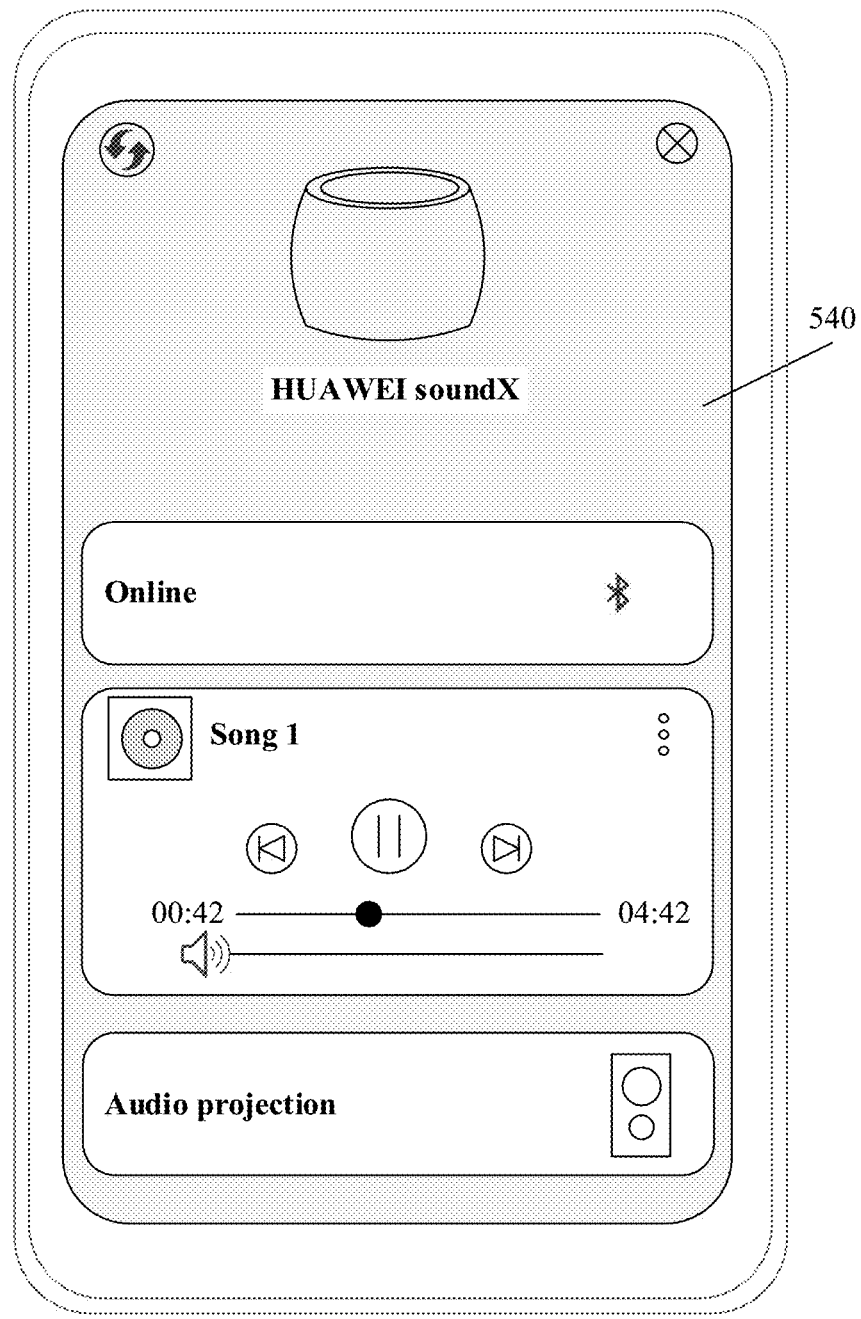

In some application scenarios, after the electronic device 100 enters the viewfinder interface 530, when there is only one device in the viewfinder interface 530, the user does not need to tap the device icon, and the electronic device 100 may directly enter the control interface of the device. For example, as shown in FIG. 6A, the viewfinder interface 530 in FIG. 6A includes the device image 532. The device icon 5321 is displayed near the device image 532. The device icon 5321 partially overlaps the display area of the device image 532. When the electronic device 100 detects that there is only one device in the viewfinder interface 530, as shown in FIG. 6B, the electronic device 100 directly outputs the control card 540 of the device image 532. In this implementation, when there is only one device image in the viewfinder interface 530, it may be considered that the user wants to interact with the electronic device corresponding to the device image. In this case, the electronic device 100 skips a trigger operation of the user, and directly enters the control interface of the electronic device, thereby improving user experience.

In this disclosure, the manner of entering the viewfinder interface 530 shown in FIG. 5A to FIG. 5D is optional. The electronic device 100 may alternatively enter the viewfinder interface 530 in another manner. For example, FIG. 7A and FIG. 7B further provide a manner of entering the viewfinder interface 530.

Figure 7A:
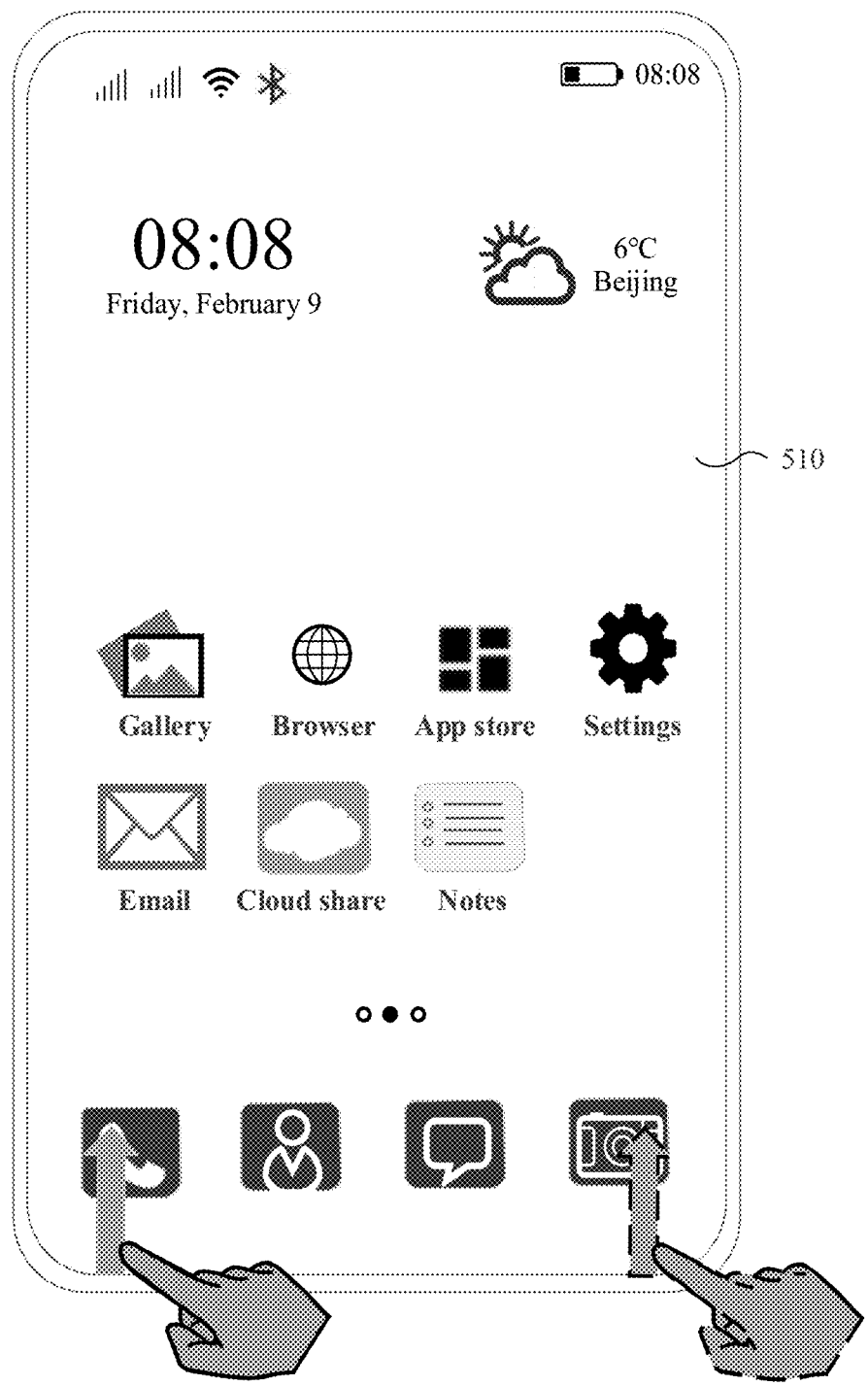
FIG. 7A, FIG. 7B, and FIG. 7C are schematic diagrams of another group of interfaces according to an embodiment of this disclosure.

As shown in FIG. 7A, a user interface 510 is displayed in FIG. 7A. For descriptions of the user interface 510, refer to the related descriptions of FIG. 5A. When the electronic device 100 detects a user operation on the left side of the bottom of the electronic device, or when the electronic device 100 detects a user operation on the right side of the bottom of the electronic device, the electronic device 100 displays a user interface 710 shown in FIG. 7B.

The user interface 710 may include one or more of the following: a connection device selection bar 701, a control 702A, a control 702B, a device display bar 703, and a real-time viewfinder control 704.

The connection device selection bar 701 includes a device option (which may alternatively be referred to as a device icon) of one or more nearby devices, such as HUAWEI Vision, MATEPAD, MATEBOOK, and a sound box. The device option displayed in an area 1202 may be used to trigger a share operation. In response to a detected operation (for example, a tap operation on a device icon) performed on a device option, the electronic device 100 may trigger a process of sharing selected data or a task to a device corresponding to the device option selected in the operation. The process may include the following. The electronic device 100 establishes a communication connection to a device corresponding to the selected device option, and then transmits, by using the communication connection, the selected data or task to the device corresponding to the device option.

The control 702A indicates a preset mode. In the preset mode, one or more devices may be controlled in a unified manner. For example, the preset mode is a go home mode. In the go home mode, electronic devices corresponding to a device icon 703B, a device icon 703C, and a device icon 703F are automatically turned on, and electronic devices corresponding to a device icon 703A and a device icon 703D are automatically turned off.

The control 702B indicates another preset mode. In the preset mode, one or more devices may be controlled in a unified manner. For example, the preset mode is a leave home mode. In the leave home mode, the electronic devices corresponding to the device icon 703B, the device icon 703C, and the device icon 703F are automatically turned off, and the electronic devices corresponding to the device icon 703A and the device icon 703D are automatically turned on.

The device display bar 703 includes a plurality of device icons, such as, a HUAWEI AI sound box 703A, a smart TV 703B, an air purifier 703C, a smart desk lamp 703D, a BLUETOOTH headset 703E, and an air conditioner partner 703F. Any one of the device icons displayed in the device display bar 703 may receive an input operation (for example, a tap operation) of the user, and in response to the detected input operation, the electronic device 100 displays a control interface of the device.

The air purifier 703C includes a control 7031, and the control 7031 is configured to control on and off of the air purifier 703C. The smart desk lamp 703D and the air conditioner partner 703F also include a same control as the control 7031. The devices such as the HUAWEI artificial intelligence (AI) sound box 703A and the smart TV 703B cannot be turned on and off by using the user interface 710.

The real-time viewfinder control 704 is configured to trigger entering of a viewfinder interface. When the electronic device 100 detects a user operation on the real-time viewfinder control 704, the electronic device 100 displays the viewfinder interface 530 shown in FIG. 5F. Optionally, the electronic device 100 displays the viewfinder interface 530 shown in FIG. 5E, and then displays the viewfinder interface 530 shown in FIG. 5F.

In some embodiments, the real-time viewfinder control 704 in the user interface 710 is optional, and the electronic device 100 may not display the real-time viewfinder control 704. When the electronic device 100 displays the user interface 710, and the electronic device 100 detects an uplift operation, the electronic device 100 may display the viewfinder interface 530. As shown in FIG. 7C, FIG. 7C shows an example of an uplift operation. The electronic device 100 displays a user interface 710 at a moment T1. When the electronic device 100 detects the uplift operation, the electronic device 100 displays the viewfinder interface 530 at a moment T2. A time interval between the moment T1 and the moment T2 is less than a threshold.

It may be understood that the uplift operation is merely an example of a user operation, and the electronic device 100 may further enter the viewfinder interface 530 by using another user operation.

This disclosure is not limited to the foregoing manner of opening the viewfinder interface 530. In this disclosure, a camera may be started by using, for example, a camera application, to enter the viewfinder interface 530, or another application such as an instant messaging application or a payment application is used to trigger entering of the viewfinder interface 530.

In this disclosure, display forms of the device icon 5311, the device icon 5321, the device icon 5331, and the device icon 5341 in the viewfinder interface 530 shown in FIG. 5F are optional. FIG. 8A to FIG. 8D alternatively provide a display form of a device icon. The device icon may change with displayed content in the viewfinder interface. At a first moment, a display area of the device is in a first location in the viewfinder interface, and the device icon of the device is displayed at the first location or close to the first location in the viewfinder interface. At the second moment, if the display area of the device is in a second location in the viewfinder interface, the device icon of the device is displayed in the second location in the viewfinder interface or close to the second location.

Figure 8A:
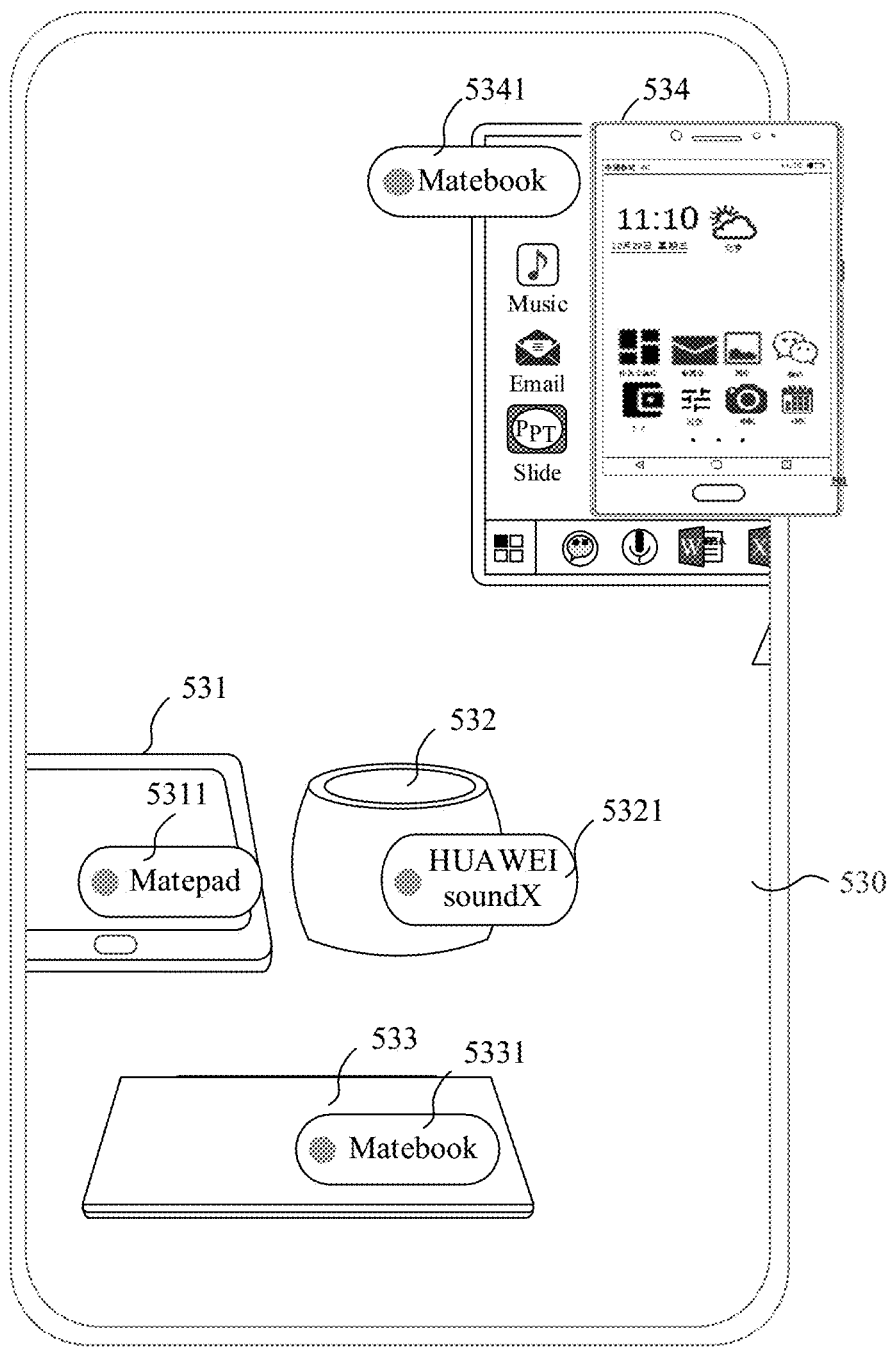
FIG. 8A, FIG. 8B, FIG. 8C, FIG. 8D, and FIG. 8E are schematic diagrams of another group of interfaces according to an embodiment of this disclosure.

As shown in FIG. 8A, a user interface 530 is displayed in FIG. 8A. For descriptions of FIG. 8A, refer to the related descriptions of FIG. 5F. For example, the viewfinder interface 530 in FIG. 8A includes a device image 534, a device icon 5341 is displayed near the device image 534 in the viewfinder interface 530, and the device icon 5341 partially overlaps a display area of the device image 534. The viewfinder interface 530 includes a device image 531, a device icon 5311 is displayed near the device image 531 in the viewfinder interface 530, and the device icon 5311 completely overlaps a display area of the device image 531.

It can be learned that a display area of a device icon corresponds to a display area of a corresponding device image.

In some embodiments, when the displayed content in the viewfinder interface keeps changing, the electronic device 100 does not display the device icon until duration of a static state of the electronic device 100 exceeds preset time, and the electronic device 100 displays the device icon based on the display content in the viewfinder interface. Further, the electronic device 100 may determine the static state of the electronic device 100 by using an acceleration sensor and/or a gyroscope sensor.

In some embodiments, a display area of a device icon is related to a display area of another device icon. For example, display areas of the device icons do not block each other.

Figure 8B:
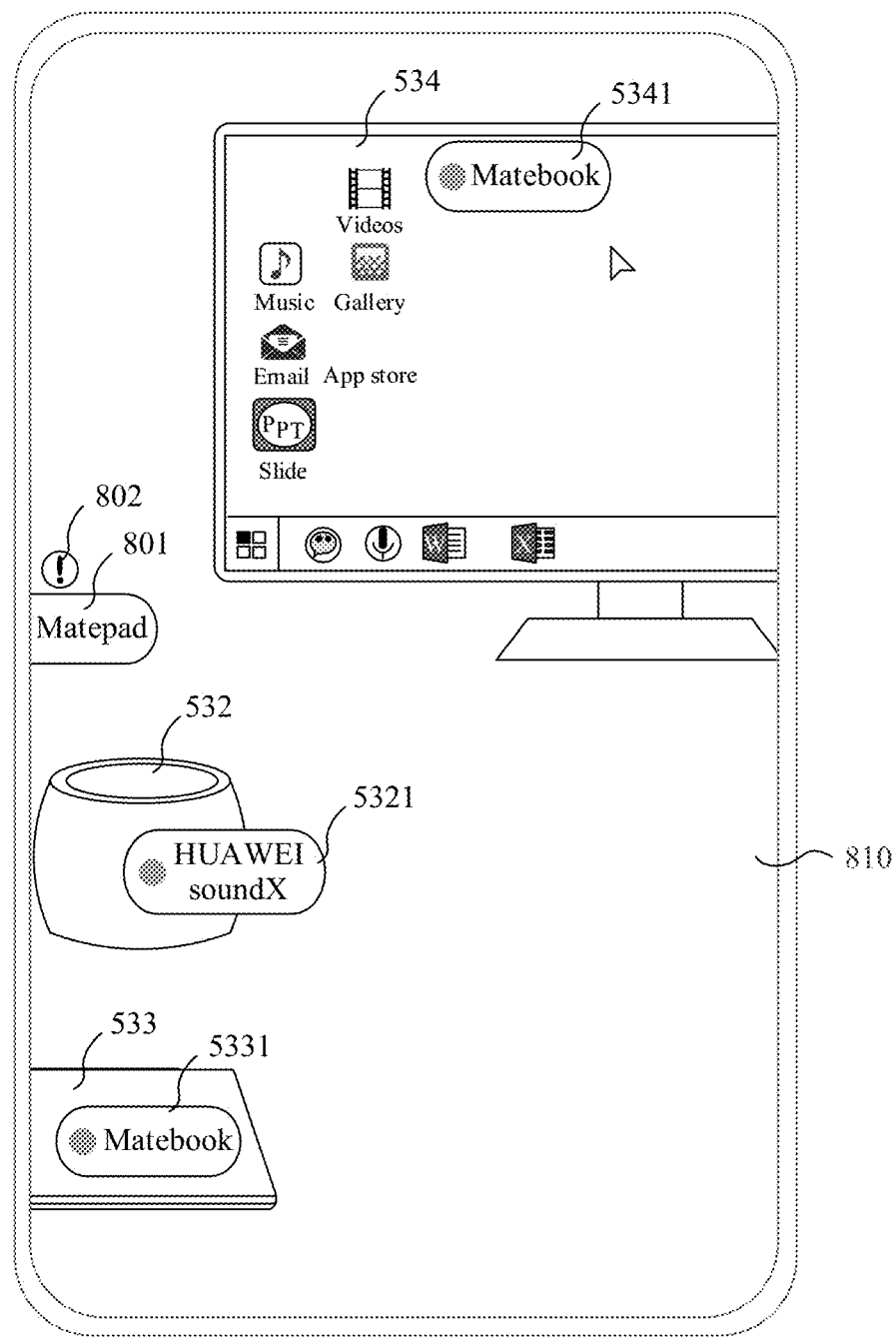

Compared with that in FIG. 8A, a shooting direction or angle in FIG. 8B is different from that in FIG. 8A. In a viewfinder interface 810 in FIG. 8B, there are more display parts of the device image 534, and a display area of the device icon 5341 completely overlaps a display area of the device image 534.

Figure 8C:
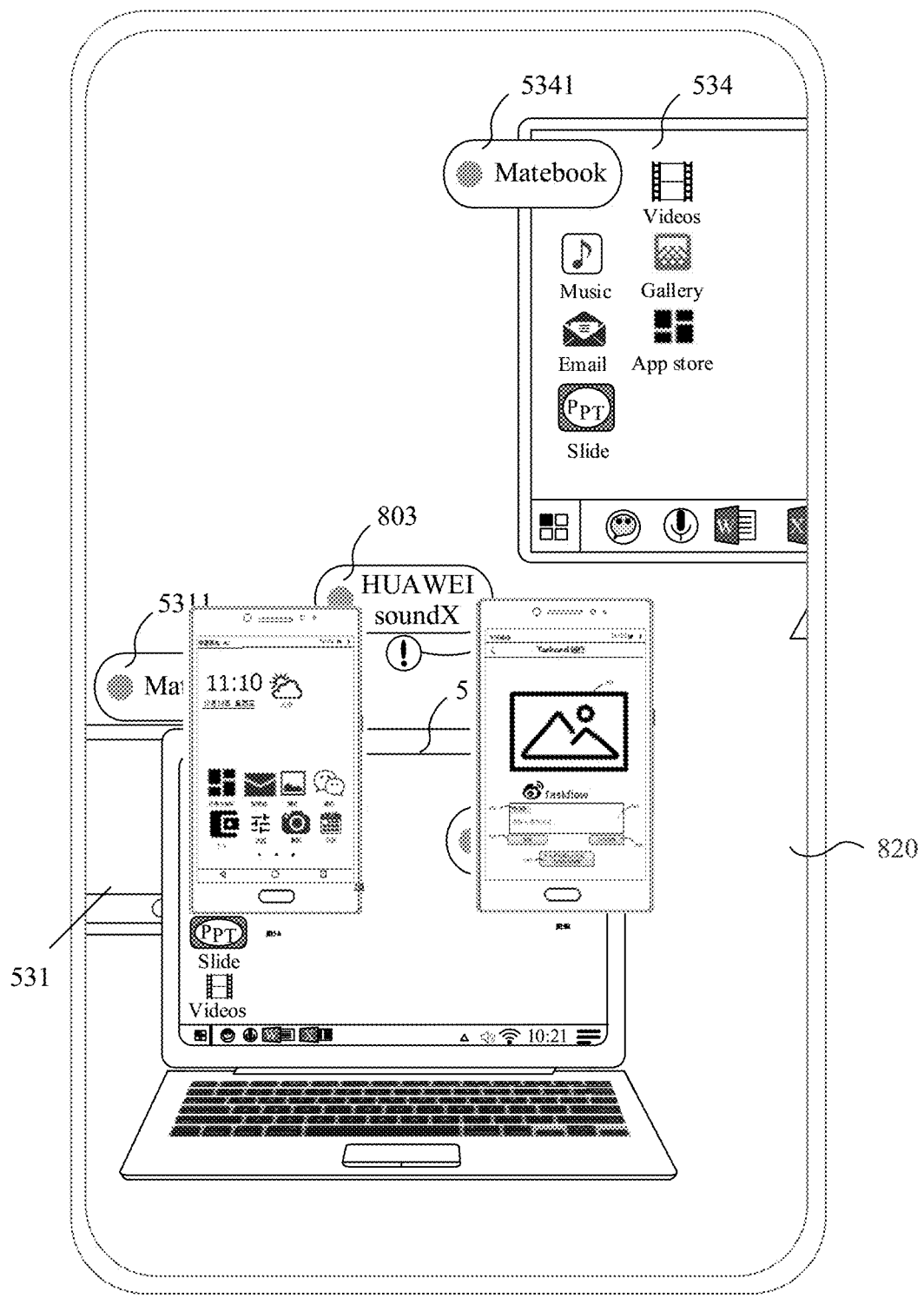

Compared with that in FIG. 8A, in a viewfinder interface 820 in FIG. 8C, the device image 531 partially overlaps the device image 533, and the device icon 5311 is displayed above the device image 531 and is close to a display area of the device image 531. A display area of the device icon 5311 does not overlap the display area of the device image 531.

It can be learned that a display area of a device icon may change with a display area of a device image. For example, according to the change of the display area of the device image in the viewfinder interface 530, the display area of the device icon may be a central location (or any location) of the display area of the device image. The display area of the device icon may be an upper (lower, left, or right) part of the display area of the device image.

In some embodiments, when a device is not within a shooting range of the camera, the viewfinder interface of the electronic device 100 does not include a device image of the device. A device icon of the device may be displayed in the viewfinder interface in a specific manner.

The electronic device 100 enters a viewfinder interface, starts a camera, and displays, in the viewfinder interface in real time, an image captured by using the camera, and sends a detection request with a wireless positioning technology. The electronic device 100 determines a nearby device of the electronic device 100 based on a received detection response for the detection request, and further determines one or more pieces of information of a device name, a device type, and a physical distance or an angle from the nearby device. The electronic device 100 performs image recognition on the image captured by the camera, and identifies an electronic device (for example, a sound box, a computer, or a tablet computer) in the image.

If the electronic device 100 receives four detection responses, the electronic device detects that there are four electronic devices nearby. The detection responses carry identity information of the devices, for example, information such as device names and device types. The electronic device 100 determines the device names, the device types, and the like of the four electronic devices, for example, MATEPAD (device type: tablet computer), HUAWEI soundX (device type: sound box), MATEBOOK (device type: computer), and MATEBOOK (device type: computer), and determines orientation information (physical distances and angles between the four electronic devices and the electronic device 100) by using a wireless positioning technology.

An image captured by the electronic device 100 includes images of only three electronic devices. The electronic device 100 determines, based on the orientation information of the four electronic devices, that one of the electronic devices is not in a shooting range of the camera of the electronic device 100, or the electronic device 100 identifies the device types of the three electronic devices by using a computer vision technology, and determines, with reference to the device types of the four electronic devices, an electronic device that is not in the image and a device type, and then the electronic device 100 displays, in the image in a first preset manner, a device icon of the electronic device that is not in the image. For example, the first preset manner may be displaying at a fixed location in the viewfinder interface, or may be displaying at a location related to the orientation information.

For example, as shown in FIG. 8A, in the viewfinder interface 530 in FIG. 8A, the device image 531 is a partially displayed image of the device 202, the device icon 5311 is displayed near the device image 531 in the viewfinder interface 530, and the display area of the device icon 5341 completely overlaps the display area of the device image 534.

Compared with that in FIG. 8A, a shooting direction or angle in FIG. 8B is different from that in FIG. 8A. In this case, the device 202 is not in the shooting range of the camera, and the viewfinder interface 810 in FIG. 8B does not include a device image of the device 202. The viewfinder interface 810 displays an icon 801 and a prompt 802. The prompt 802 is configured to prompt the user that the icon 801 is a special icon. The icon 801 is displayed on the left edge of the viewfinder interface 810 of the electronic device 100, to prompt the user that a device MATEPAD exists outside the shooting range of the camera of the electronic device 100. Optionally, the icon 801 may trigger the electronic device to display a control interface of the device image 531.

In some embodiments, the icon 801 or the prompt 802 may indicate an orientation (including an angle, a distance, and the like) of the device. For example, the icon 801 is displayed on the left edge of the viewfinder interface 810 of the electronic device, to prompt the user that there is a device MATEPAD on the left side of the electronic device 100 outside the shooting range of the camera of the electronic device 100. Optionally, the orientation of the device may be indicated in a text manner.

In this disclosure, when the foregoing device MATEPAD is referred to as a third electronic device, the icon 801 or the prompt 802 may alternatively be referred to as a third label.

In some embodiments, when a device is blocked by another object, the viewfinder interface of the electronic device 100 does not include a device image of the device. A device icon of the device may be displayed in the viewfinder interface in a specific manner.

If the electronic device 100 receives four detection responses, the electronic device detects that there are four electronic devices nearby. The detection responses carry identity information of the devices, for example, information such as device names and device types. The electronic device 100 determines the device names, the device types, and the like of the four electronic devices, for example, MATEPAD (device type: tablet computer), HUAWEI soundX (device type: sound box), MATEBOOK (device type: computer), and MATEBOOK (device type: computer), and determines orientation information (physical distances and angles between the four electronic devices and the electronic device 100) by using a wireless positioning technology.

An image captured by the electronic device 100 includes images of only three electronic devices. The electronic device 100 detects, based on the orientation information of the four electronic devices, that all the four electronic devices are in the shooting range of the camera of the electronic device 100, and then determines that an electronic device is blocked. The electronic device 100 identifies the device types of the three electronic devices in the image by using a computer vision technology, and determines the blocked electronic device and the device type with reference to the device types of the four electronic devices. The electronic device 100 displays a device icon of the blocked electronic device in the image in a second preset manner. For example, the second preset manner may be displaying at a fixed location in the viewfinder interface, or may be displaying at a location related to the orientation information.

For example, as shown in FIG. 8C, compared with that in FIG. 8A, the viewfinder interface 820 in FIG. 8C does not include a device image 532. The viewfinder interface 820 displays an icon 803 and a prompt 804. The prompt 804 is configured to prompt the user that the icon 803 is a special icon. The icon 803 is displayed in a middle area of the viewfinder interface 820 of the electronic device 100, to prompt the user that the device HUAWEI soundX exists in the shooting range of the camera of the electronic device 100. Optionally, the icon 803 may trigger the electronic device 100 to display a control interface of the device image 532 (namely, HUAWEI soundX).

In some embodiments, the icon 803 or the prompt 804 may indicate an orientation (including an angle, a distance, and the like) of the device. For example, the icon 803 is displayed above the device image 5331 in the viewfinder interface 820 of the electronic device 100, and is used to prompt the user that the device HUAWEI soundX is blocked by the device 203 corresponding to the device image 5331. Optionally, an orientation of a device may alternatively be indicated in a text manner (for example, HUAWEI soundX is right behind the device image 5331), or that a device is blocked is indicated in a text manner.

Optionally, a display area of the icon 803 does not overlap a display area of another device image and a display area of a device icon. The electronic device 100 determines the display area of the icon 803 based on display areas of the device image 531, the device image 533, the device image 534, the device icon 5311, the device icon 5331, and the device icon 5341 that are displayed in the viewfinder interface 820.

In this disclosure, when the device HUAWEI soundX is referred to as a third electronic device, the icon 803 or the prompt 804 may alternatively be referred to as a second label.

In some embodiments, if another device does not have a wireless positioning technology that can be used for identification, the electronic device 100 identifies a type of the other device (such as a mobile phone, a tablet, a television, or a sound box) by using computer vision, to search for a device type corresponding to a device that logs in to a same account as the electronic device 100.

For example, if the electronic device 100 receives three detection responses, the electronic device detects that there are three electronic devices nearby. The detection responses carry identity information of the devices, for example, information such as device names and device types. The electronic device 100 determines that the three electronic devices are respectively MATEPAD (device type: tablet computer), HUAWEI soundX (device type: sound box), and MATEBOOK (device type: computer), and determines orientation information (physical distances and angles between the three electronic devices and the electronic device 100) by using a wireless positioning technology.

An image captured by the electronic device 100 includes images of four electronic devices. The electronic device 100 determines, by using a computer vision recognition technology, display areas of the images of the four electronic devices in the viewfinder interface, and determines that device types of the four electronic devices are respectively a tablet computer, a sound box, a computer, and a computer. In this case, the electronic device 100 searches for a computer in devices that are logged in to by using a same account as the electronic device 100. Electronic devices have respective login accounts. One account may be bound to one or more electronic devices. The electronic device 100 searches for, under the account of the electronic device 100, whether there is a bound electronic device whose device type is a computer. If yes, the electronic device 100 considers that the computer has an association relationship with the device image in the image. The electronic device 100 displays the device icon of the computer in the image in a preset manner. For example, the preset manner may be displaying at a fixed location in the viewfinder interface, or may be displaying at a location related to a display area of the device image in the image.

Figure 8D:
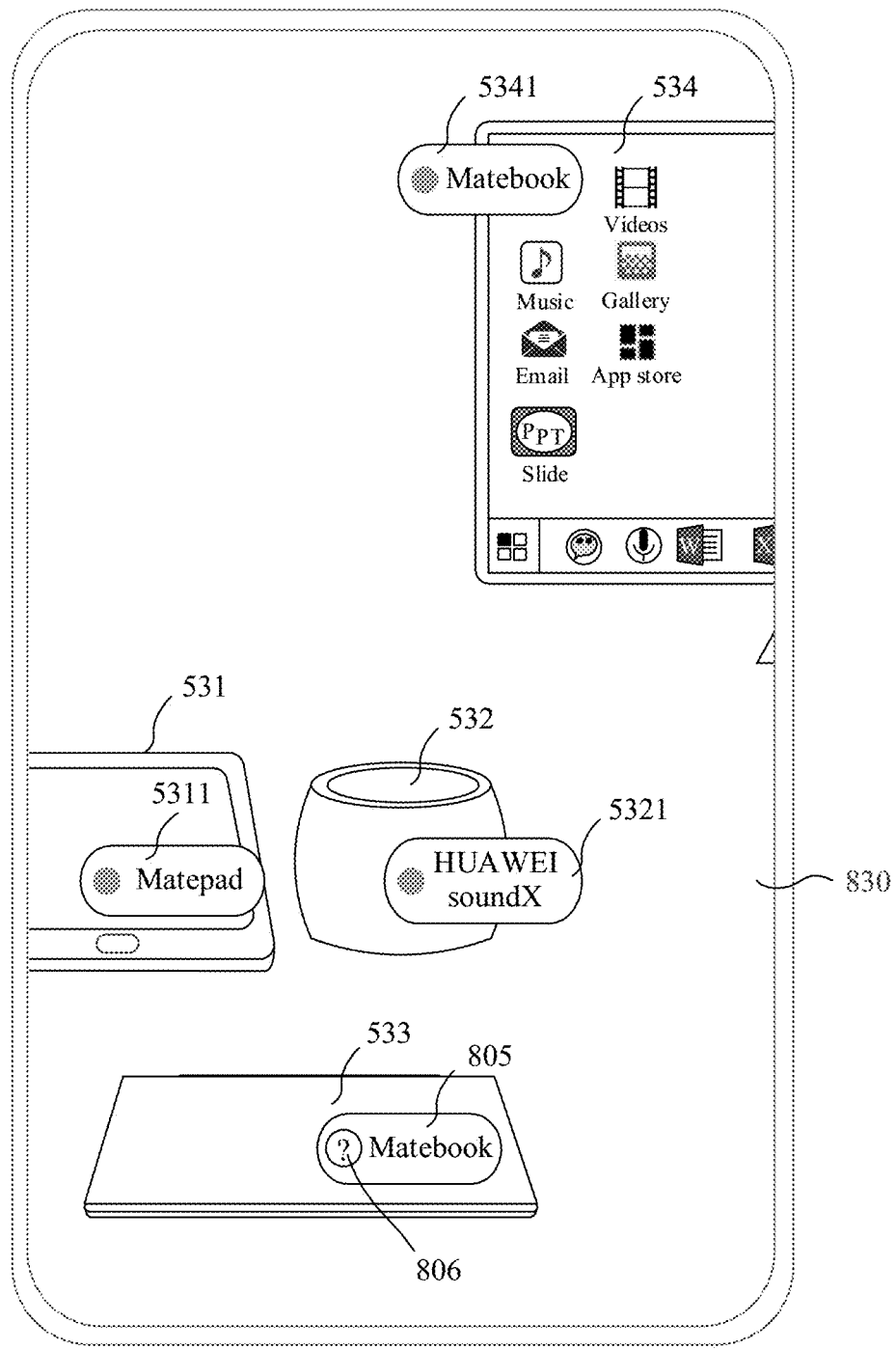

For example, as shown in FIG. 8D, compared with that in FIG. 8A, the viewfinder interface 830 includes a device icon 805 and a prompt 806. The prompt 806 is configured to indicate that the device icon 805 is an uncertain icon, indicating that there is an uncertain association relationship between a device corresponding to the device image 533 and the device icon 805.

In this disclosure, when the device corresponding to the device image 533 is referred to as a fourth electronic device, the device icon 805 or the icon 806 may alternatively be referred to as a fourth label.

In some embodiments, if another device does not have a wireless positioning technology that can be used for identification, the electronic device 100 identifies a device type (such as a mobile phone, a tablet, a television, or a sound box) by using computer vision, and searches, by using GPS information of the electronic device 100, for a device type corresponding to a device that is at a same geographical location as the electronic device 100.

For example, if the electronic device 100 receives three detection responses, the electronic device detects that there are three electronic devices nearby. The detection responses carry identity information of the devices, for example, information such as device names and device types. The electronic device 100 determines that the three electronic devices are respectively MATEPAD (device type: tablet computer), HUAWEI soundX (device type: sound box), and MATEBOOK (device type: computer), and determines orientation information (physical distances and angles between the three electronic devices and the electronic device 100) of the three electronic devices by using a wireless positioning technology.

An image captured by the electronic device 100 includes images of four electronic devices. The electronic device 100 determines, by using a computer vision recognition technology, display areas of the images of the four electronic devices in the viewfinder interface, and determines that device types of the four electronic devices are respectively a tablet computer, a sound box, a computer, and a computer. In this case, the electronic device 100 searches for a computer in electronic devices that are at a same geographical location as the electronic device 100.

A configuration interface of each electronic device may include a configuration of a geographical location. For example, when the electronic device 100 is paired with and connected to a smart desk lamp, the user configures a device location of the smart desk lamp as a room in application software (for example, Smart life) associated with the smart desk lamp, when the electronic device 100 is paired with and connected to a smart sound box, the user configures a device location of the smart sound box as a living room in the application software (for example, Smart life) associated with the smart sound box, and when the electronic device 100 is paired with and connected to a computer, the user configures a device location of the computer as a company in the application software (for example, Smart life) associated with the computer. The electronic device 100 determines, based on a geographical location of the electronic device, an area in which the electronic device 100 is located. For example, the electronic device 100 obtains, through GPS positioning, that a location of the electronic device 100 is in a company, and then searches, in electronic devices whose device locations are configured in the company, for an electronic device whose device type is a computer. If yes, the electronic device 100 considers that the computer has an association relationship with the device image in the image. The electronic device 100 displays the device icon of the computer in the image in a preset manner. For example, the preset manner may be displaying at a fixed location in the viewfinder interface, or may be displaying at a location related to a display area of the device image in the image. For content of this part, refer to the related descriptions in FIG. 8D.

In this disclosure, when the device corresponding to the device image 533 is referred to as a fifth electronic device, the device icon 805 or the icon 806 may alternatively be referred to as a fifth label.

In some embodiments, if another device does not have a wireless positioning technology that can be used for identification, and the electronic device 100 cannot correctly identify location information of two devices of a same type, the electronic device outputs two labels for the user to select.

For example, an image captured by the electronic device 100 includes images of two electronic devices. The electronic device 100 determines, by using a computer vision recognition technology, display areas of the images of the two electronic devices in the viewfinder interface, and determines that device types of the two electronic devices each are a sound box. The electronic device 100 does not receive a detection response, and cannot determine orientations of the two sound boxes.

The electronic device 100 may search, in the manners described in the foregoing two embodiments, for whether a corresponding device type exists on a device that logs in to a same account as the electronic device 100, or search, by using GPS information of the electronic device 100, for whether a corresponding device type exists on a device that is at a same geographical location as the electronic device 100. If the electronic device 100 determines a device whose device type is a sound box in the two manners, the electronic device 100 displays a device icon of the sound box in the image in a preset manner. For example, the preset manner may be displaying at a fixed location in the viewfinder interface, or may be displaying at a location related to a display area of a device image in the image.

If the electronic device 100 determines, in the two manners, two devices whose device types are sound boxes, because the electronic device 100 cannot one-to-one correspond device icons of the two sound boxes to two sound box images in the image, the electronic device 100 displays the device icons of the two sound boxes in the image in the preset manner. The preset manner may be, for example, displaying at a fixed location on the viewfinder interface, or may be, for another example, presented in the viewfinder interface in a form of a control. When the electronic device 100 detects a user operation on the control, the electronic device 100 outputs two device icons for the user to select.

Figure 8E:
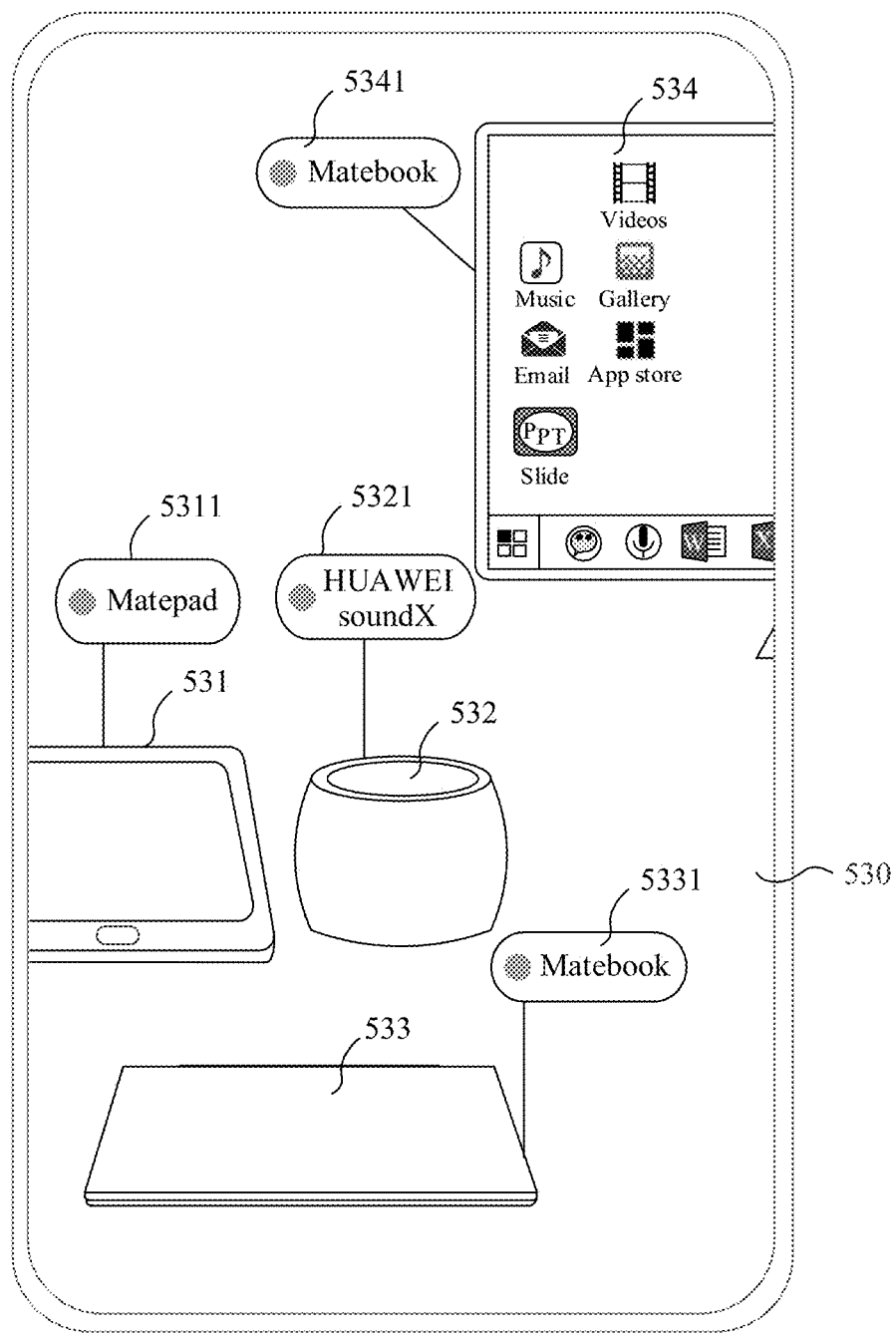

This disclosure further provides a display form of a device icon, to implement an effect that display areas of device icons do not overlap. As shown in FIG. 8E, FIG. 8E shows a display form in which a device icon is displayed in an upper area of a display area of a device image by using a line. As shown in FIG. 8E, a device image 531 and a device icon 5311 are connected by using a line, indicating that the device icon 5311 corresponds to the device image 531, a device image 532 and a device icon 5321 are connected by using a line, indicating that the device icon 5321 corresponds to the device image 532, a device image 533 and a device icon 5331 are connected by using a line, indicating that the device icon 5331 corresponds to the device image 533, and a device image 534 and a device icon 5341 are connected by using a line, indicating that the device icon 5341 corresponds to the device image 534.

In some embodiments, when the electronic device 100 detects that display areas of device icons overlap with each other, or a shortest distance between display areas of two device icons in the viewfinder interface is less than a threshold, the electronic device 100 outputs a device icon shown in FIG. 8E, so that the display areas of the device icons do not overlap.

Based on the viewfinder interface 530, this disclosure further provides a data transmission method. A user may quickly share selected data (for example, an image, a file, or a video) with another device in the viewfinder interface 530 by performing a slide operation (or a tap operation). In this way, operation steps of sharing data by the user can be simplified, and efficiency of sharing data with another device can be improved. The following separately uses three application scenarios as examples to describe the data transmission method in detail.

Application scenario 1: In user interface (UI) embodiments shown in FIG. 9A to FIG. 9E as examples, the user may trigger, in a multi-task interface, a sharing function based on augmented reality display, to share an application or data of an application in the multi-task interface with another device.

Figure 9A:
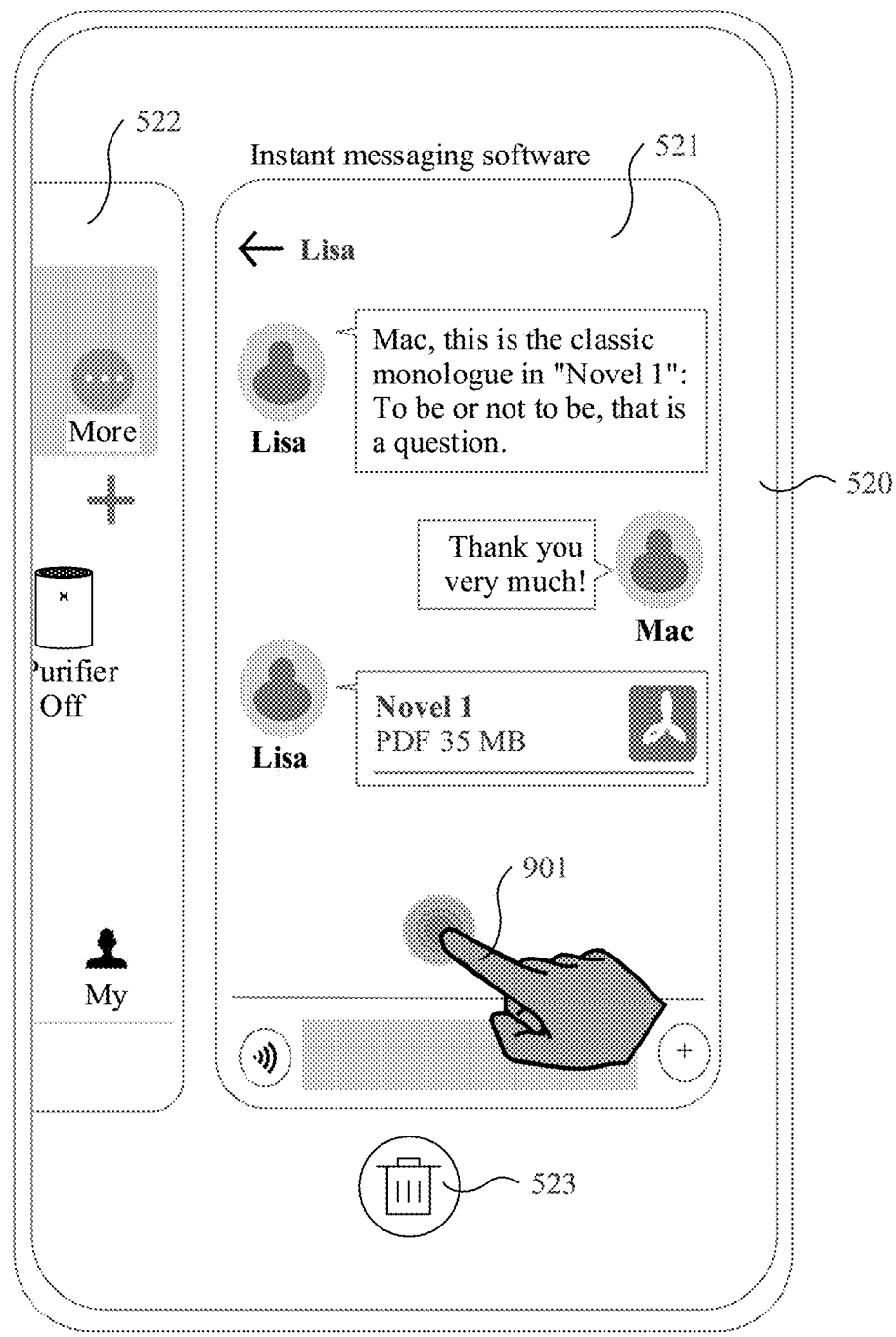
FIG. 9A, FIG. 9B, FIG. 9C, FIG. 9D, and FIG. 9E are schematic diagrams of another group of interfaces according to an embodiment of this disclosure.

As shown in FIG. 9A, a user interface 520 is displayed in FIG. 9A. For descriptions of the user interface 520, refer to the related descriptions of FIG. 5B. For example, when the electronic device 100 detects a touch and hold operation 901 for a card 521, the electronic device enters a sharing interface corresponding to the card 521. The electronic device 100 extracts an application corresponding to the card 521 and a type of data that can be shared in a current interface of the card 521, and presents them in the sharing interface in an icon manner.

Figure 9B:
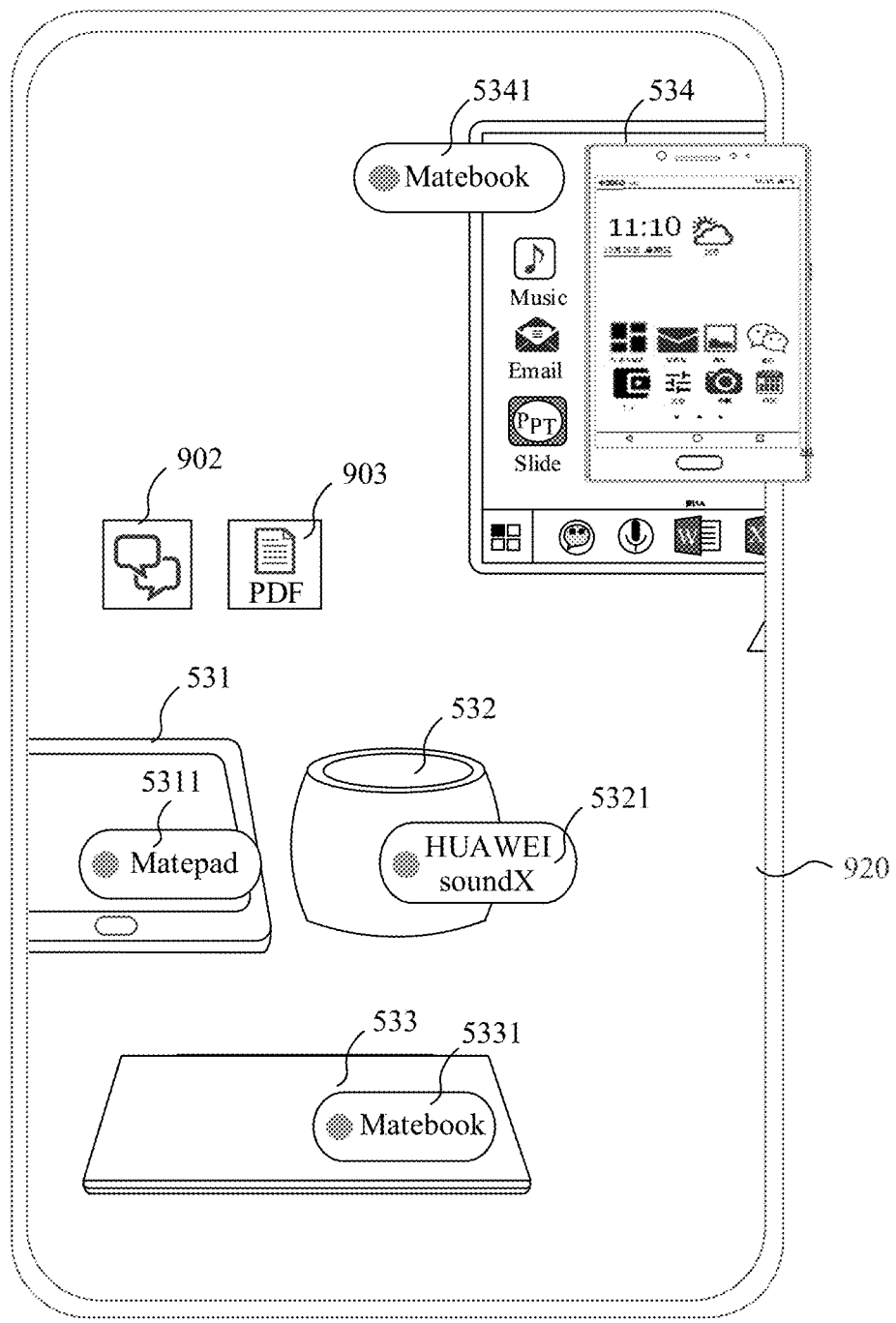

As shown in FIG. 9B, the electronic device 100 starts a camera, captures an image in real time by using the camera, and displays the image in the sharing interface 920. Displayed content of the sharing interface 920 includes the image captured by the camera. FIG. 9B shows an example of the sharing interface 920. The sharing interface 920 includes a device image 531, a device image 532, a device image 533, and a device image 534.

In the sharing interface 920, for specific descriptions of the device image 531, the device image 532, the device image 533, the device image 534, a device icon 5311, a device icon 5321, a device icon 5331, and a device icon 5341, refer to the related descriptions of the device image 531, the device image 532, the device image 533, the device image 534, the device icon 5311, the device icon 5321, the device icon 5331, and the device icon 5341 in FIG. 5F. Details are not described herein again.

The sharing interface 920 may further include one or more icons, and each of the one or more icons identifies one type of data that can be shared, for example, an application icon 902 and a file icon 903. The application icon 902 is associated with an application of the card 521, and the file icon 903 is associated with a Portable Document Format (PDF) document of "Novel 1" in the card 521.

Figure 9C:
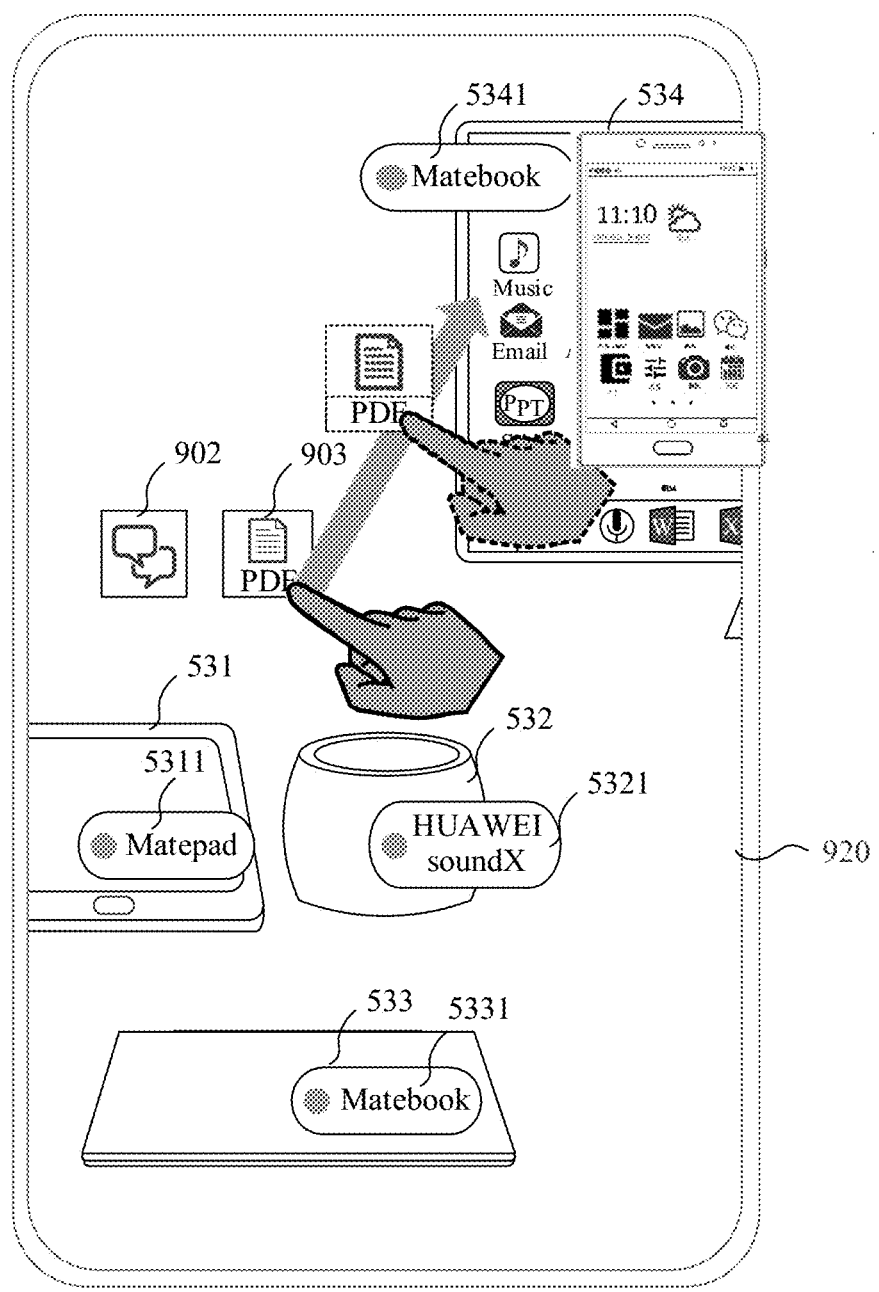

The user may drag an icon to a display area of a corresponding device in a dragging manner. After the user releases the icon, the electronic device 100 sends data corresponding to the icon to the device. As shown in FIG. 9C, after selecting the file icon 903, the user drags the file icon 903 in the sharing interface 920, and drags the file icon 903 to an effective area of the device image 534. The effective area is an area that may indicate the electronic device 100 to share data with an electronic device (the electronic device 204) corresponding to the device image 534. After the user releases the icon, the electronic device 100 sends, in a wireless communication manner, the PDF document of "Novel 1" associated with the file icon 903 to the electronic device (the electronic device 204) corresponding to the device image 534.

Further, the wireless communication manner includes but is not limited to ZIGBEE, BLUETOOTH, WI-FI, UWB), NFC, WI-FI direct connection (WI-FI Direct), and the like.

In some embodiments, when the user drags the file icon 903 to the display area of the device image 534, the electronic device 100 increases brightness of the display area of the device image 534 in the sharing interface 920, to indicate that the user drags the current file icon 903 to the effective area of the device image 534.

In some embodiments, the user drags the file icon 903 to a display area of the device icon 5341. After the user releases the icon, the electronic device 100 sends, in a wireless communication manner, the PDF document of "Novel 1" associated with the file icon 903 to the electronic device (the electronic device 204) corresponding to the device image 534.

Figure 9D:
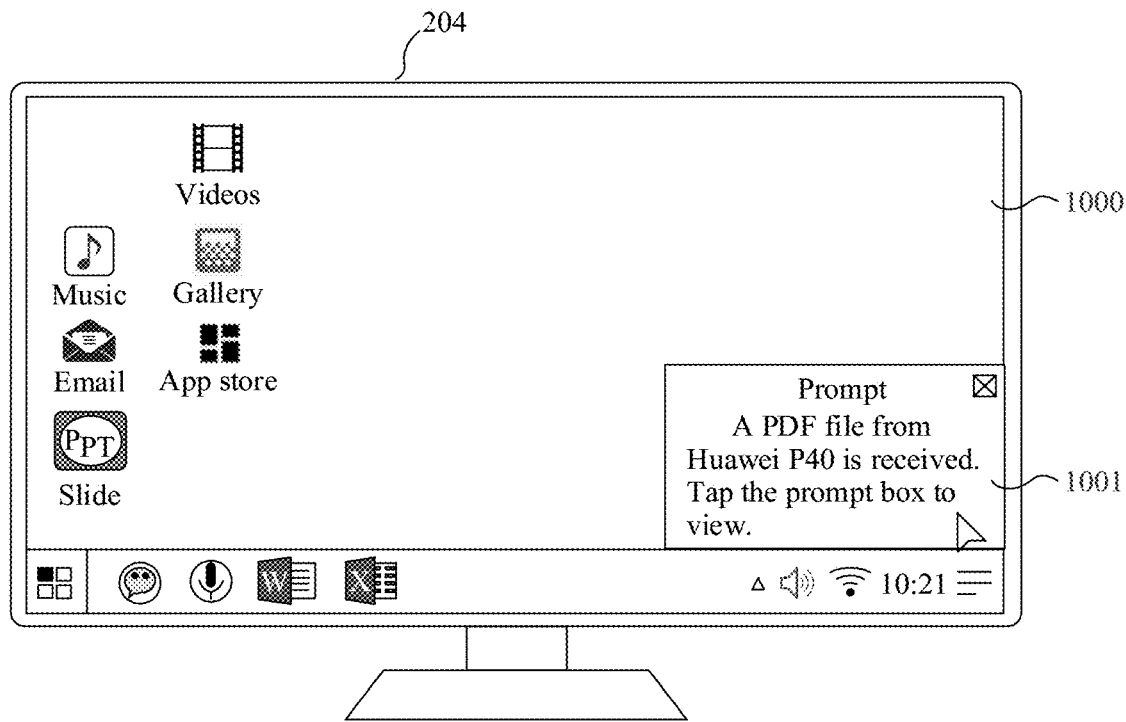
Figure 9E:
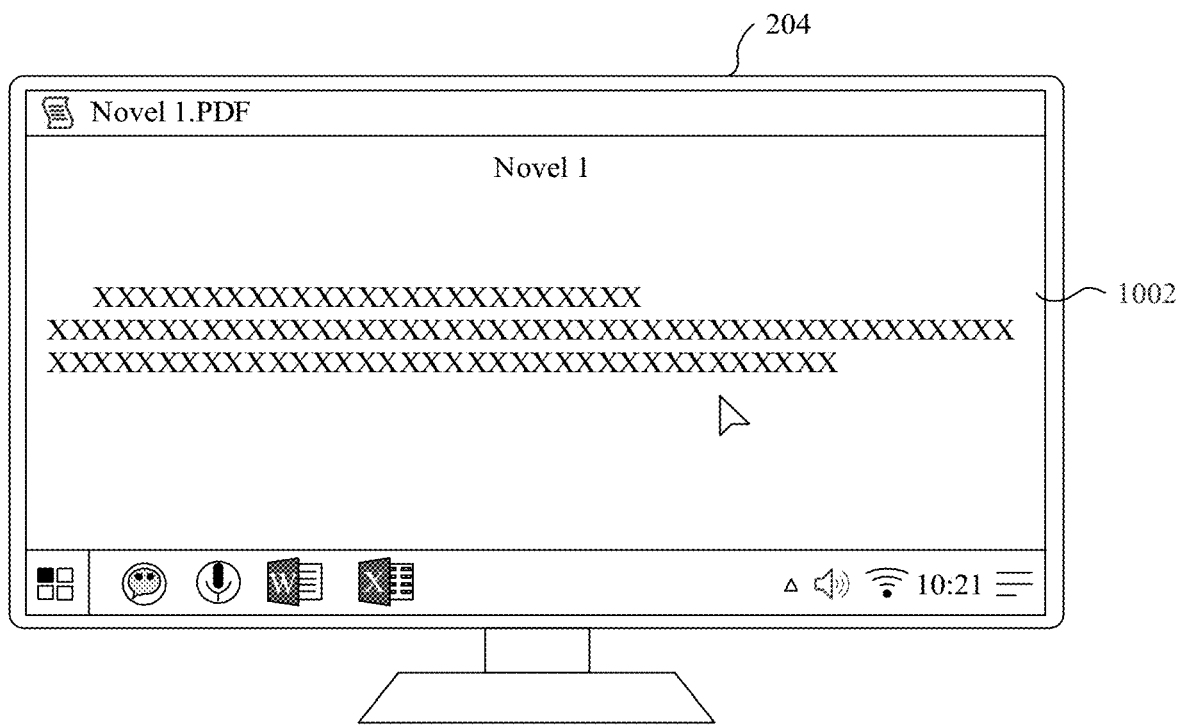

As shown in FIG. 9D, the electronic device 204 receives the PDF document of "Novel 1" sent by the electronic device, and outputs a prompt box 1001 in a display interface 1000 of the electronic device 204. Text content of the prompt box 1001 may be "A PDF file from the electronic device is received. Tap the prompt box to view". When the electronic device 204 detects a tap operation for the prompt box 1001, the electronic device 204 opens the PDF document of "Novel 1". As shown in FIG. 9E, the PDF document of the "Novel 1" is displayed in the display interface 1002 of the electronic device 204. In some embodiments, FIG. 9D is optional. The electronic device 204 receives the PDF document of "Novel 1" sent by the electronic device, and the electronic device 204 directly opens the document, as shown in FIG. 9E.

In this disclosure, a to-be-shared icon may alternatively be referred to as a first icon. After selecting the file icon 903, the user drags the file icon 903 in the sharing interface 920, and drags the file icon 903 to an effective area of the device image 534. The drag operation may alternatively be referred to as a third operation.

In some embodiments, the electronic device 100 may determine, based on a type of data that the user wants to share, whether a target device can support output of the data type. If the target device does not support the output of the data type, prompt information is displayed to prompt the user to select another device other than the target device.

Figure 10A:
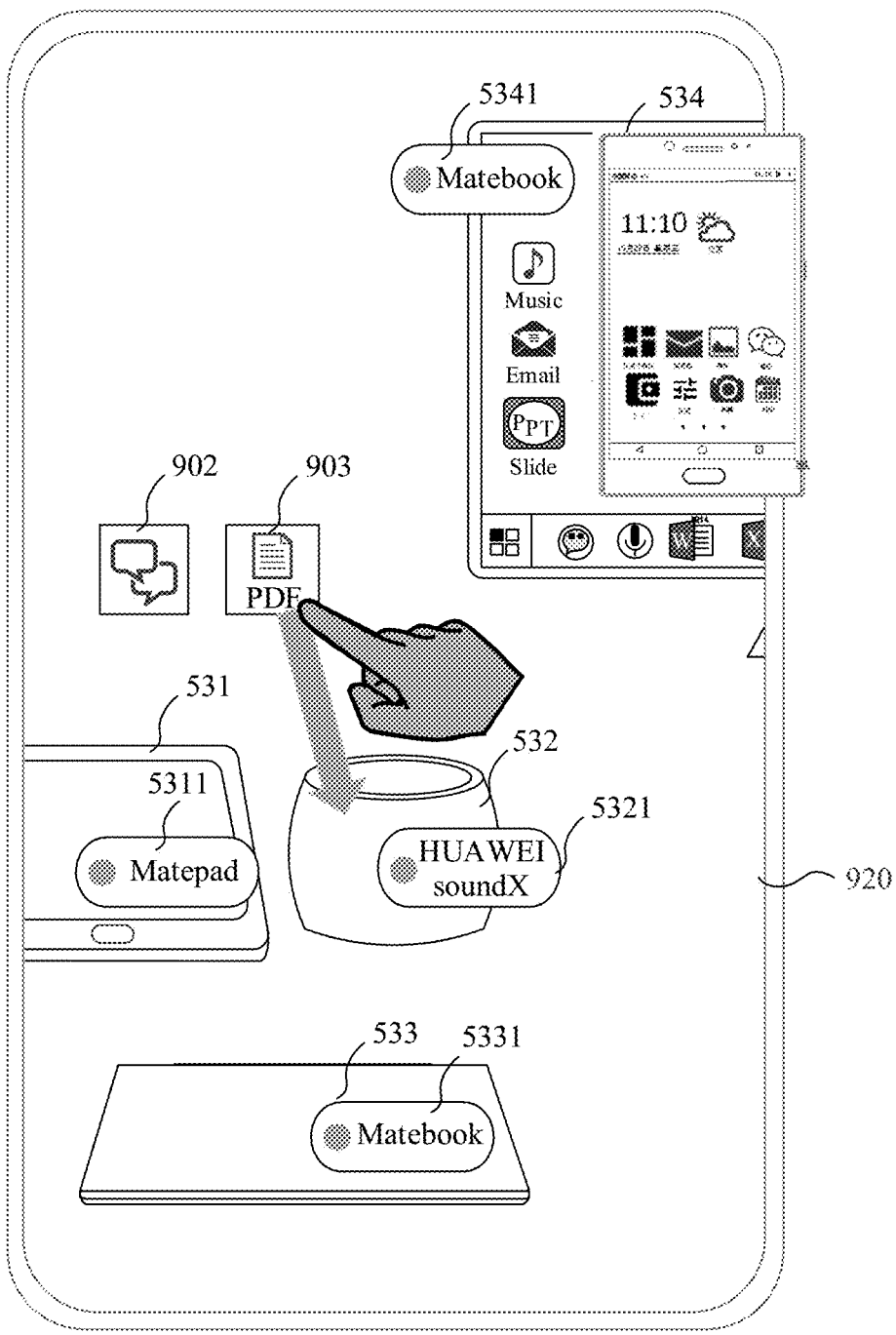
FIG. 10A, FIG. 10B, and FIG. 10C are schematic diagrams of another group of interfaces according to an embodiment of this disclosure.
Figure 10B:
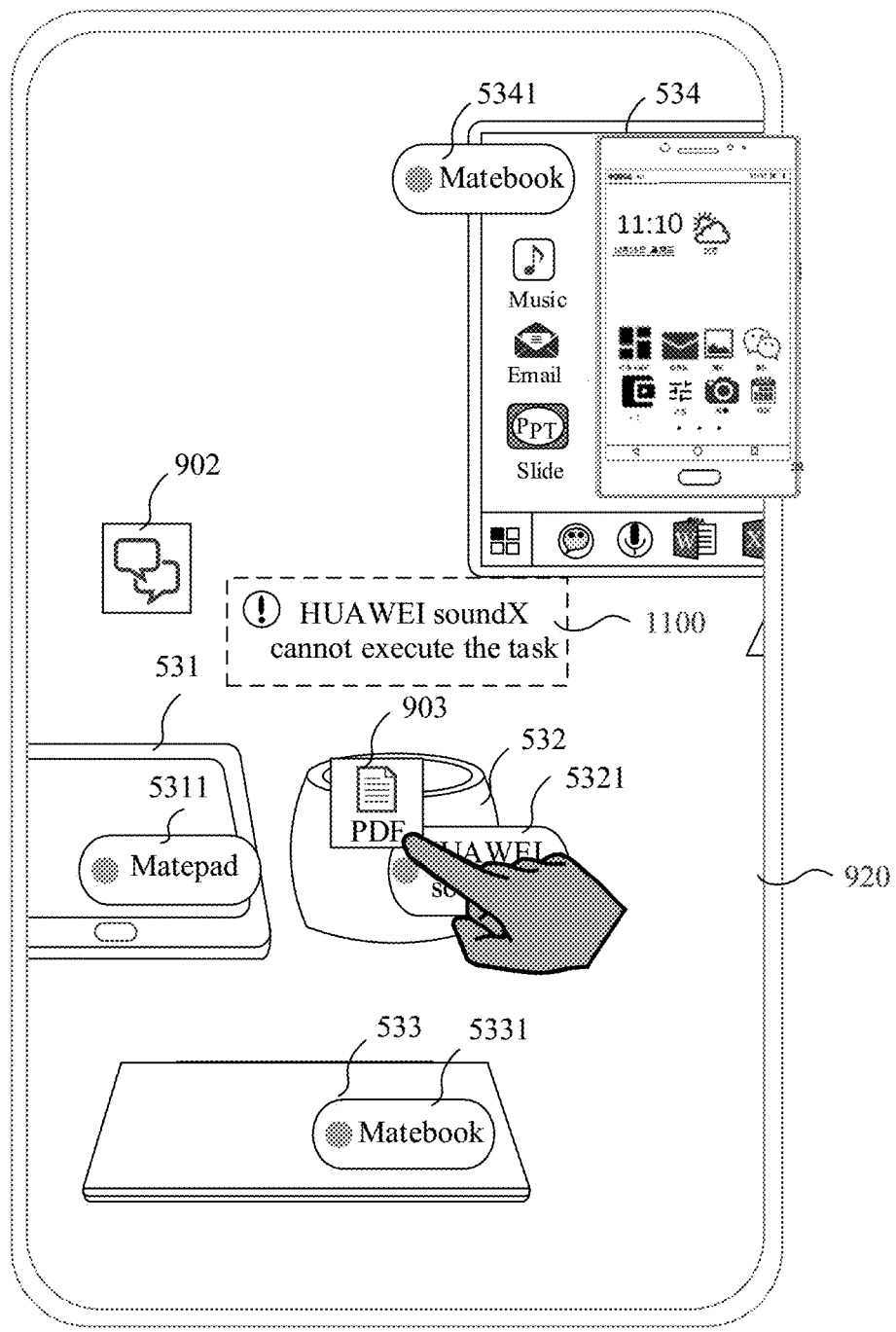

As shown in FIG. 10A and FIG. 10B, the electronic device drags the file icon 903 to the display area of the device image 532 in a dragging manner. A device type of the electronic device 201 corresponding to the device image 532 is an audio device, and a device attribute of the electronic device 201 does not include a display function. Therefore, when the electronic device detects that the user drags the file icon 903 to the display area of the device image 532, the electronic device 100 outputs prompt information 1100 "HUAWEI soundX cannot execute the task", to indicate that the electronic device corresponding to the device image 532 cannot output the PDF document corresponding to the file icon 903. Optionally, after the user drags the file icon 903 to the display area of the device image 532 and releases the icon, the electronic device 100 outputs the prompt information 1100.

This disclosure is not limited to the manners shown in FIG. 10A and FIG. 10B. In some embodiments, the user may be prompted, by using a display form of a device icon, of a selectable device for data sharing.

Figure 10C:
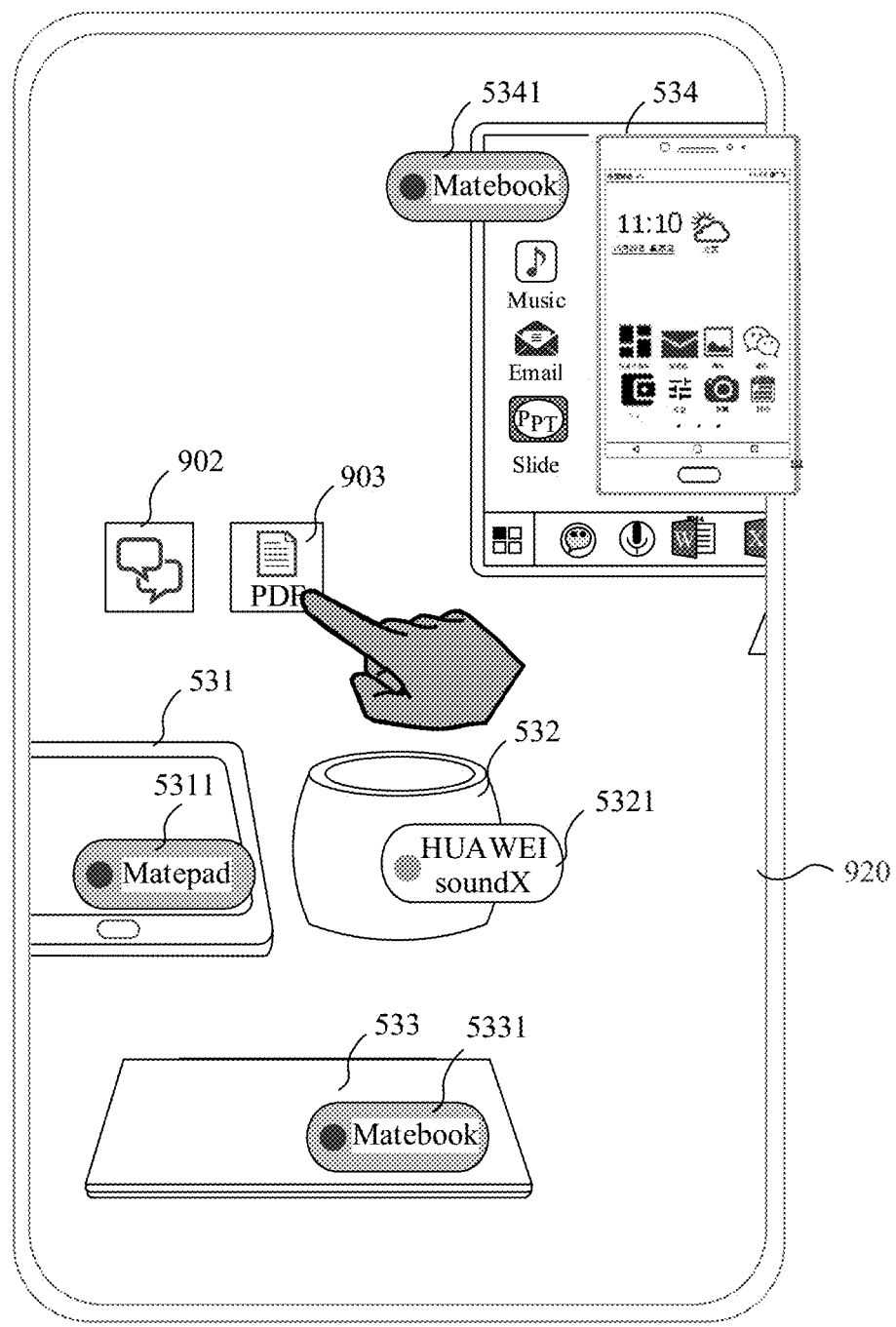

As shown in FIG. 10C, the user selects the file icon 903. Because the file icon 903 is associated with the PDF document of "Novel 1", when the electronic device detects that the file icon 903 is selected, display areas of a device icon 5311, a device icon 5331, and a device icon 5341 in the viewfinder interface 920 are brightened (or icon colors are changed). Optionally, display areas of a device image 531, a device image 533, and a device image 534 are brightened. This indicates that the electronic device 202, the electronic device 203, and the electronic device 204 respectively corresponding to the device image 531, the device image 533, and the device image 534 indicated by the device icon 5311, the device icon 5331, and the device icon 5341 are devices that support output of the PDF document associated with the file icon 903. The user is prompted to drag the file icon 903 to the display areas of these devices for data sharing.

Optionally, compared with that of the device icon 5311, the device icon 5331, and the device icon 5341, brightness (or color) of a display area of the device icon 5321 is different, indicating that the electronic device 201 corresponding to the device icon 5321 does not support output of the PDF document associated with the file icon 903, and prompting the user not to drag the file icon 903 to the display area of the device image 532.

In this disclosure, a display form of the device icon 5311, the device icon 5331, and the device icon 5341 may alternatively be referred to as a first display form, and a display form of the device icon 5321 may alternatively be referred to as a second display form. There may be more display forms of the device icon. This is not limited in this disclosure.

Application scenario 2: In UI embodiments shown in FIG. 11A to FIG. 11D as examples, the user may trigger, by using a screenshot operation, a sharing function based on augmented reality display, to share a screenshot image with another device.

Figure 11A:
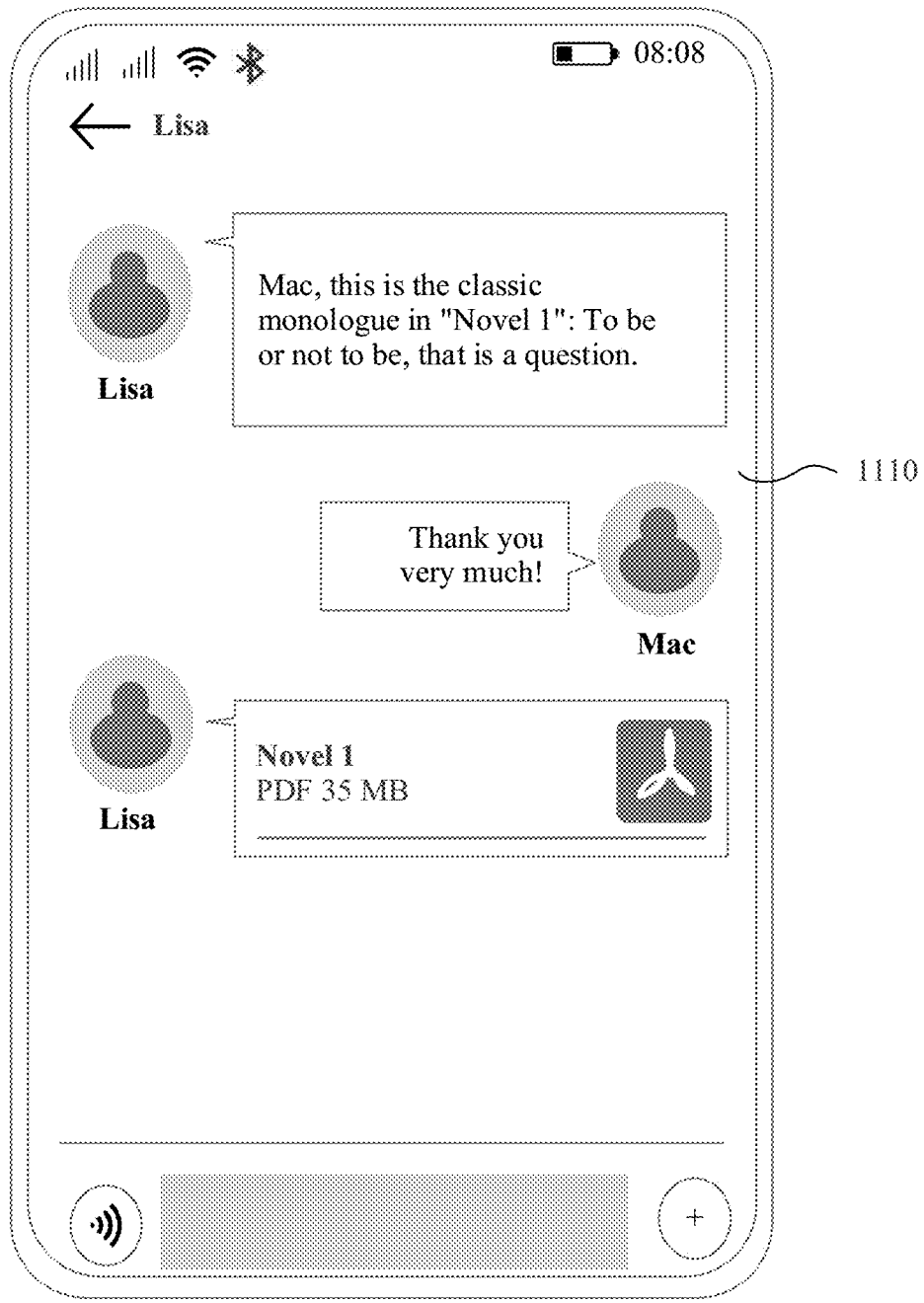
FIG. 11A, FIG. 11B, FIG. 11C, and FIG. 11D are schematic diagrams of another group of interfaces according to an embodiment of this disclosure.

As shown in FIG. 11A, FIG. 11A shows a user interface 1110. Optionally, the user interface 1110 may be any display interface of the electronic device. When the electronic device 100 displays the user interface 1110 and receives a screenshot operation, the electronic device 100 collects display content of a current interface, and generates a picture file. The screenshot operation may be triggered by using one or more virtual buttons, or may be triggered by using one or more physical buttons.

Figure 11B:
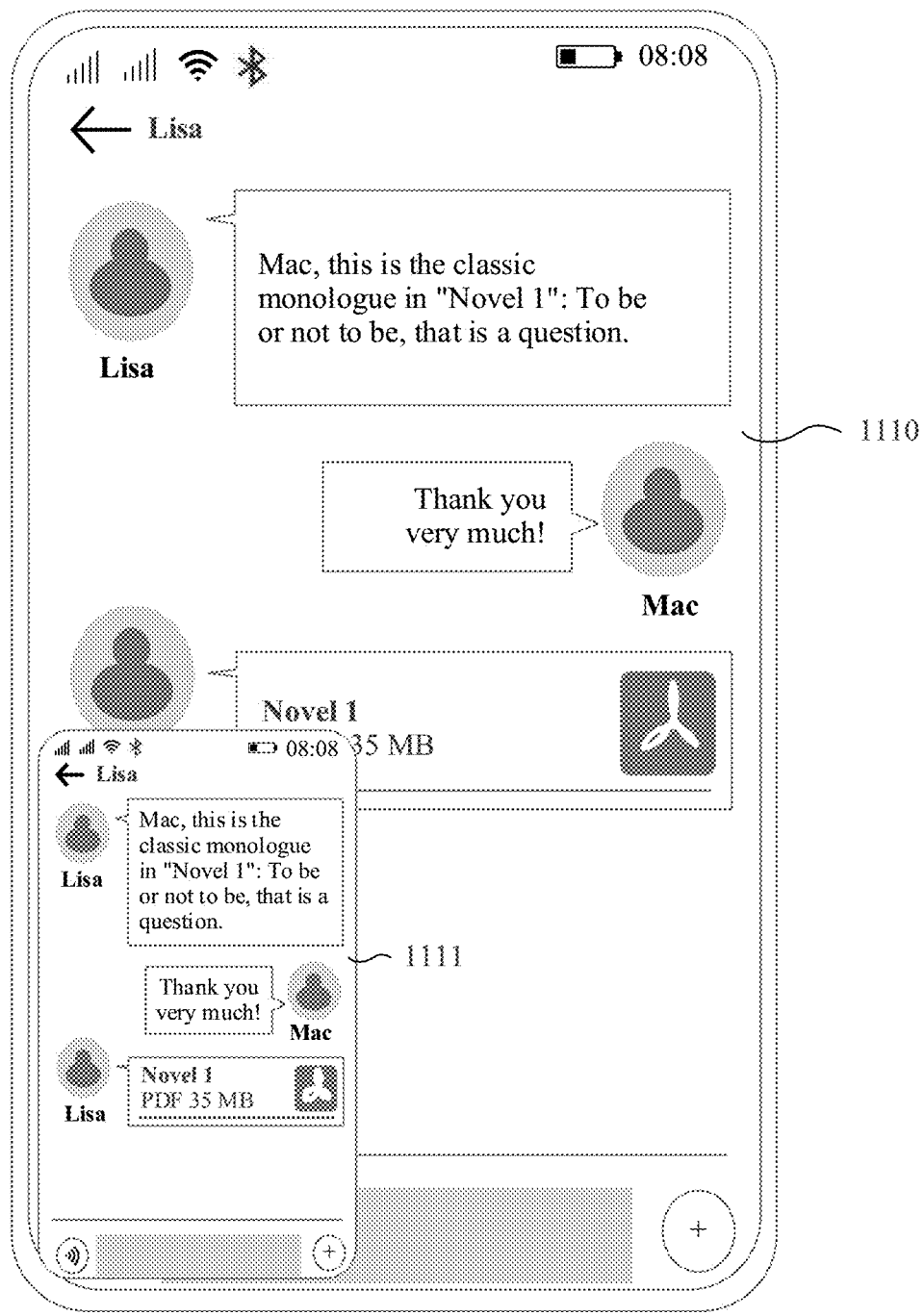
Figure 11C:
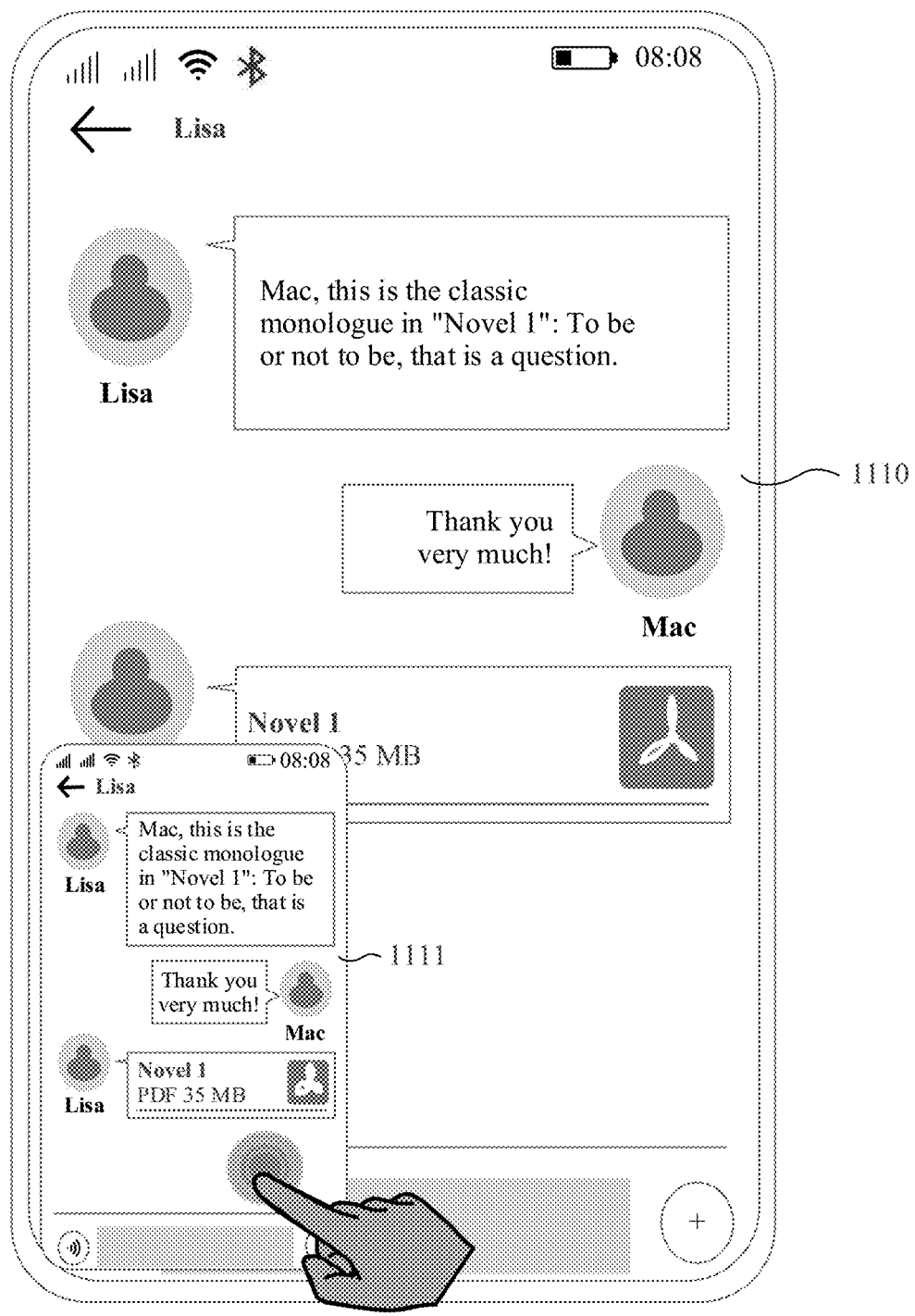
Figure 11D:
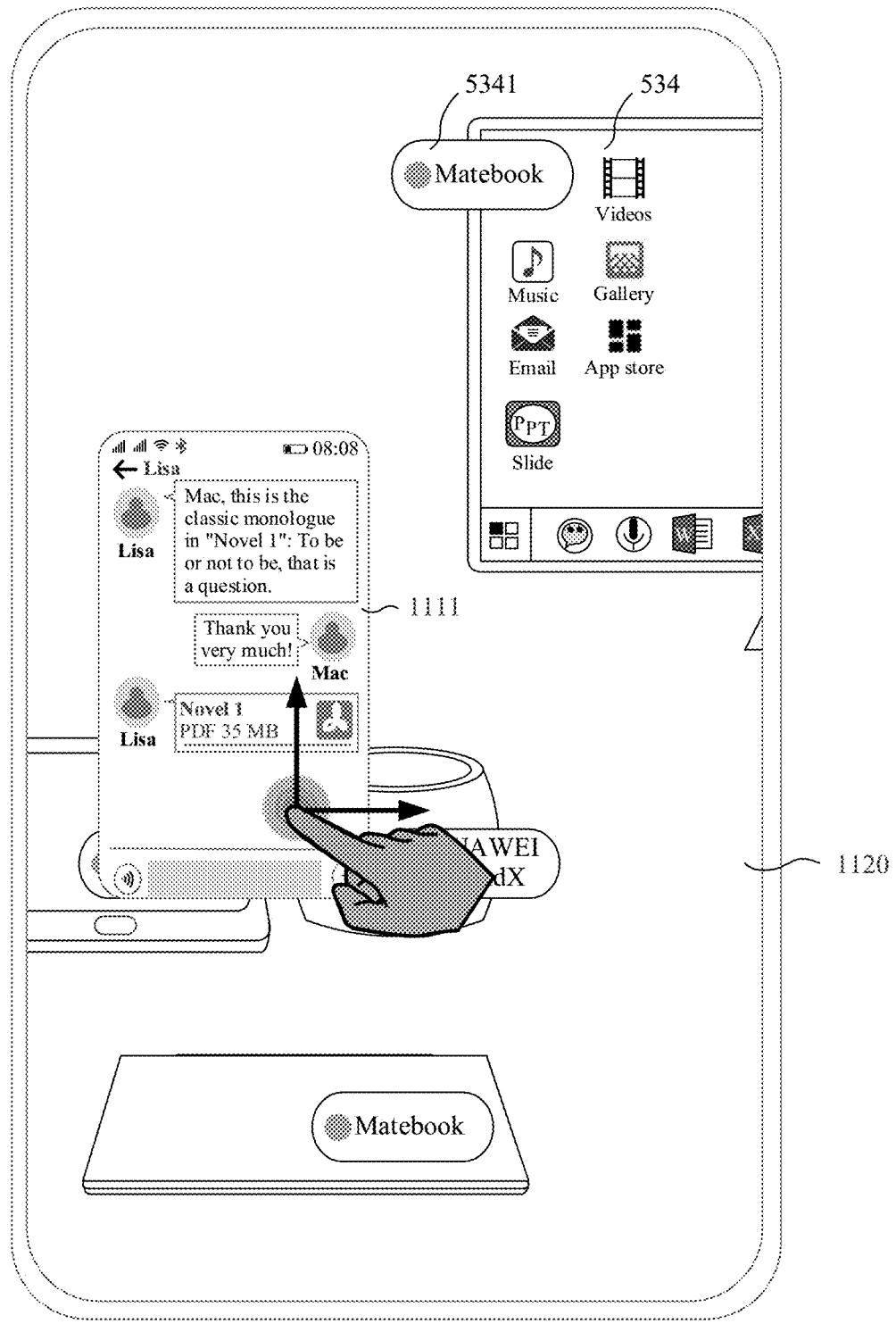

As shown in FIG. 11B, the electronic device 100 receives a screenshot operation, collects display content of a current interface, and generates a picture file. A screenshot thumbnail 1111 is displayed in the current user interface 1110. The screenshot thumbnail 1111 is associated with a corresponding picture file. As shown in FIG. 11C, the user touches and holds the screenshot thumbnail 1111. When the electronic device 100 detects a touch and hold operation on the screenshot thumbnail 1111, a sharing function is triggered, and the electronic device displays a sharing interface 1120 shown in FIG. 11D. The electronic device starts a camera, collects an image in real time by using the camera, and displays the image in the sharing interface 1120. Displayed content in the sharing interface 1120 includes the image captured by the camera. As shown in FIG. 11D, FIG. 11D shows an example of the sharing interface 1120. The sharing interface 1120 includes a device image 531, a device image 532, a device image 533, and a device image 534.

The sharing interface 1120 further includes a screenshot thumbnail 1111. The user may freely drag the screenshot thumbnail 1111. When the user drags the screenshot thumbnail 1111 to a display area of any device in the sharing interface 1120, after the user releases the thumbnail, the electronic device 100 sends, to the device, a picture file associated with the screenshot thumbnail 1111.

It should be noted that, based on a same concept, a principle of dragging, by the user, the screenshot thumbnail 1111 to a display area of another device for sharing in this embodiment of the present disclosure is similar to that of dragging, by the user, the file icon 903 to a display area of another device for sharing. Therefore, for an implementation of dragging, by the user, the screenshot thumbnail 1111 to a display area of another device for sharing, refer to corresponding descriptions of the implementation of dragging, by the user, the file icon 903 to a display area of another device for sharing, for example, refer to the implementations shown in FIG. 9C to FIG. 9E and corresponding descriptions. Details are not described herein again.

Application scenario 3: In UI embodiments shown in FIG. 12A to FIG. 12E as examples, when the electronic device detects an operation of selecting an image for sharing, the user may trigger a sharing function based on augmented reality display, to share one or more picture files with another device.

Figure 12A:
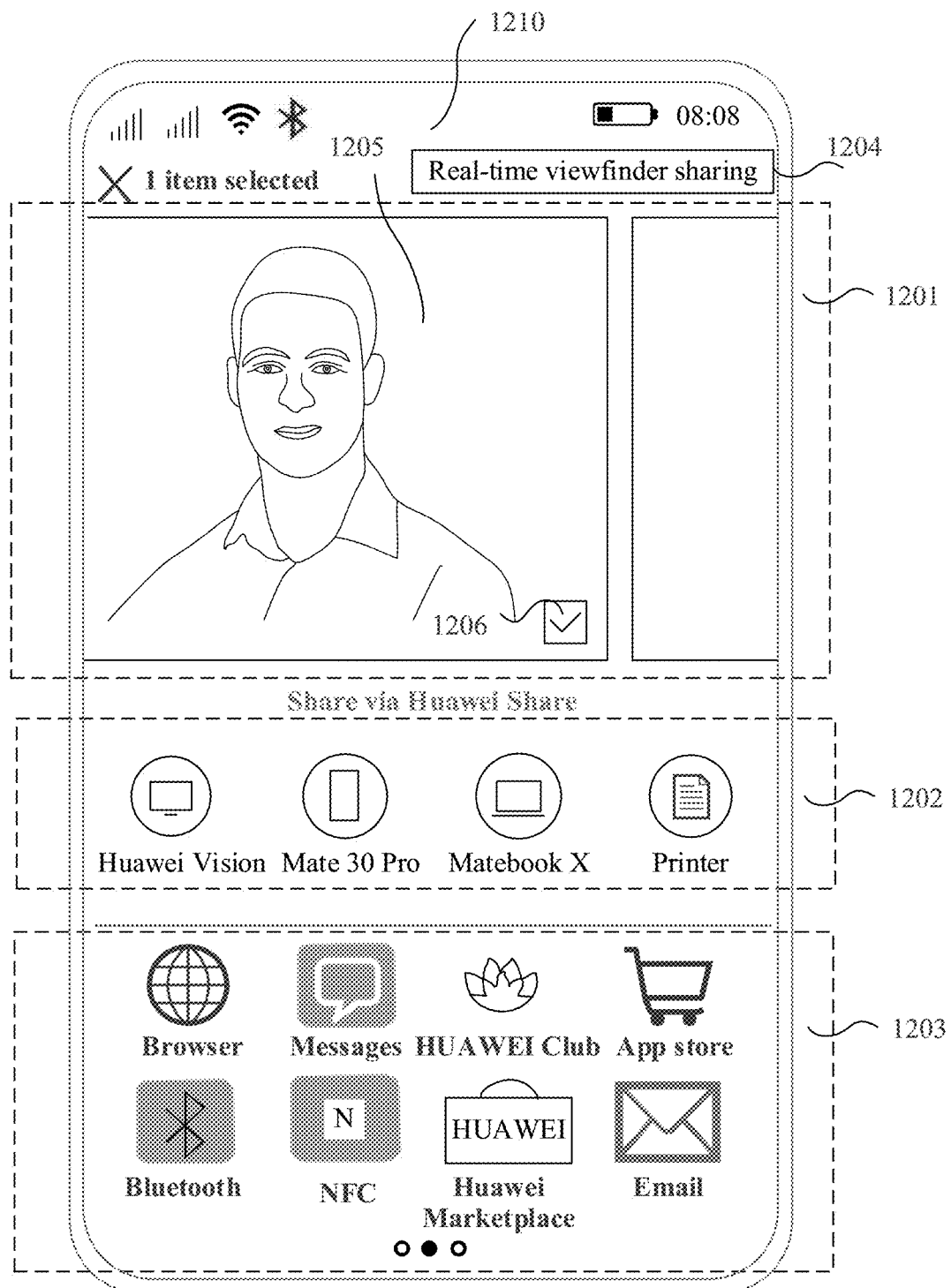
FIG. 12A, FIG. 12B, FIG. 12C, FIG. 12D, FIG. 12E, and FIG. 12F are schematic diagrams of another group of interfaces according to an embodiment of this disclosure.

FIG. 12A shows an example of a user interface 1201. As shown in FIG. 12A, the user interface 1201 may include one or more of the following areas: an area 1201, an area 1202, and an area 1203.

The area 1201 may be used to display one or more pictures in "Gallery", and the one or more pictures may include pictures selected by the user, for example, a selected picture 1205. In some embodiments, a mark 1206 may be displayed on the selected picture 1205, and the mark 1206 may indicate that the picture 1205 that corresponds to the mark 1206 is selected by the electronic device 100 (that is, the picture has been selected by the user). In some other embodiments, the user may switch or update a picture by using a left or right sliding gesture or the like in an area

1201. The picture 1205 may be a thumbnail. An original picture corresponding to the picture displayed in the area 405 may be a picture stored in the electronic device 100, or may be stored in a cloud server.

One or more service options (such as "Browser" and "Messages") may be displayed in the area 1203. An application or a protocol corresponding to the service option may support sharing, to a contact or a server, a picture selected by the user. In some embodiments, the electronic device 100 may trigger, in response to an operation (for example, a touch operation performed on a "Messages" icon) that is detected in the area 1203 and that is performed on the service option, a process of sharing the selected picture with a cloud contact or a server by using an application or a protocol corresponding to the service option. The process may include the following. The electronic device 100 opens the application or the protocol, displays a user interface of the application or the protocol, and when detecting, in the user interface, an operation of sharing data by the user, shares the selected picture with the cloud contact or the server by using the application or the protocol in response to the operation.

The area 1202 may be used to display a nearby device option that is automatically discovered by the electronic device 100, for example, HUAWEI Vision, mate 30 Pro, MATEBOOK X, or a printer. A device option (for example, mate 30 Pro or MATEBOOK X) displayed in the area 1202 may be used to trigger a sharing operation. In response to a detected operation (for example, a touch operation on a device icon) performed on a device option, the electronic device 100 may trigger a process of sharing a selected picture to a device corresponding to the device option selected in the operation. The process may include the following. The electronic device 100 establishes a communication connection to the device corresponding to the selected device option, and then transmits, by using the communication connection, the selected picture to the device corresponding to the device option.

The user interface 1210 further includes a real-time viewfinder sharing control 1204, and the real-time viewfinder sharing control 704 is configured to trigger entering of a sharing interface. When the electronic device 100 detects a user operation on the real-time viewfinder control 704, the electronic device 100 starts a camera, and displays a sharing interface 1220 shown in FIG. 12B. The sharing interface includes images captured by the camera, device icons, and a to-be-shared picture bar 1221.

In some embodiments, the real-time viewfinder control 1204 in the user interface 1210 is optional, and the electronic device 100 may not display the real-time viewfinder control 1204. When the electronic device 100 displays the user interface 1210, and the electronic device 100 detects an uplift operation, the electronic device 100 triggers displaying of the sharing interface 1220. For the uplift operation, refer to the descriptions of FIG. 7C. In this embodiment, the electronic device 100 displays the user interface 1210 at a moment T1, and when the electronic device 100 detects the uplift operation, the electronic device 100 displays the sharing interface 1220 at a moment T2. A time interval between the moment T1 and the moment T2 is less than a threshold.

It may be understood that the uplift operation is merely an example of a user operation, and the electronic device 100 may further enter the sharing interface 1220 by using another user operation.

The picture bar 1221 is configured to display one or more pictures in "Gallery", and the one or more pictures may include a picture selected by the user, for example, a selected picture 1205. In some embodiments, a mark 1206 may be displayed on the selected picture 1205, and the mark 1206 may indicate that the picture 1205 that corresponds to the mark 1206 is selected by the electronic device (that is, the picture has been selected by the user). In some other embodiments, the user may switch or update a picture by using a left or right sliding gesture or the like in an area 1201.

After selecting one or more pictures, the user selects any device in the sharing interface. When the electronic device 100 detects a user operation (for example, a tap operation on the device icon) on a device icon, the electronic device 100 may trigger a process of sharing the selected picture to a device corresponding to the device icon selected by the user. The process may include the following. The electronic device 100 establishes a communication connection to the device corresponding to the selected device icon, and then transmits, by using the communication connection, the selected picture to the device corresponding to the device icon.

Figure 12B:
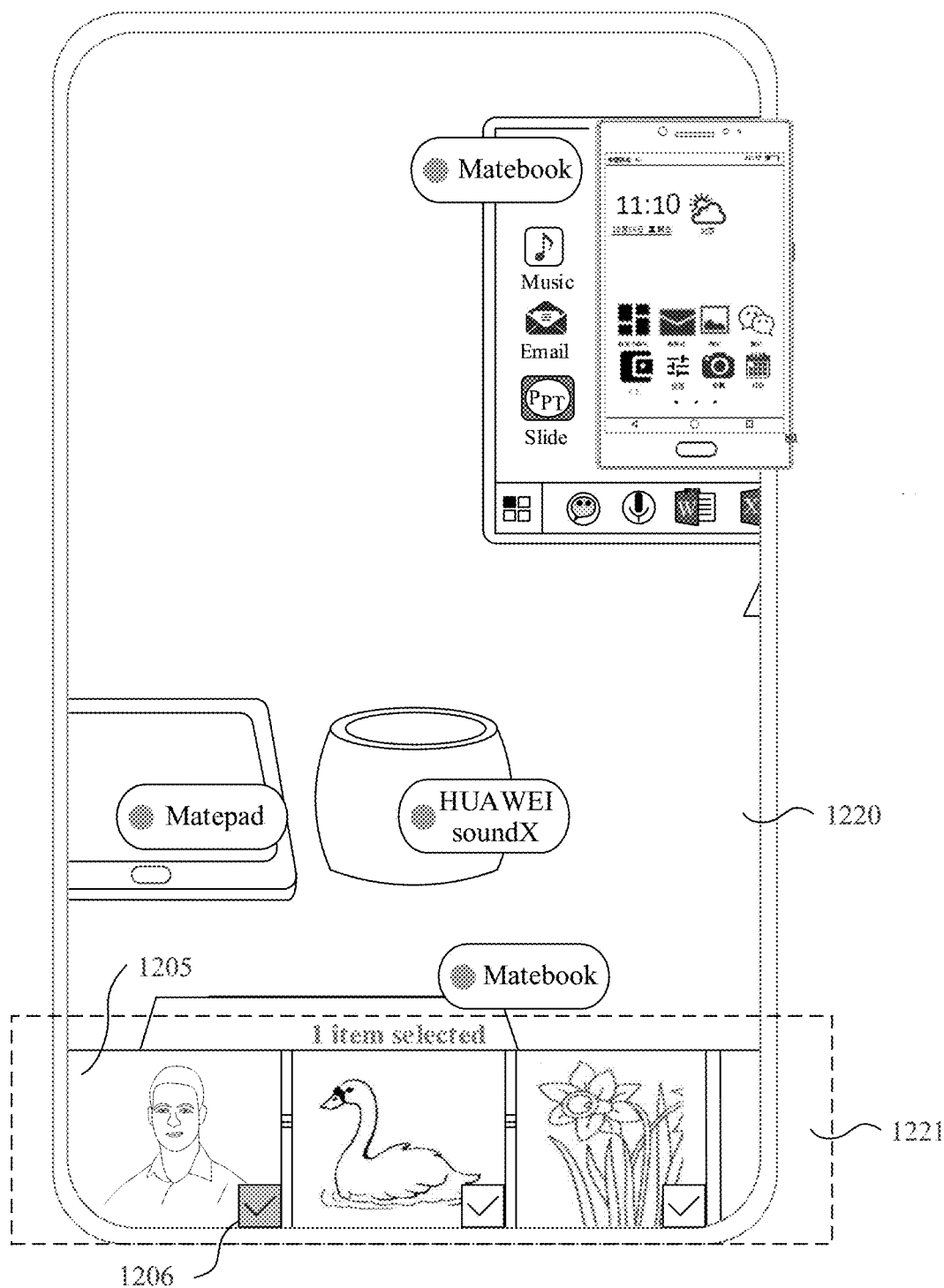
Figure 12C:
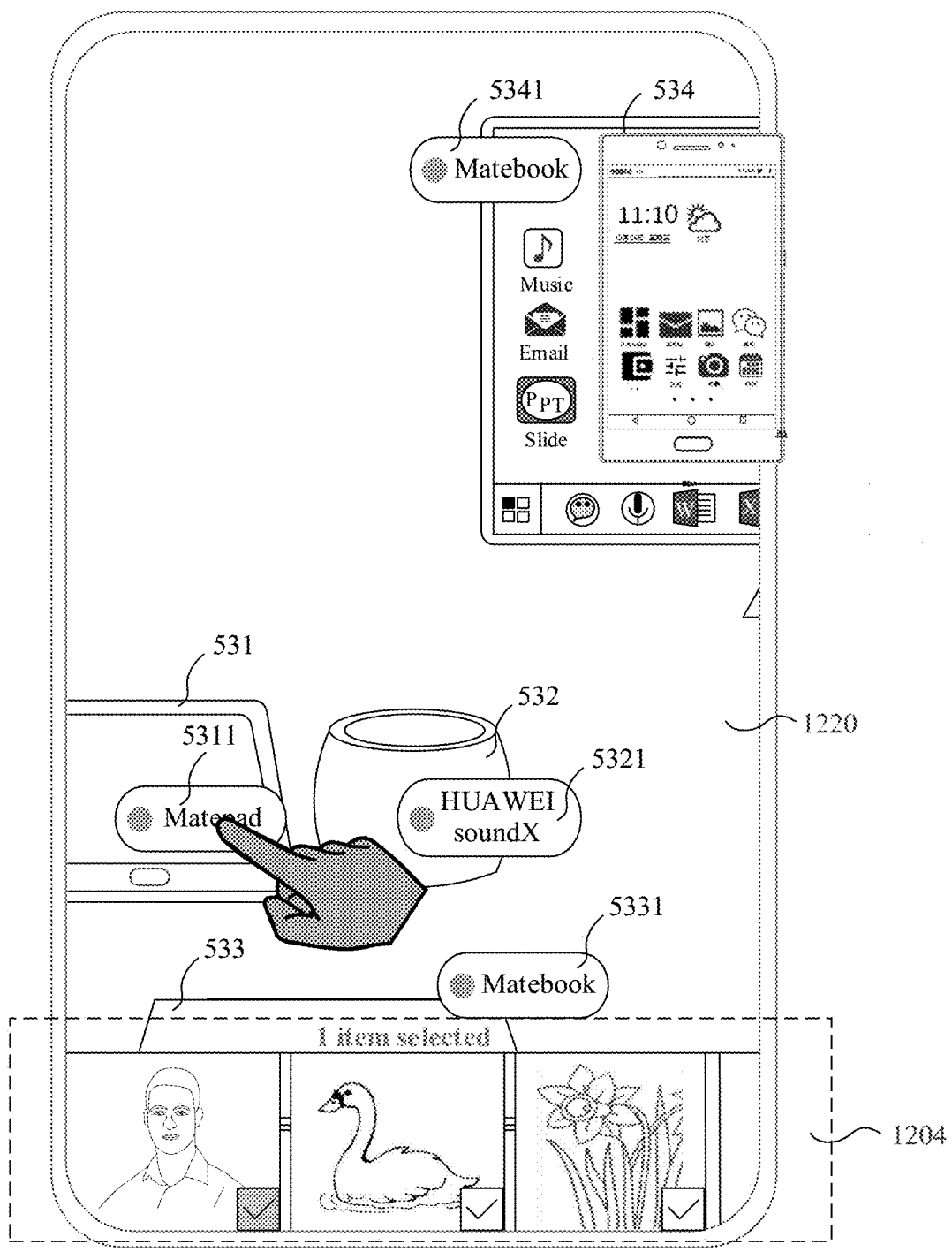
Figure 12D:
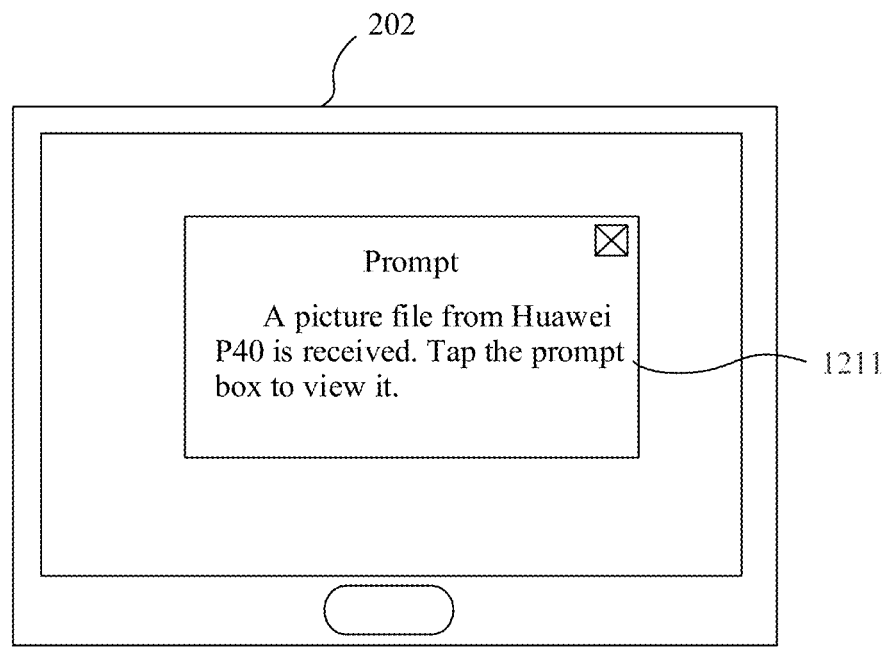
Figure 12E:
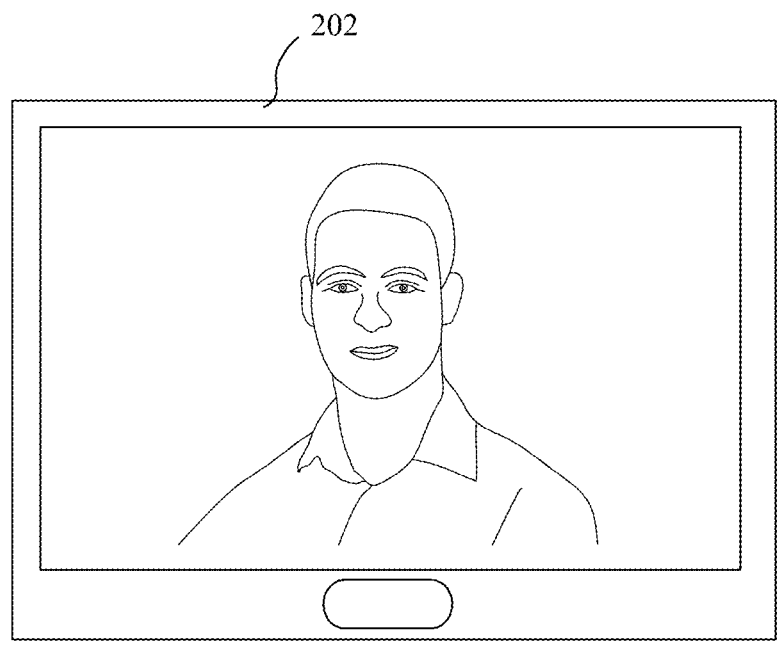

As shown in FIG. 12C, after selecting the picture 1205, the user taps a device icon 5311. The electronic device 100 detects a user operation on the device icon 5311, and sends the picture 1205 to the electronic device 202 corresponding to the device image 531. As shown in FIG. 12D, the electronic device 202 receives a picture 1205 sent by the electronic device 100, and outputs a prompt box 1211 in a display interface of the electronic device 202. Text content of the prompt box 1211 may be "A PDF file from the electronic device is received. Tap the prompt box to view it". When the electronic device 202 detects a tap operation for the prompt box 1211, the electronic device 202 opens the picture 1205. As shown in FIG. 9E, the picture 1205 is displayed in the display interface of the electronic device 202. In some embodiments, FIG. 12D is optional. The electronic device 202 receives a picture 1205 sent by the electronic device, and the electronic device 202 directly opens the picture, as shown in FIG. 12E.

In some embodiments, the user may be prompted, by using a display form of a device icon, of a selectable device for data sharing.

Figure 12F:
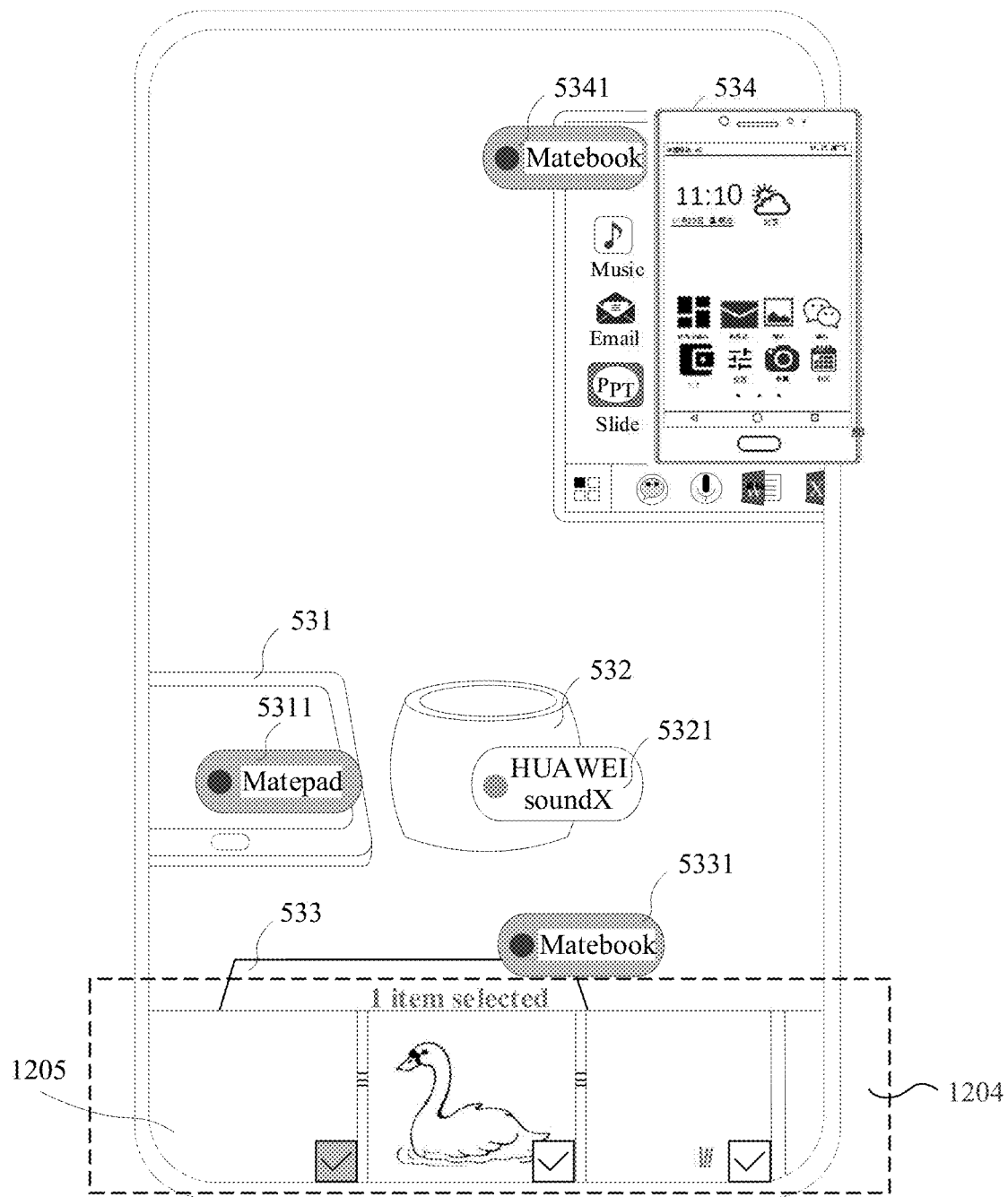

As shown in FIG. 12F, the user selects the picture 1205. Because a data type of the picture 1205 is a picture, when the electronic device 100 detects that the picture 1205 is selected, display areas of the device icon 5311, the device icon 5331, and the device icon 5341 in the viewfinder interface 920 are brightened (or icon colors are changed). Optionally, display areas of the device image 531, the device image 533, and the device image 534 are brightened. This indicates that the electronic device 202, the electronic device 203, and the electronic device 204 that respectively correspond to the device image 531, the device image 533, and the device image 534 and that are indicated by the device icon 5311, the device icon 5331, and the device icon 5341 are devices that support output of the picture 1205. The user is prompted to tap the device icons of these devices to share data.

Optionally, compared with that of the device icon 5311, the device icon 5331, and the device icon 5341, brightness (or a color, or the like) of a display area of the device icon 5321 is different, indicating that the electronic device 201 corresponding to the device icon 5321 does not support output of the picture 1205, and prompting the user not to tap the device icon 5321 of the device image 532.

In this disclosure, the device icon may be displayed in more forms. This is not limited in this disclosure.

In the three example scenarios, data transmission between devices is implemented based on the device identification method provided in embodiments of this disclosure, so that operation steps of sharing data by the user can be simplified, and efficiency of sharing data with another device can be improved. Embodiments of this disclosure further provide a photo sharing method, so that a user can quickly share a photo on a photographing preview interface of a camera application. The following describes the photo sharing method in detail.

In an environment with a large quantity of terminals, sharing of pictures, files, and the like between a plurality of terminals becomes increasingly common. How to quickly and efficiently find a target terminal that a user expects to share and improve efficiency and experience of searching for the target terminal by the user becomes very important.

A mobile phone is used as an example. After taking a photo by using the mobile phone, a user often needs to share the photo with another user or another electronic device. In a current process of sharing a photo by a user, the user needs to perform a series of complex operations, for example, a plurality of operations such as opening "Gallery", selecting a photo, tapping to share, searching for another electronic device, selecting a target electronic device, and transmitting a photo, so as to share the photo with the target electronic device. In this photo sharing process, operations are complex, there are a plurality of interaction procedures, and efficiency of sharing a photo is low.

Figure 13A:
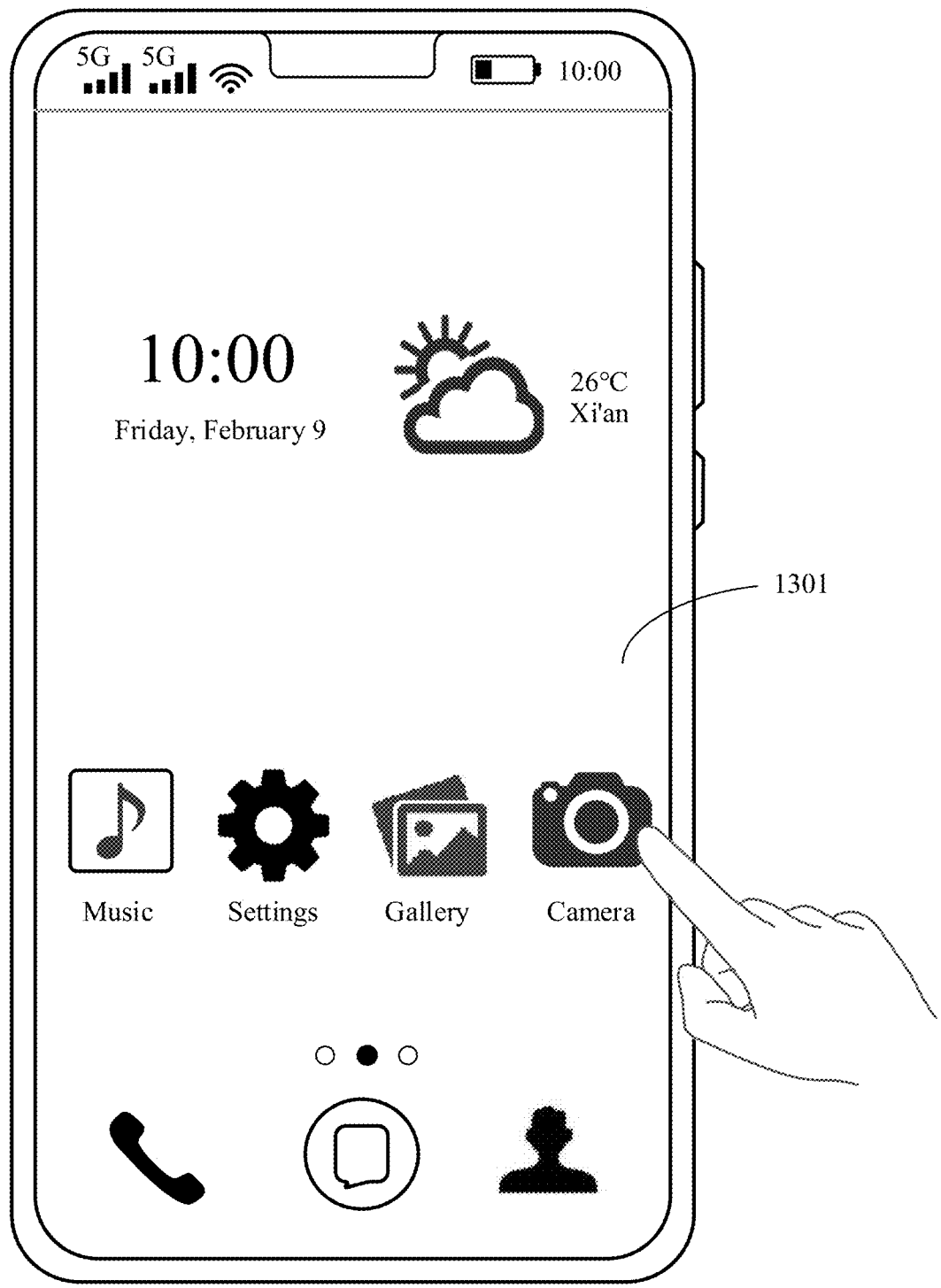
FIG. 13A, FIG. 13B, FIG. 13C, FIG. 13D, and FIG. 13E are schematic diagrams of graphical user interfaces of an example of a photo sharing process.

FIG. 13A, FIG. 13B, FIG. 13C, FIG. 13D, and FIG. 13E are schematic diagrams of graphical user interfaces (GUIs) of an example of a photo sharing process. FIG. 13A shows interface content 1301 currently output by the mobile phone in an unlock mode. The interface content 1301 displays a plurality of applications (Apps), such as "Music", "Settings", "Gallery", and "Camera". It should be understood that, the interface content 1301 may further include more applications. This is not limited in this embodiment of this disclosure.

Figure 13B:
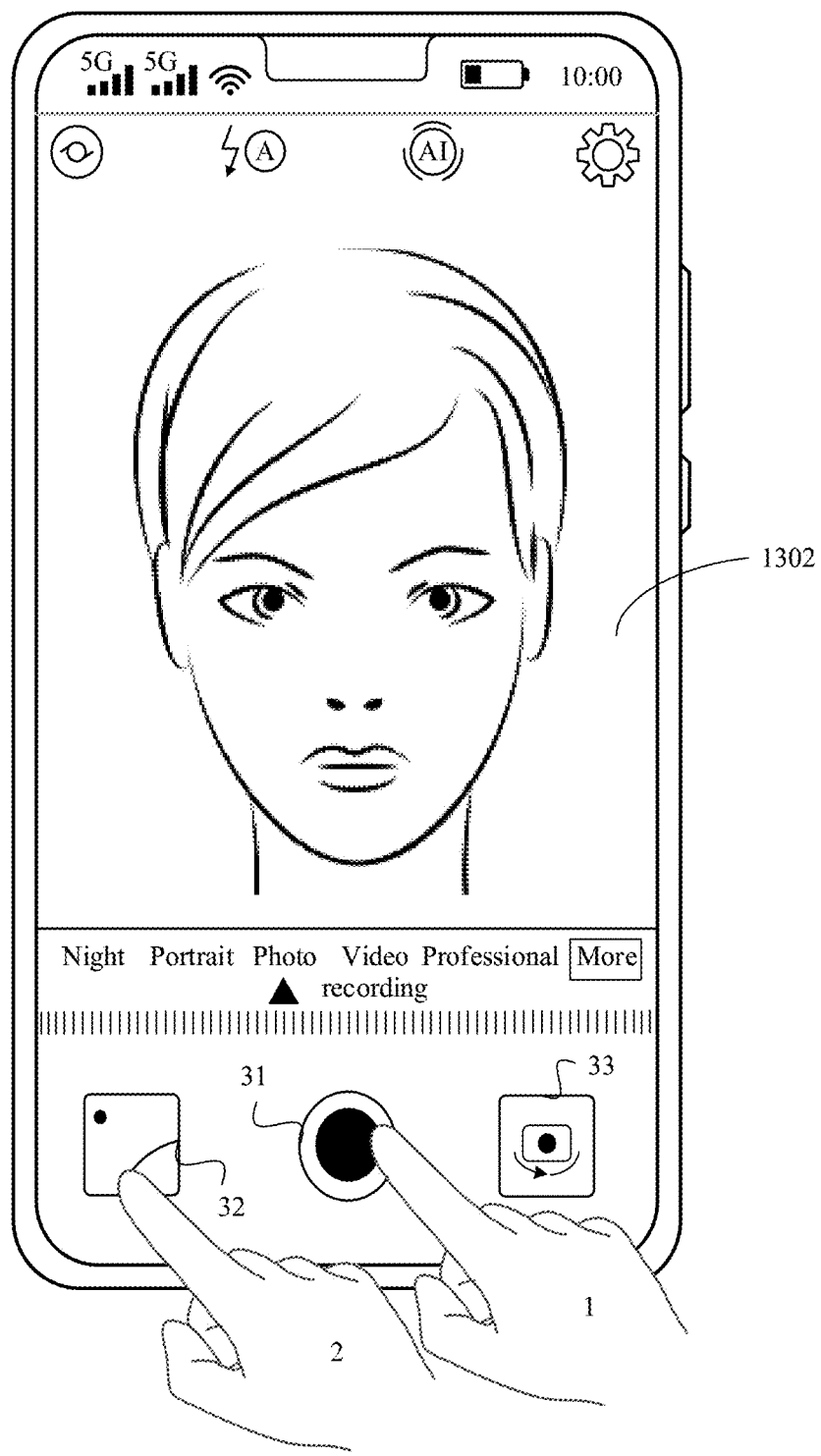

As shown in FIG. 13A, a user taps an icon of a camera application, and in response to a tap operation of the user, the mobile phone enters a main interface 1302, or a "photographing preview interface", of the camera application shown in FIG. 13B. An image presented in the photographing preview interface is referred to as a "preview picture" or a "preview image".

It should be understood that, in this embodiment of this disclosure, as shown in FIG. 13B, the photographing preview interface 1302 may include a preview image in the middle, and a button, a menu option, and the like that are of the camera application and that are displayed in a top area and a bottom area of the interface. In subsequent embodiments, both the photographing preview interface and the preview image may be used to describe a photographing interface of the camera application, for example, "displaying a reminder window in a photographing preview interface" or "displaying a reminder window in a preview image" is not strictly distinguished. Details are not described again subsequently.

It should be further understood that, in this embodiment of this disclosure, the photographing preview interface may represent an interface including the preview image, a photographing shutter button, a local album icon, a camera switching icon, and the like. If displayed content in the interface changes, for example, an identified device label is displayed, the interface may still be referred to as the photographing preview interface. Details are not described again subsequently.

The main interface 1302 of the camera application includes a plurality of buttons and menu options, such as a photographing shutter button 31, a local album icon 32, and a camera switching button 33. The user may implement different operations by using the plurality of buttons and the menu options. The user may perform an operation 1 shown in FIG. 13B to tap the photographing shutter button 31. In response to the photographing operation of the user, the mobile phone shoots a photo, and saves the shot photo in a local album.

Figure 13C:
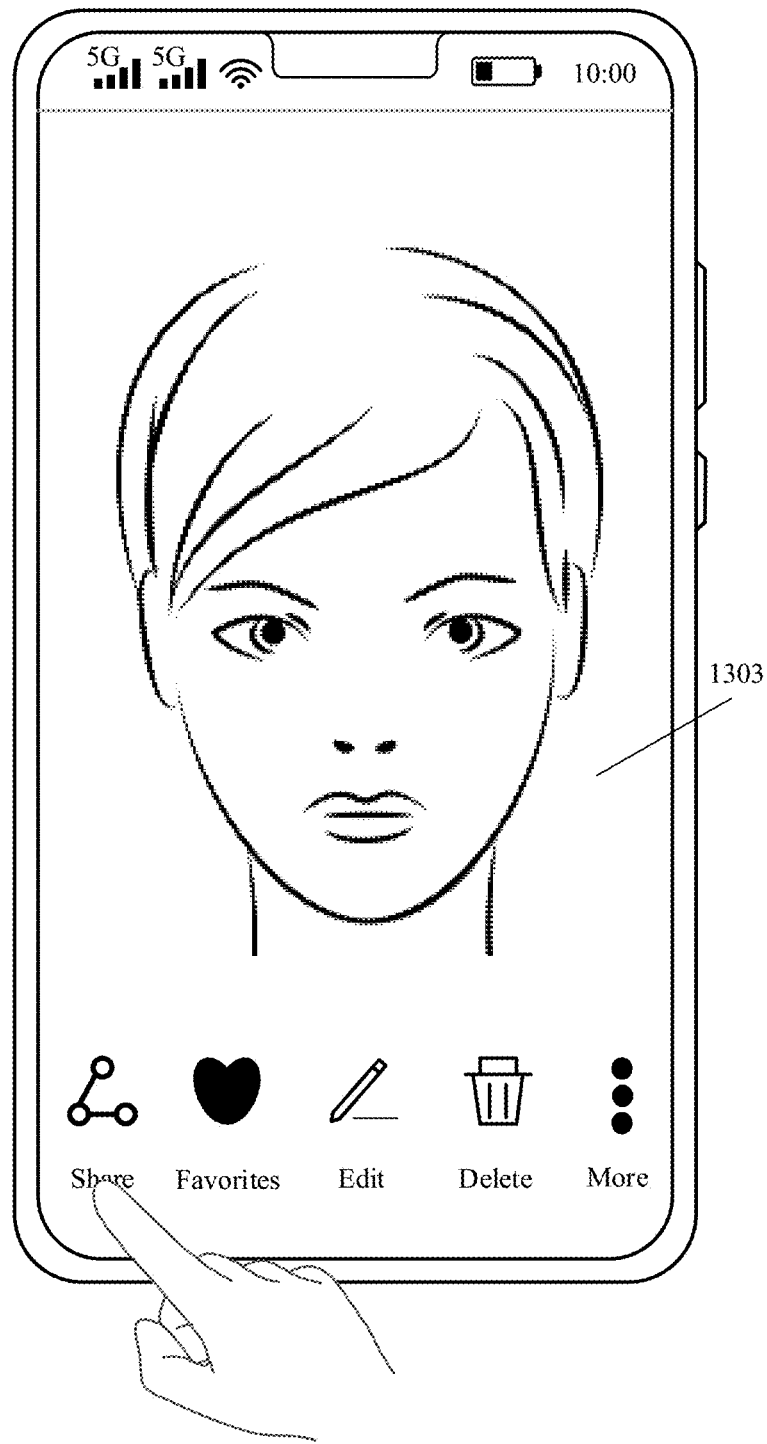

When the user expects to share a currently taken photo or another photo in the local album with another electronic device, the user may perform an operation 2 shown in FIG. 13B to tap the local album icon 32 in the main interface 1302 of the camera application, and in response to the tap operation of the user, the mobile phone enters a photo display interface 1303. The photo display interface 1303 may display the currently taken photo. As shown in FIG. 13C, the user taps a "Share" button in the photo display interface 1303, and then the mobile phone enters a photo sharing interface 1304.

The photo sharing interface 304 may include a photo area and a sharing menu area. The photo area may display a plurality of shot photos, and the user may tap a "selection" box in a lower right corner of the photo to select a photo that is expected to be shared. The sharing menu area may provide a plurality of photo sharing manners for the user, for example, "HUAWEI Share", "Send to a friend", "BLUETOOTH", "Send to a friend", "WEIBO", "Message", "Email", and "Notes". Different photo sharing manners may be associated with different applications (such as WECHAT), and details are not described herein again.

Figure 13D:
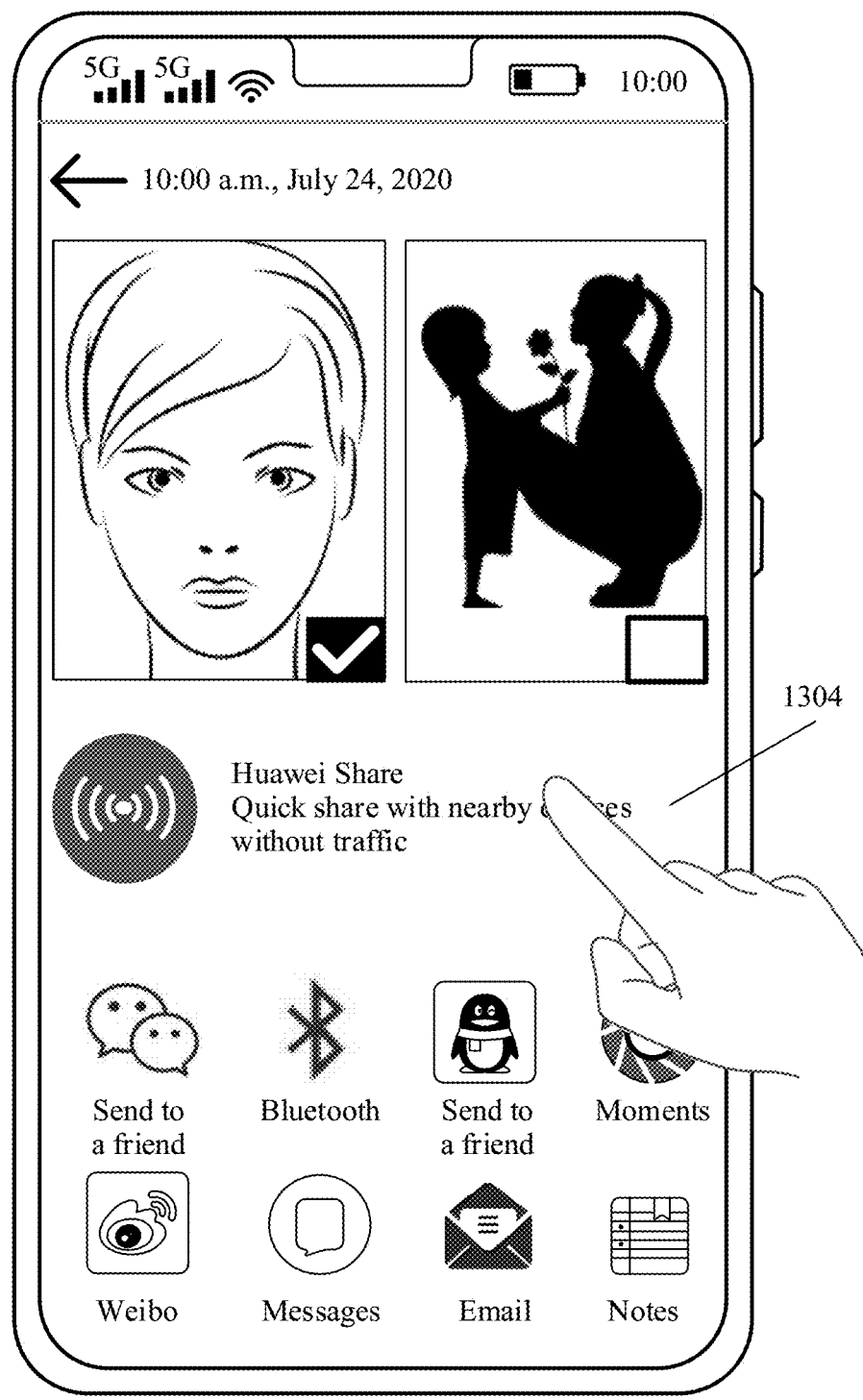
Figure 13E:
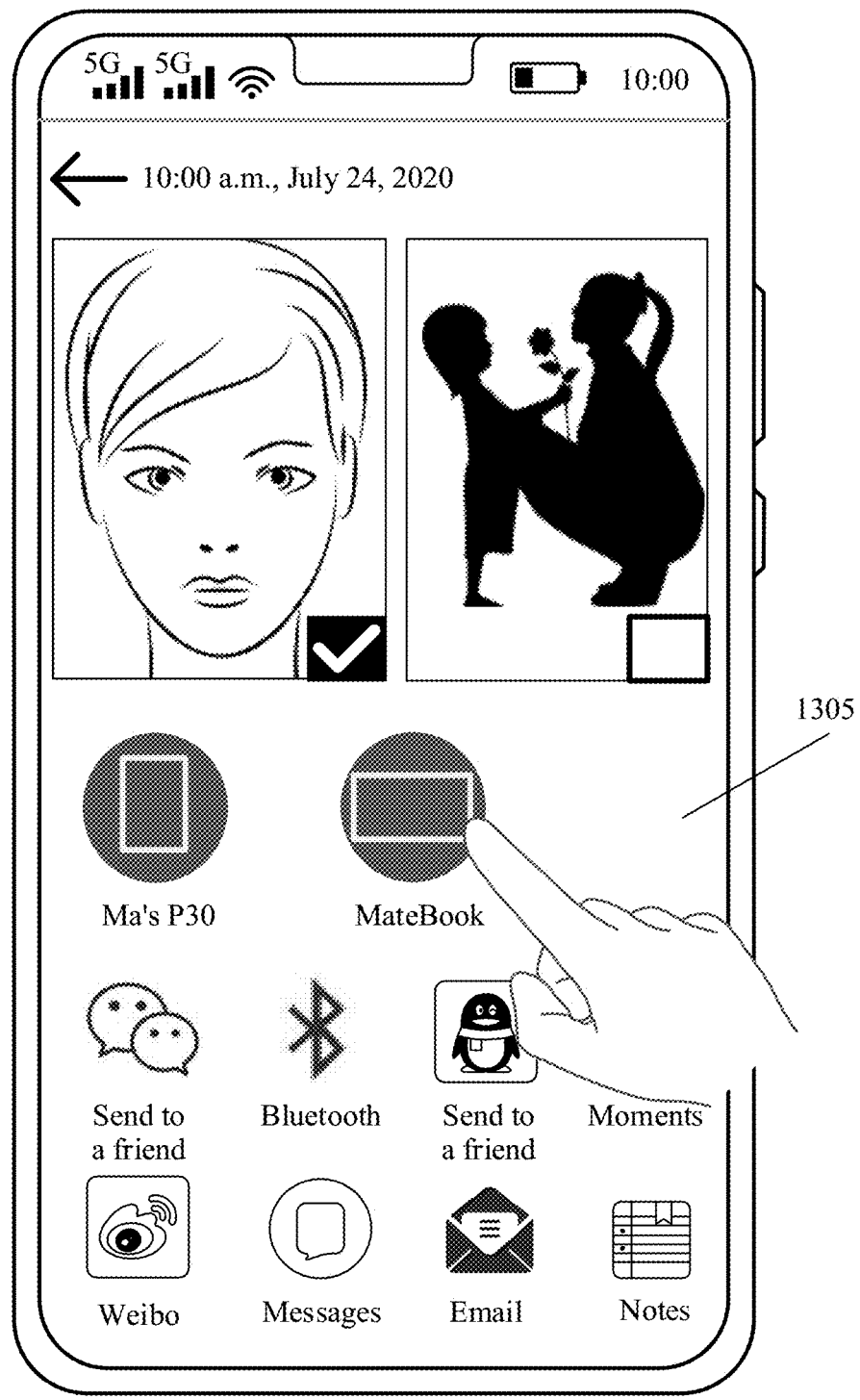

As shown in FIG. 13D, the user taps a "HUAWEI Share (HUAWEI Share)" button in the photo sharing interface 304, and the mobile phone may enter an interface shown in FIG. 13E, and display a plurality of electronic devices that can be shared, such as Ma's P30 and MATEBOOK. The user may select, according to a requirement of the user, an icon of a to-be-shared target electronic device, so as to share a selected photo with the target electronic device.

Correspondingly, after the user taps the target electronic device with which the user expects to share the photo, a receiving window may pop up on the target electronic device, and the receiving window may be used to select whether to receive the currently shared photo.

The foregoing describes a process in which a user shares a photo with another electronic device after taking a photo by using a camera application. In the process, a plurality of user operations, such as taking a photo, opening "Gallery", selecting a picture, tapping to share, selecting a sharing manner, searching for another electronic device, selecting a target electronic device, and transmitting a picture, are successively performed, and then the shot photo can be shared with the target electronic device. In this photo sharing process, operations are complex, there are a plurality of interaction procedures, and efficiency of sharing a photo is low.

Therefore, an embodiment of this disclosure provides a photo sharing method. In UI embodiments shown in FIG. 14A, FIG. 14B, FIG. 14C, FIG. 14D, and FIG. 14E to FIG. 18B, a user may quickly share a photo with another electronic device by using a camera application.

Figure 14A:
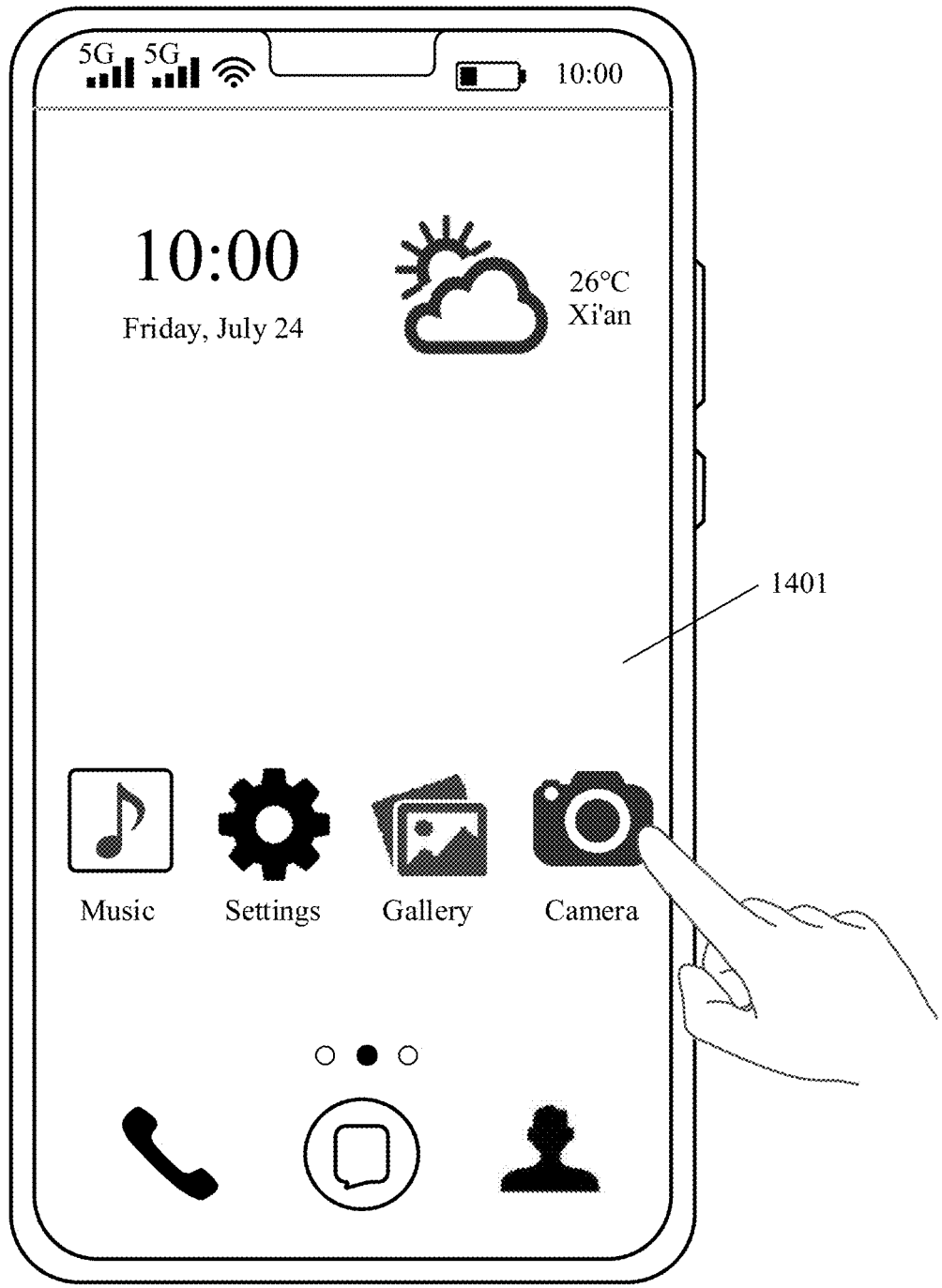
FIG. 14A, FIG. 14B, FIG. 14C, FIG. 14D, and FIG. 14E are schematic diagrams of graphical user interfaces of an example of a photo sharing process according to an embodiment of this disclosure.

FIG. 14A, FIG. 14B, FIG. 14C, FIG. 14D, and FIG. 14E are schematic diagrams of graphical user interfaces of an example of a photo sharing process according to an embodiment of this disclosure. As shown in FIG. 14A, in an unlock mode and on interface content 1401 currently output by a mobile phone, a user taps an icon of a camera application, and in response to the tap operation of the user, the mobile phone displays a photographing preview interface 1402 shown in FIG. 14B. In the photographing preview interface 1402, the user taps a photographing shutter button 31, and in response to the photographing operation of the user, the mobile phone shoots a photo and saves the shot photo in a local album.

Figure 14B:
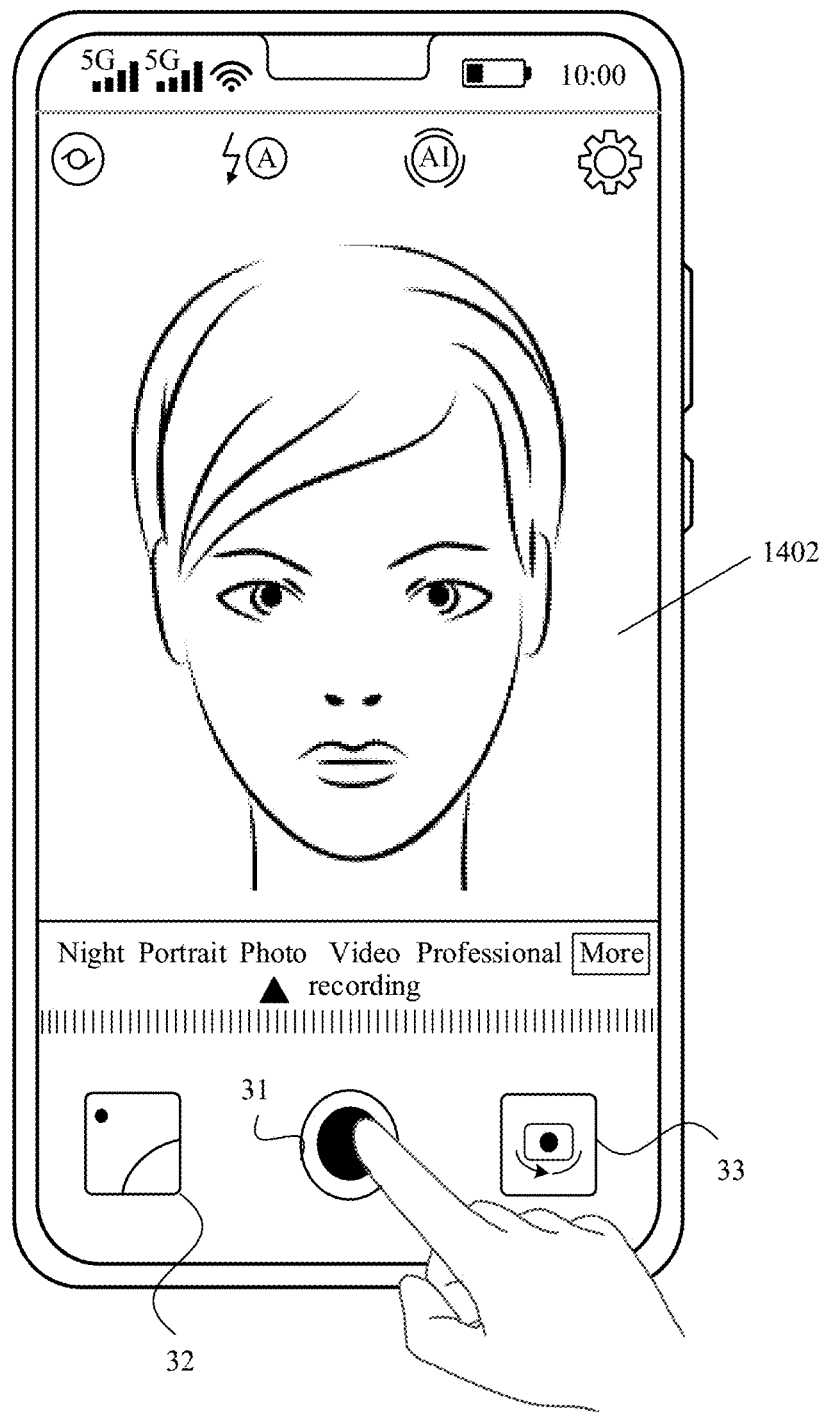
Figure 14C:
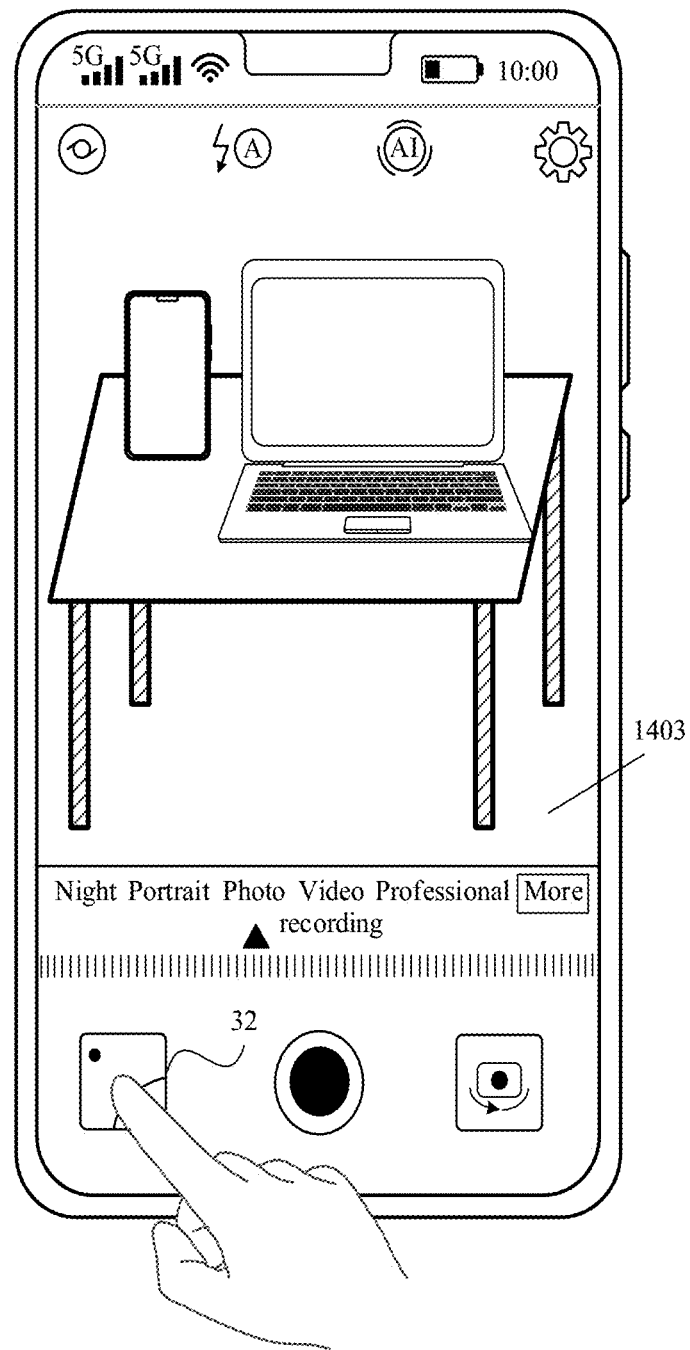

The user performs an operation shown in FIG. 14C to touch and hold a local album icon 32. In response to the touch and hold operation of the user, the mobile phone displays an interface 1404 shown in FIG. 14D, and displays, in the interface 1404, an icon 30 of a thumbnail photo, or referred to as a "photo thumbnail". In addition, the mobile phone enables a device identification function, and identifies, based on a preview image presented in the current photographing preview interface 1404, whether the preview image includes another electronic device.

Figure 14D:
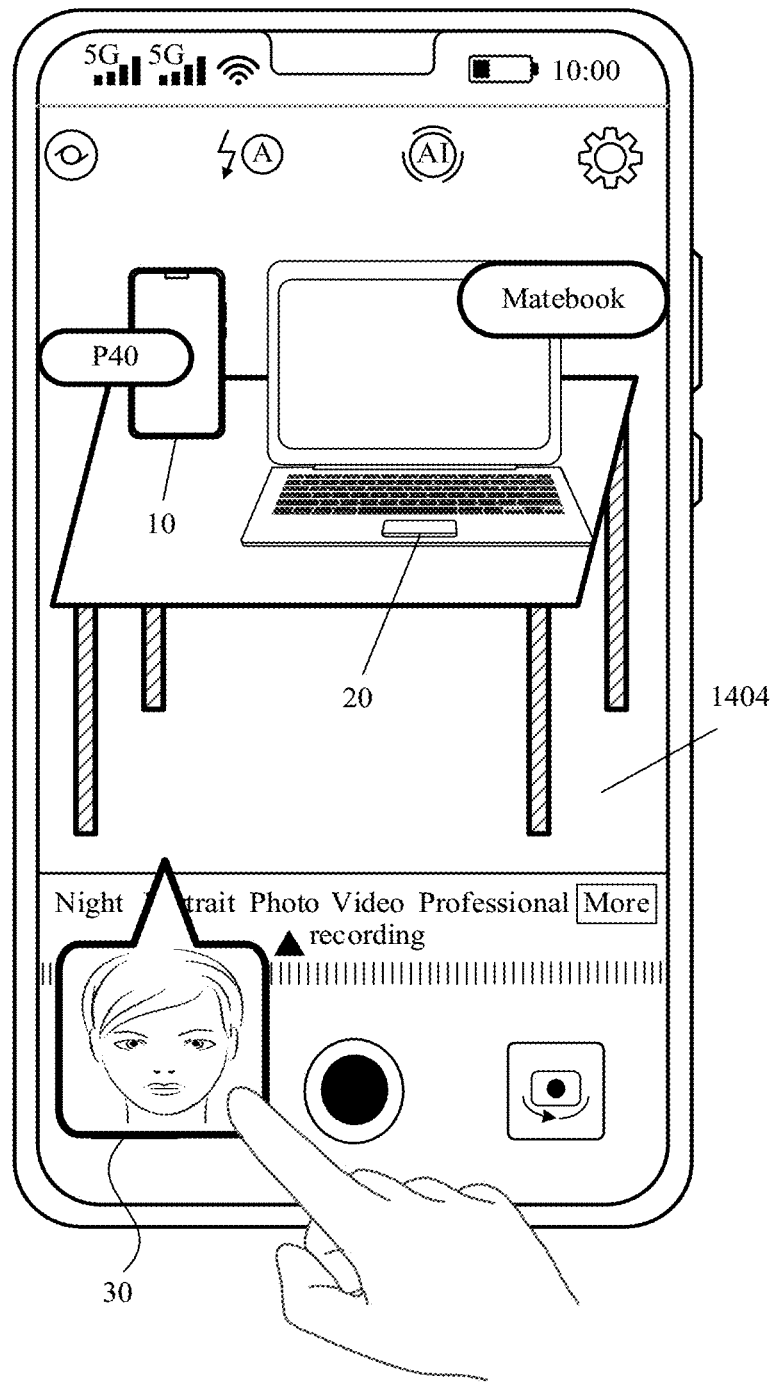

For example, as shown in FIG. 14D, if a currently presented preview image includes a mobile phone 10 and a personal computer (PC) 20 on a table, the mobile phone may identify the mobile phone 10 and the PC 20 in the preview image, and display, in the interface 1404, a name of the identified mobile phone 10 and a name of the identified PC 20. For example, the name of the mobile phone 10 is "P40", and the name of the PC 20 is "MATEBOOK".

Optionally, the mobile phone may not display names of other electronic devices in the preview image that are identified, and only mark "device 1", "device 2", and the like. This is not limited in this embodiment of this disclosure.

It should be noted herein that the preview images presented in FIG. 14B and FIG. 14C may be obtained by a front-facing camera or a rear-facing camera of the mobile phone. A camera that shoots a photo is not limited in this embodiment of this disclosure. For example, when a figure photo in FIG. 14B is obtained by the front-facing camera of the mobile phone, if the user needs to identify an electronic device by using the rear-facing camera, the user may tap a camera switching button 33 to perform switching. For another example, when a figure photo in FIG. 14B is obtained by the rear-facing camera of the mobile phone, if the user needs to identify an electronic device by using the front-facing camera, the user may tap the camera switching button 33 to perform switching.

It should be further noted herein that, in the foregoing embodiment, a touch and hold operation is used as an example to describe an operation in which the user touches and holds a local album icon 32 to trigger a photo sharing process. It should be understood that in embodiments of this disclosure, the photo sharing process provided in embodiments of this disclosure may alternatively be triggered by using another preset operation, or the mobile phone may be triggered by using another preset operation to identify an electronic device in the preview image, for example, the preset operation is not limited to touching and holding the local album icon 32, double-tapping the local album icon 32, or drawing a fixed pattern in the photographing preview interface 1403. This is not limited in embodiments of this disclosure.

In a possible implementation, the mobile phone triggers an identification function of the mobile phone after detecting a touch and hold operation performed by the user on the local album icon 32. In other words, when the mobile phone does not detect the touch and hold operation performed by the user on the local album icon 32, the mobile phone may not identify an object in the preview image, and display a figured as shown in FIG. 14C. After detecting the touch and hold operation performed by the user on the local album icon 32, the mobile phone triggers identification of an object in the preview image, and marks names "P40" and "MATEBOOK" of the identified electronic devices, as shown in FIG. 14D. In the foregoing implementation, it can be avoided that the mobile phone is always in a state of identifying an object in the preview image, thereby reducing power consumption of the mobile phone.

In another possible implementation, the mobile phone may always enable a device identification function. To be specific, the mobile phone continuously identifies an object in the preview image, and after detecting a touch and hold operation performed by the user on the local album icon 32, marks a name of the identified electronic device, and displays icons "P40" and "MATEBOOK" shown in FIG. 14D.

In the foregoing implementation, the mobile phone can determine an object included in the preview image in advance, and when the user enables a photo sharing function by touching and holding the local album icon 32, the mobile phone quickly display an identified electronic device name in an interface, thereby increasing a speed of identifying an object in the preview image by the mobile phone.

After the mobile phone identifies P40 and MATEBOOK included in the current preview image, the user may touch and hold an icon 30 of a thumbnail photo according to a requirement of the user, and drag the icon 30 of the thumbnail photo to a to-be-shared target device.

For example, as shown in FIG. 14D, icons of "P40" and "MATEBOOK" are displayed in the preview image. The user touches and holds the icon 30 of the thumbnail photo, and drags the icon 30 of the thumbnail photo to an icon area of P40 and releases the icon 30. Alternatively, the user touches and holds the icon 30 of the thumbnail photo, and drags the icon 30 of the thumbnail photo to any location in an area in which P40 is located and releases the icon.

Figure 14E:
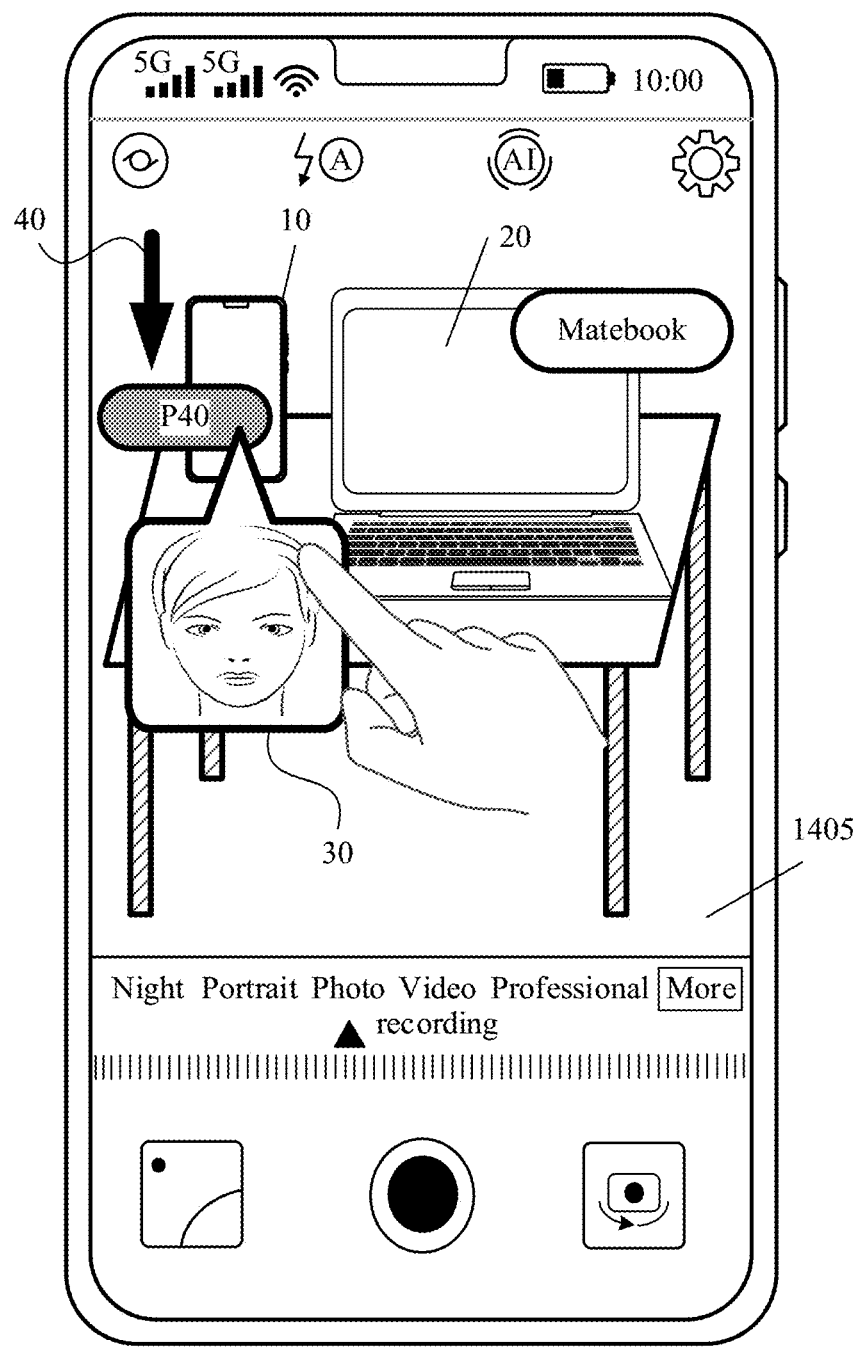

Optionally, the user may drag the icon 30 of the thumbnail photo to a location of the icon of P40 and then release the icon. The icon of P40 may be presented in different colors, or display other dynamic effects such as a size change, a jump, and a blinking light, to remind the user to share the currently taken photo with P40 that is identified in the preview image. For example, as shown in FIG. 14E, when the user drags the icon 30 of the thumbnail photo to the location of the icon of P40, the color of the "P40" icon changes. In this case, the user releases the icon 30 of the thumbnail photo, so that the currently taken photo can be shared with P40.

In still another possible implementation, in a process in which the user drags the icon 30 of the thumbnail photo, a reminder control may be further displayed on the preview image. For example, as shown in FIG. 14E, the reminder control may be an arrow 40 or the like, and the arrow 40 may be displayed statically, jumped, or flickered, to prompt the user to drag the icon 30 of the thumbnail photo to a location identified by the arrow 40, so as to implement a photo sharing function. A display manner of the reminder control is not limited in embodiments of this disclosure.

It should be understood that, for the foregoing implementation process, the mobile phone may detect and identify, in a plurality of different manners such as image detection, a 3D scanning technology, and machine vision, another electronic device included in the preview image. The manner in which the mobile phone identifies another electronic device in the preview image is not limited in embodiments of this disclosure.

It should be understood that, in embodiments of this disclosure, the mobile phone may identify another electronic device in the preview image by using a plurality of possible positioning technologies, and position a location of the other electronic device.

Optionally, a positioning technology in embodiments of this disclosure may include one of technologies such as BLUETOOTH-based wireless sensing positioning, UWB sensing-based wireless sensing positioning, and computer vision-based positioning, or a combination of the foregoing listed plurality of positioning technologies, or more other positioning technologies. A manner of positioning another electronic device by the mobile phone is not limited in embodiments of this disclosure.

In addition, in this embodiment of this disclosure, after identifying the other electronic device included in the preview image, the mobile phone may determine, based on a display location of the object in the current preview image, a location for displaying the electronic device icon.

In a possible manner, the mobile phone may display, on the preview image, an icon that marks another electronic device in an area in which the electronic device is located. For example, as shown in FIG. 14D, after identifying P40 and MATEBOOK in the preview image, the mobile phone displays an icon marked with "P40" at a location of the identified mobile phone, and displays an icon marked with "MATEBOOK" at a location of the PC.

Optionally, the icon marking the other electronic device may be displayed in an area close to a positioning apparatus of the electronic device. For example, the mobile phone communicates with P40 by using a UWB chip, to position a location of P40 in the preview image. If the UWB chip of P40 is installed in an upper right corner of P40, an icon including "P40" in FIG. 14D may be displayed in an area in which the UWB chip in the upper right corner of P40 is located. This is not limited in this embodiment of this disclosure.

In another possible manner, the icon marking the other electronic device may be displayed in a blank area in the preview image, and does not block another object in the preview image. For example, as shown in FIG. 14D, after identifying P40 and MATEBOOK in the preview image, the mobile phone displays an icon marked with "P40" on a left boundary of the preview image, so as not to block a PC on a right side of P40, and displays an icon marked with "MATEBOOK" on a right boundary of the preview image, so as not to block a mobile phone on a left side of the MATEBOOK.

The foregoing described icon display manner may mark an identified electronic device without blocking another object in the preview image. This does not affect visual and visual perception of the user, and improves visual experience of the user.

According to the foregoing method, in a photo shooting process, the user may enable, by using a preset operation, a device identification function and a positioning function of the mobile phone, and identify, with reference to the identification function and the positioning function of the mobile phone, another electronic device included in the preview image of the camera. The user may directly drag a to-be-shared photo to an area in which the other electronic device is located, to quickly share the photo with another surrounding electronic device. In this process, an operation procedure of sharing a photo is simplified, time of sharing the photo is shortened, and user experience is improved.

In another possible scenario, when the mobile phone identifies another electronic device in the preview image, the identified electronic device may be blocked by an obstruction, that is, the electronic device cannot be seen in the preview image. For this scenario, embodiments of this disclosure further provide a photo sharing method, to quickly share a shot photo with an electronic device that is blocked in a preview image.

Figure 15A:
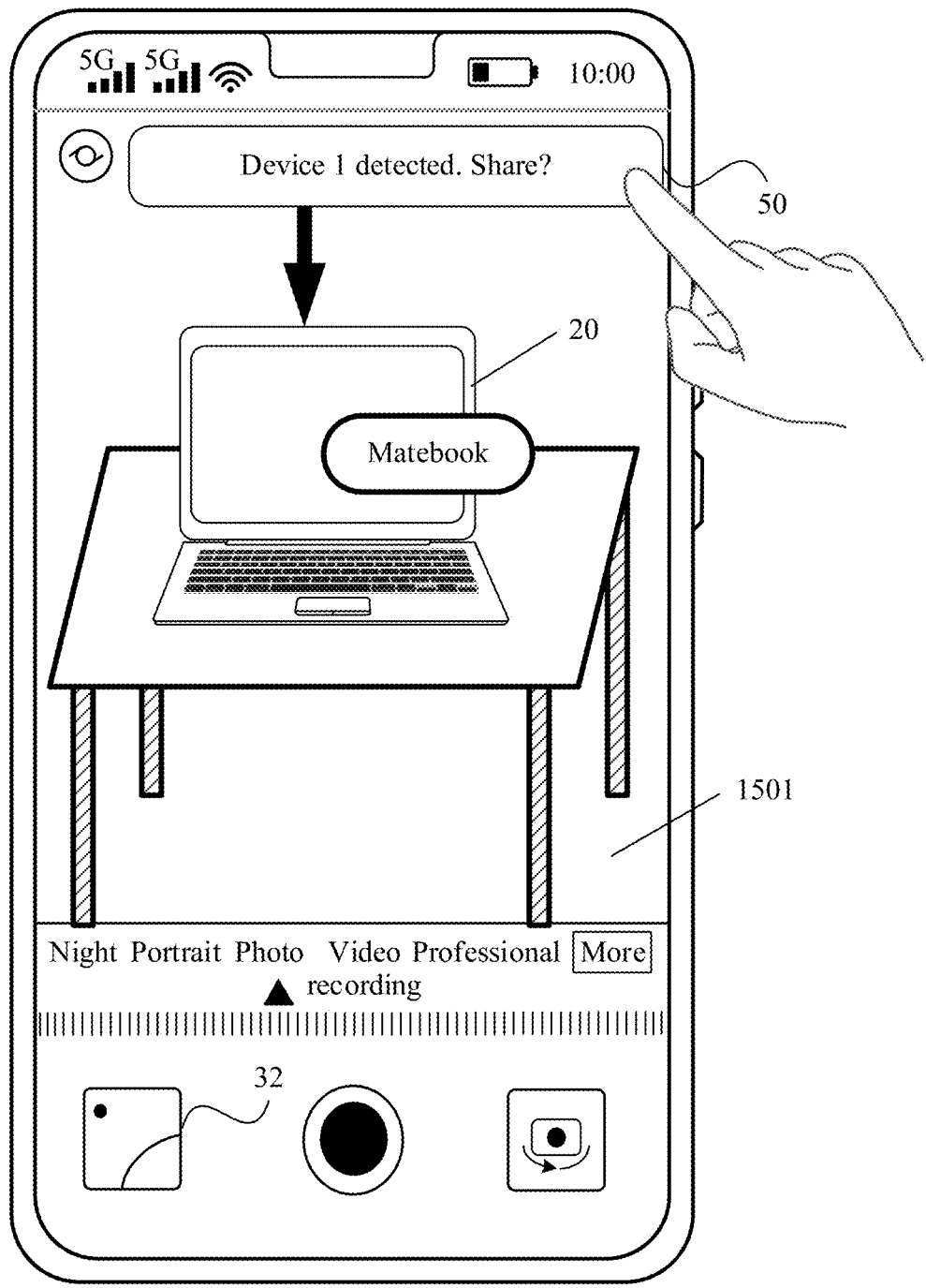
FIG. 15A, FIG. 15B, FIG. 15C, and FIG. 15D are schematic diagrams of graphical user interfaces of another example of a photo sharing process according to an embodiment of this disclosure.

FIG. 15A, FIG. 15B, FIG. 15C, and FIG. 15D are schematic diagrams of graphical user interfaces of another example of a photo sharing process according to an embodiment of this disclosure. For example, as shown in FIG. 15A, on a photographing preview interface 1501, the mobile phone identifies that a PC 20 in the preview image is MATEBOOK, and displays an icon marked with "MATEBOOK". In addition, the mobile phone identifies that there is a blocked device 1 behind MATEBOOK. In this scenario, MATEBOOK blocks the device 1, and a reminder window 50 may be displayed in the photographing preview interface 1501 of the mobile phone. The reminder window 50 may include text information used to remind the user of the detected device 1.

Optionally, in this embodiment of this disclosure, in addition to the text reminder in the reminder window 50, the reminder may further include an icon reminder. For example, in addition to the reminder window 50, the photographing preview interface 1501 of the mobile phone may further include an icon, such as a statically displayed arrow, a dynamically blinking arrow, or a jumped arrow, that marks a location of the blocked electronic device. This is not limited in this embodiment of this disclosure.

For example, as shown in FIG. 15A, the reminder window 50 displays: "Device 1 detected. Share?". After the user taps the reminder window 50, the mobile phone displays an interface 1502 shown in FIG. 15B. The interface 1502 includes a photo sharing window 60. The user may tap a "share" button in the photo sharing window 60, to determine to share a currently taken photo with the blocked device 1.

Figure 15B:
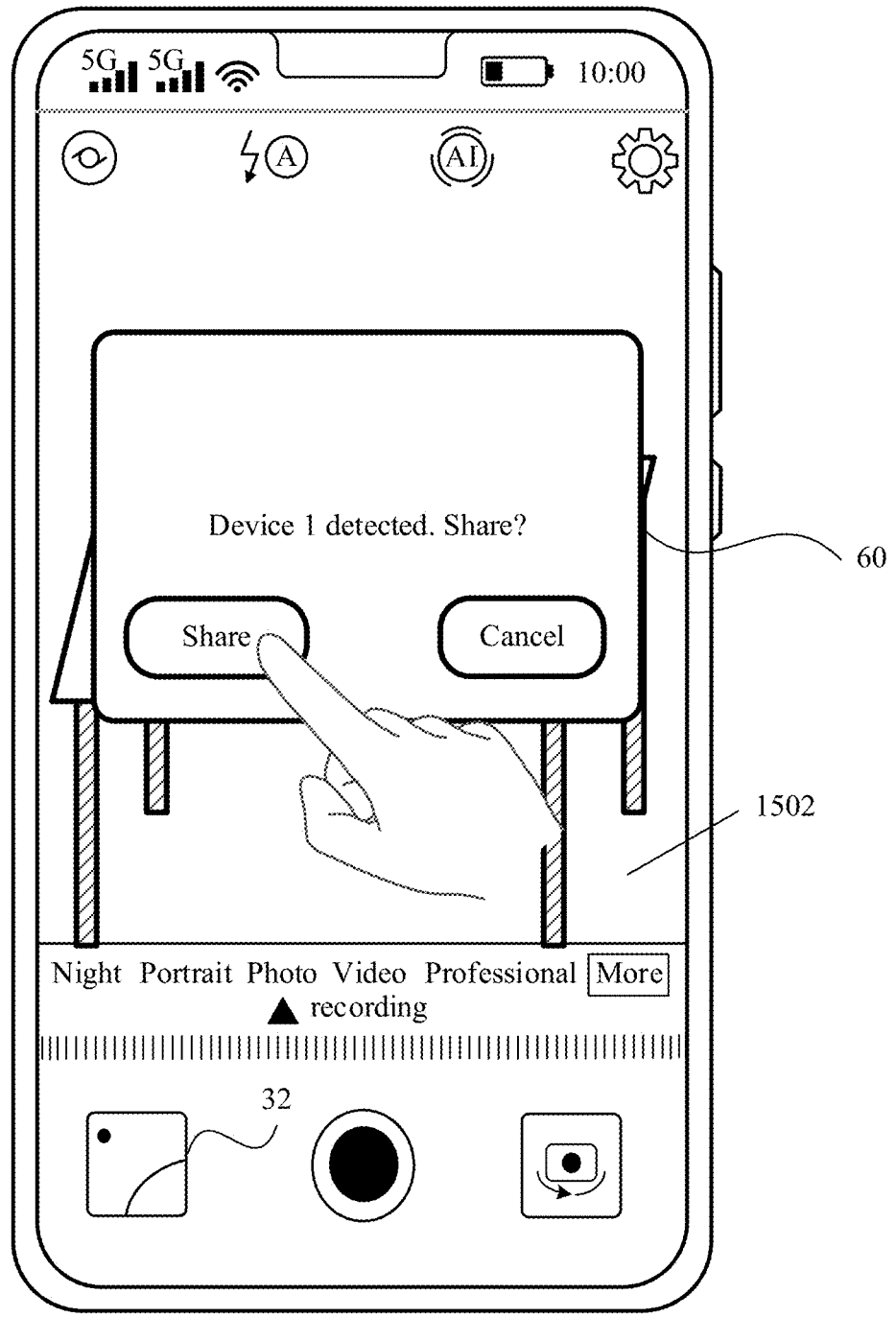

Alternatively, after the user taps the reminder window 50 shown in FIG. 15A, the mobile phone may no longer further display the interface in FIG. 15B, and directly share the taken photo with the blocked device 1. This is not limited in this embodiment of this disclosure.

It should be noted that the mobile phone may communicate with another nearby electronic device in a plurality of possible manners such as BLUETOOTH and a WI-FI module. In this case, the mobile phone may sense a nearby electronic device. Alternatively, the mobile phone determines, by using a wireless positioning technology such as UWB, that there is another electronic device nearby, identifies a type and the like of the electronic device, and may display the type of the electronic device in the photographing preview interface. In embodiments of this disclosure, a communication interaction manner and a positioning manner between the mobile phone and another nearby electronic device are not limited.

According to the foregoing method, when the mobile phone identifies that there is another electronic device in the preview image and the electronic device is blocked by an obstruction, in a process of sharing a photo by the user, reminder information such as a text or an icon may be displayed in the photographing preview interface, to prompt the user of a location of the blocked electronic device, and the user may further quickly share the shot photo with the blocked electronic device. In this way, a possible way for the user to share a photo with the blocked electronic device is provided, and operation steps of sharing a photo by the user are simplified.

In another possible scenario, the mobile phone may identify, by using a wireless positioning technology, that there is another electronic device nearby, and the electronic device is not displayed in a current preview image of the mobile phone. For this scenario, in embodiments of this disclosure, reminder information may be further displayed in a photographing preview interface, to remind a user that another electronic device exists in a specific orientation.

Figure 15C:
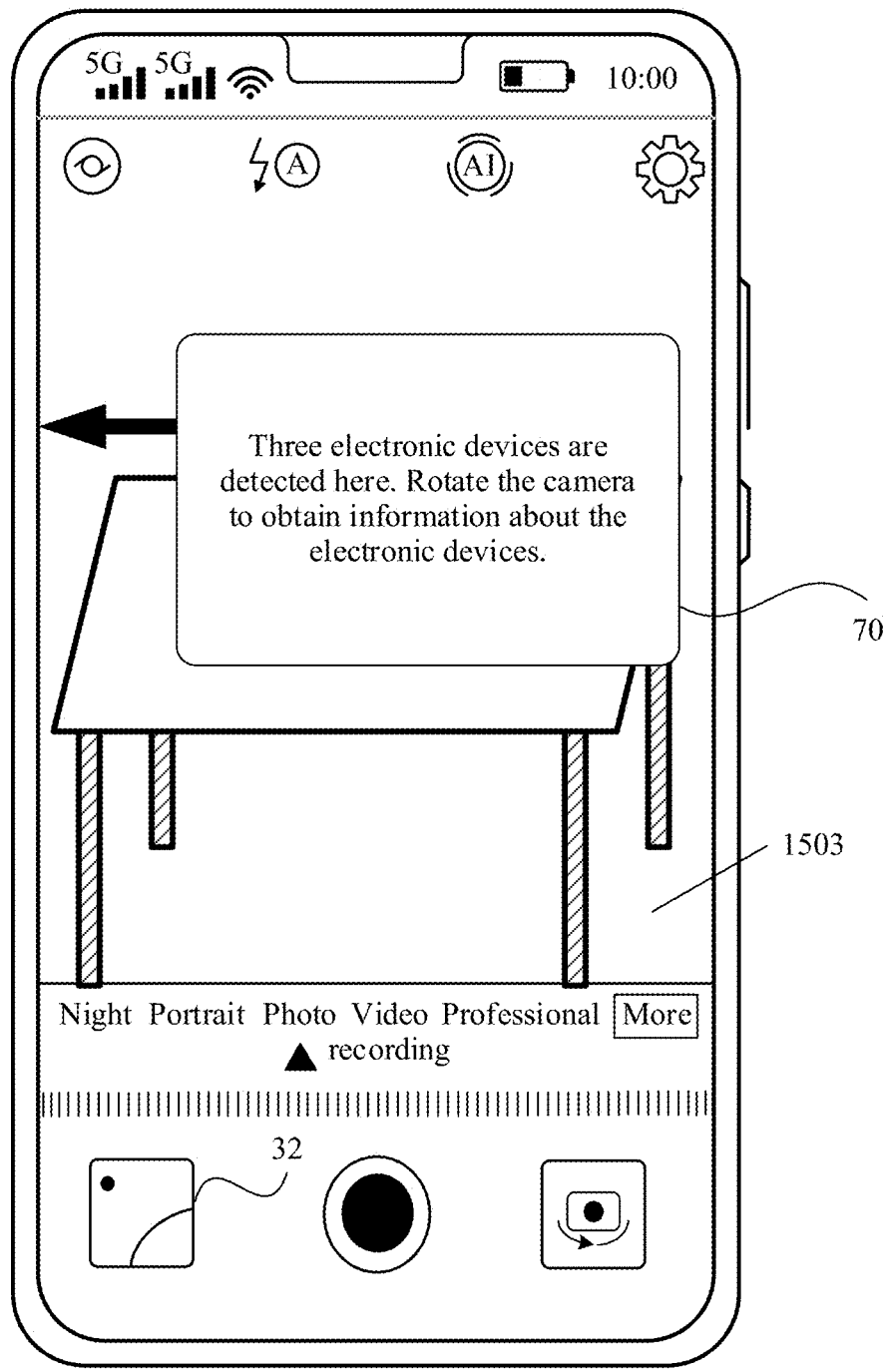
Figure 15D:
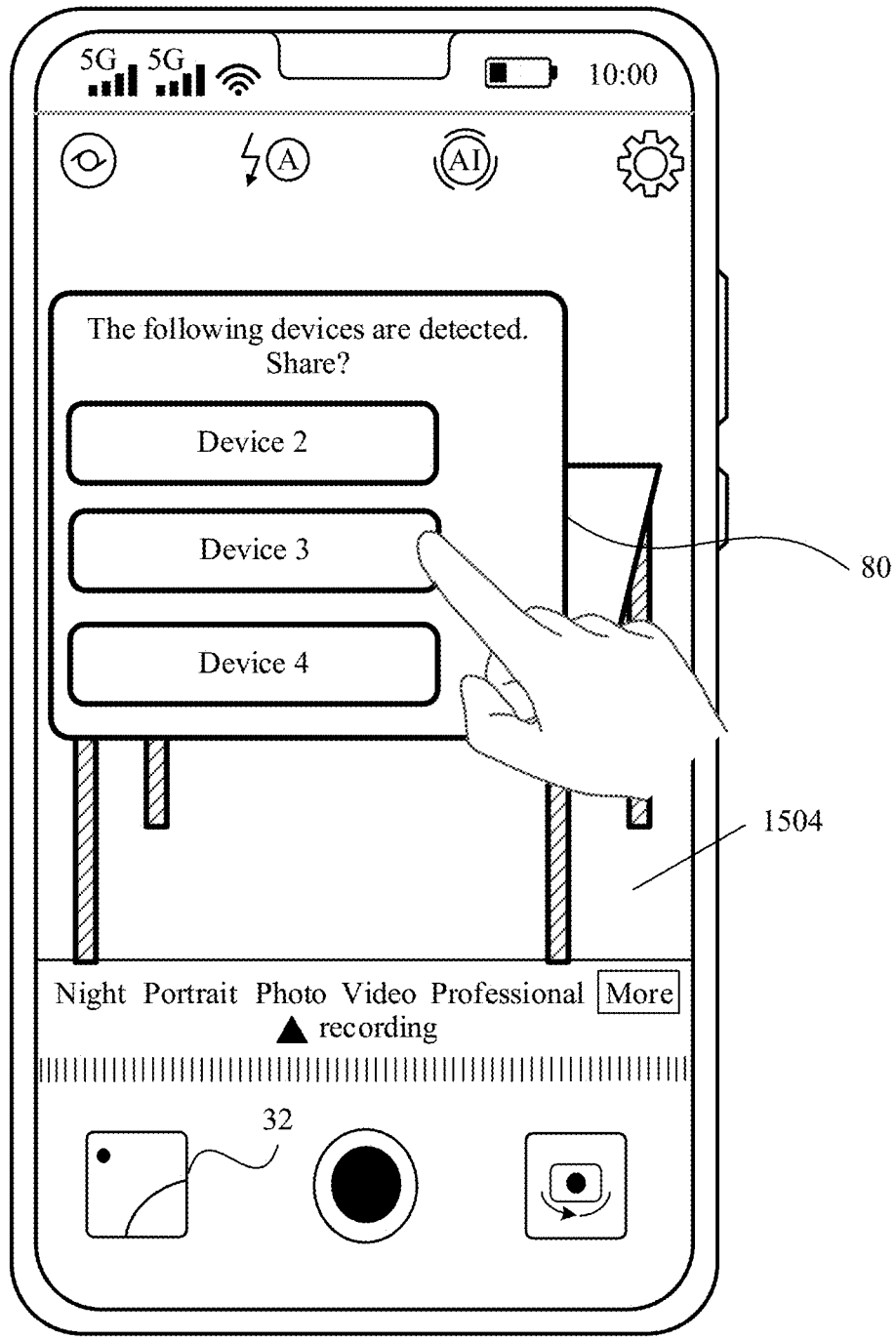

For example, as shown in FIG. 15C, on the photographing preview interface 1503, a preview image obtained by the camera of the mobile phone does not include any electronic device, but the mobile phone may detect three electronic devices in a left-side area outside the preview image. In this scenario, a reminder window 70 may be displayed on the interface 1503, and the reminder window 70 may include text information used to remind the user of the plurality of detected electronic devices.

Optionally, in this embodiment of this disclosure, in addition to the text reminder in the reminder window 70, the reminder may further include an icon reminder. For example, in addition to the reminder window 70, the photographing preview interface 1503 of the mobile phone may further include an icon, such as a statically displayed arrow, a dynamically blinking arrow, or a jumped arrow, that marks a location of the blocked electronic device. This is not limited in this embodiment of this disclosure.

For example, as shown in FIG. 15C, the reminder window 70 displays: Three electronic devices are detected here. Rotate the camera to obtain information about the electronic devices. After the user taps the reminder window 70, the mobile phone displays an interface 1504 shown in FIG. 15D. The interface 1504 includes a device list window 80. The user may tap any device in the device list window 80, for example, a device 3, to determine to share a currently taken photo with the device 3.

Alternatively, in another possible manner, the user may rotate a direction of the mobile phone based on the reminder information on the interface 1503, so that the camera of the mobile phone may obtain three detected electronic devices, and display, in the preview image, a device 3 with which the user is to share a photo, so that the shot photo can be quickly shared with another electronic device according to the method described in FIG. 14A, FIG. 14B, FIG. 14C, FIG. 14D, and FIG. 14E.

According to the foregoing method, when there is no other electronic device in the preview image obtained by the camera of the mobile phone, but the mobile phone detects that there is another electronic device nearby, reminder information such as a text or an icon may be displayed in the photographing preview interface, to prompt the user of information, a location, or the like of another electronic device with which the user can share a photo nearby. In this way, in a photo sharing process, the user may quickly share the shot photo with the electronic device by dragging the photo to another electronic device in the preview image, thereby providing another possible photo sharing manner for the user, and simplifying operation steps of sharing the photo by the user.

In this embodiment of this disclosure, a mobile phone is used as a sending device, and an electronic device that receives a photo shared by a user may be used as a "receiving device". For the photo sharing processes in FIG. 14A, FIG. 14B, FIG. 14C, FIG. 14D, and FIG. 14E, and FIG. 15A, FIG. 15B, FIG. 15C, and FIG. 15D, after the user drags the icon 30 of the thumbnail photo to the receiving device identified by the mobile phone, correspondingly, a receiving window of the photo may appear on the receiving device.

Figures 16A, 16B:
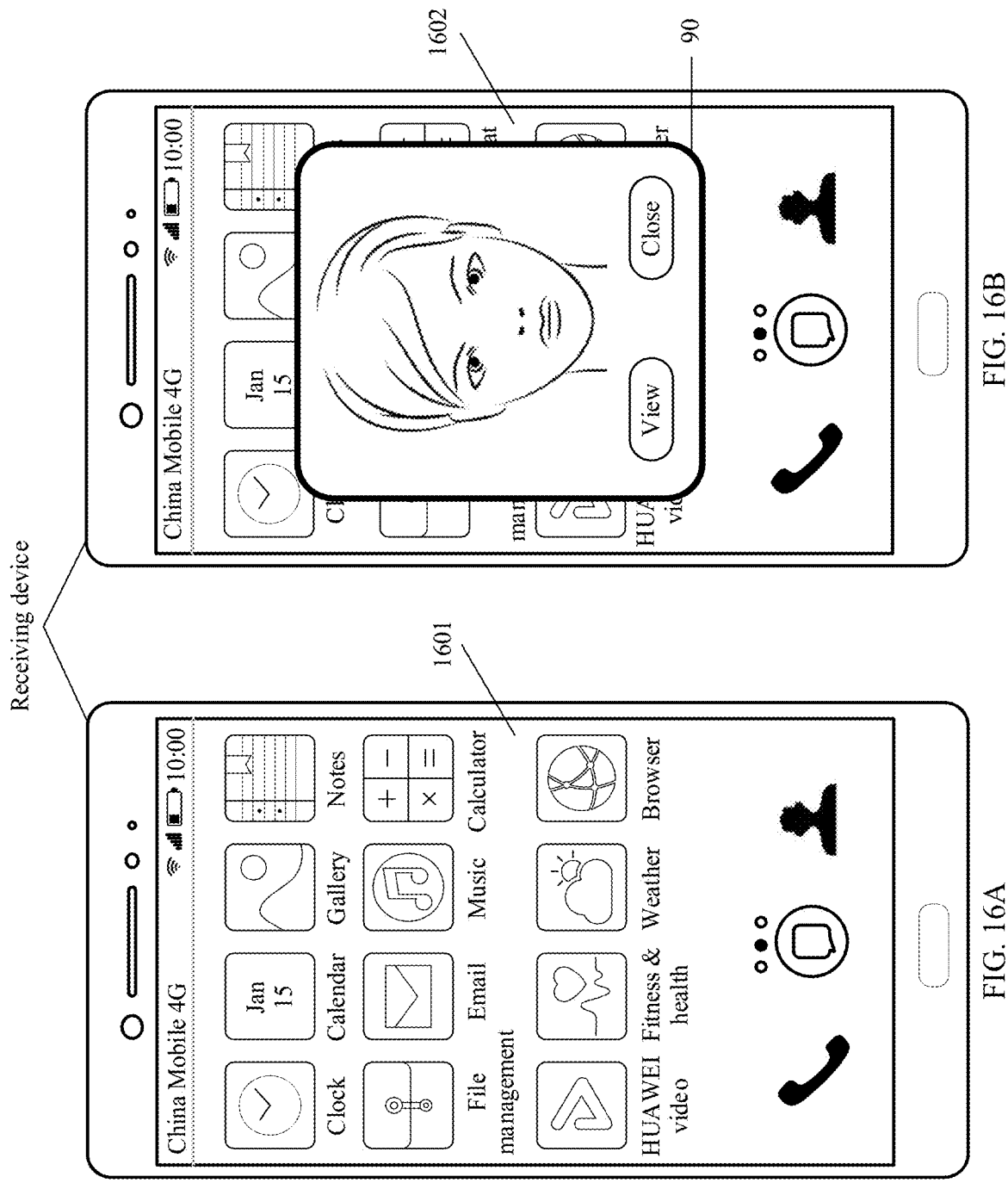
FIG. 16A and FIG. 16B are schematic diagrams of graphical user interfaces of an example of photo receiving according to an embodiment of this disclosure.

FIG. 16A and FIG. 16B are schematic diagrams of graphical user interfaces of an example of photo receiving according to an embodiment of this disclosure. For example, FIG. 16A shows a possible interface 1601 of a receiving device. It should be understood that the interface 1601 is not limited to a home screen of the receiving device, a running interface of any application, or the like. This is not limited in this embodiment of this disclosure.

The home screen 1601 of the receiving device is used as an example. After a user performs a photo sharing operation on a mobile phone, the receiving device may display an interface 1602 shown in FIG. 16B. The interface 1602 includes a receiving window 90 of a photo. Optionally, the receiving window 90 of the photo may provide buttons such as "view" and "close" for the user, so that the user quickly views the shared photo by using the receiving device.

Optionally, the receiving window 90 of the photo may automatically disappear or hide to a notification bar of the receiving device after preset duration of displaying the photo on the interface of the receiving device. The user may view a photo sharing result of the notification bar by using a pull-down operation, or further close the photo sharing result of the notification bar by using a pull-down operation. For this process, refer to related operations in the conventional technology. Details are not described herein again.

It should be understood that, after the user drags an icon 30 of a thumbnail photo to the receiving device in an identified preview image and releases the icon 30 of the thumbnail photo, the mobile phone may transmit the currently taken photo to the receiving device. For example, a transmission manner may be not limited to a plurality of possible high-rate communication manners such as BLUETOOTH transmission, WI-FI transmission, NFC transmission, and a future 5G mobile communications system. A photo transmission manner is not limited in this embodiment of this disclosure.

It should be further understood that the shared photo may be a latest photo taken by the user by currently tapping the photographing shutter button, or may be a photo taken by the user before, or may be a picture from another source stored on the mobile phone of the user. This is not limited in this embodiment of this disclosure.

In other words, the user may open the camera application, do not take a photo, directly touch and hold and drag a local album icon, and share, with the receiving device, a first photo whose photographing date is closest to current date in the local album, or a picture that is from another source and that is stored in the mobile phone of the user. This is not limited in this embodiment of this disclosure.

The foregoing describes a process in which the user shares one photo by using the camera application. In addition, an embodiment of this disclosure further provides a photo sharing method. The user may share, by using the camera application, a plurality of photos to a receiving device identified in a preview image.

Figure 17A:
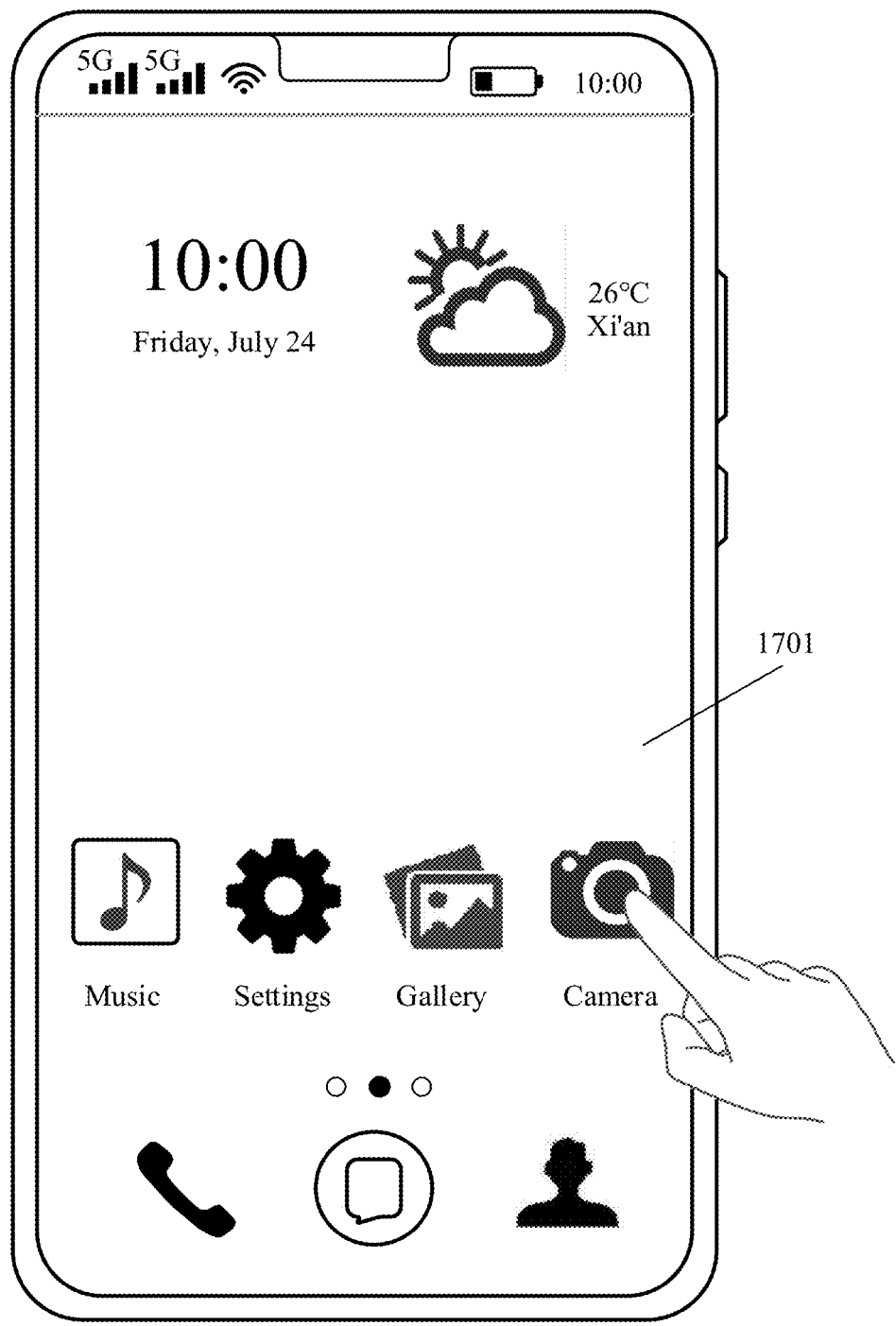
FIG. 17A, FIG. 17B, FIG. 17C, FIG. 17D, FIG. 17E, and FIG. 17F are schematic diagrams of graphical user interfaces of an example of a photo sharing process according to an embodiment of this disclosure.
Figure 17B:
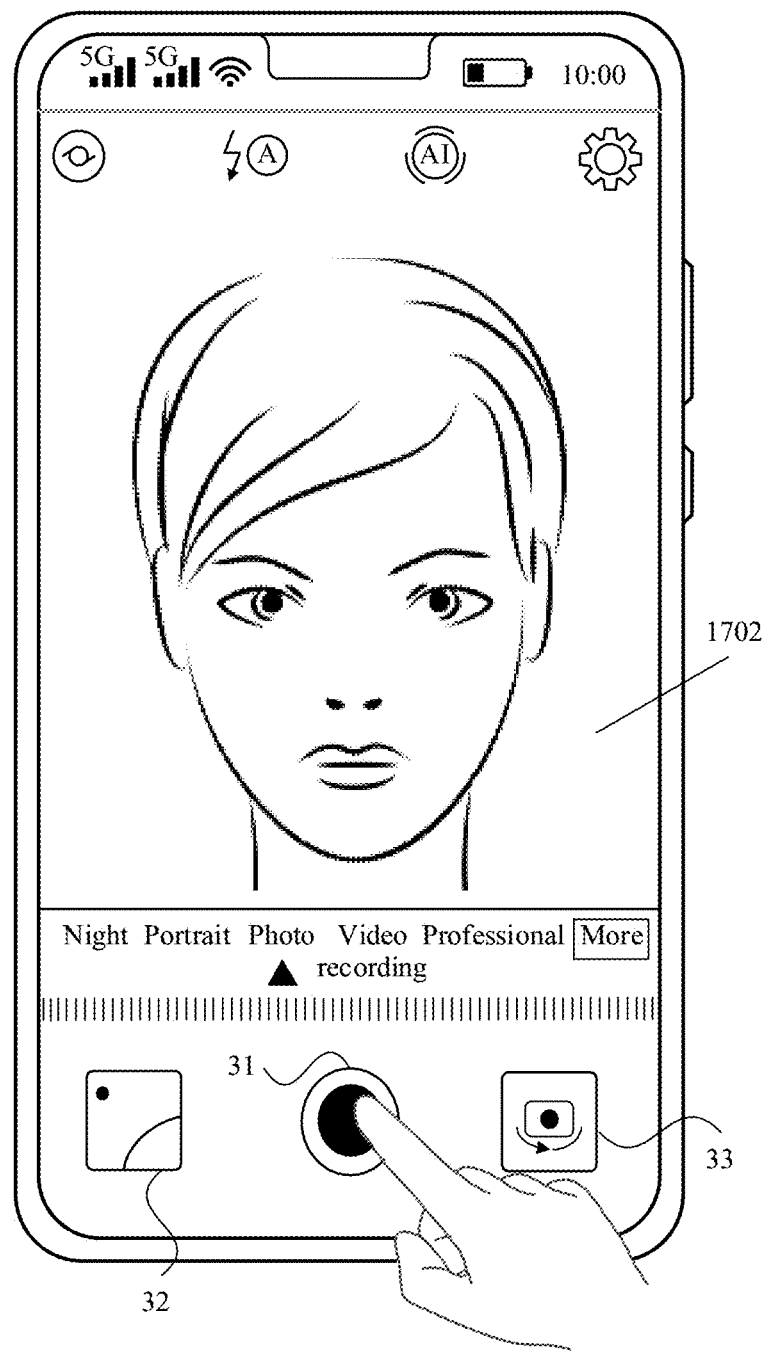

FIG. 17A, FIG. 17B, FIG. 17C, FIG. 17D, FIG. 17E, and FIG. 17F are schematic diagrams of graphical user interfaces of an example of a photo sharing process according to an embodiment of this disclosure. As shown in FIG. 17A, in an unlock mode, a mobile phone currently outputs a home screen 1701. A user taps an icon of a camera application in the home screen 1701, and in response to the tap operation of the user, the mobile phone displays a photographing preview interface 1702 shown in FIG. 17B. In the photographing preview interface 1702, the user taps a photographing shutter button 31, and in response to the photographing operation of the user, the mobile phone shoots a photo and saves the shot photo in a local album.

Figure 17C:
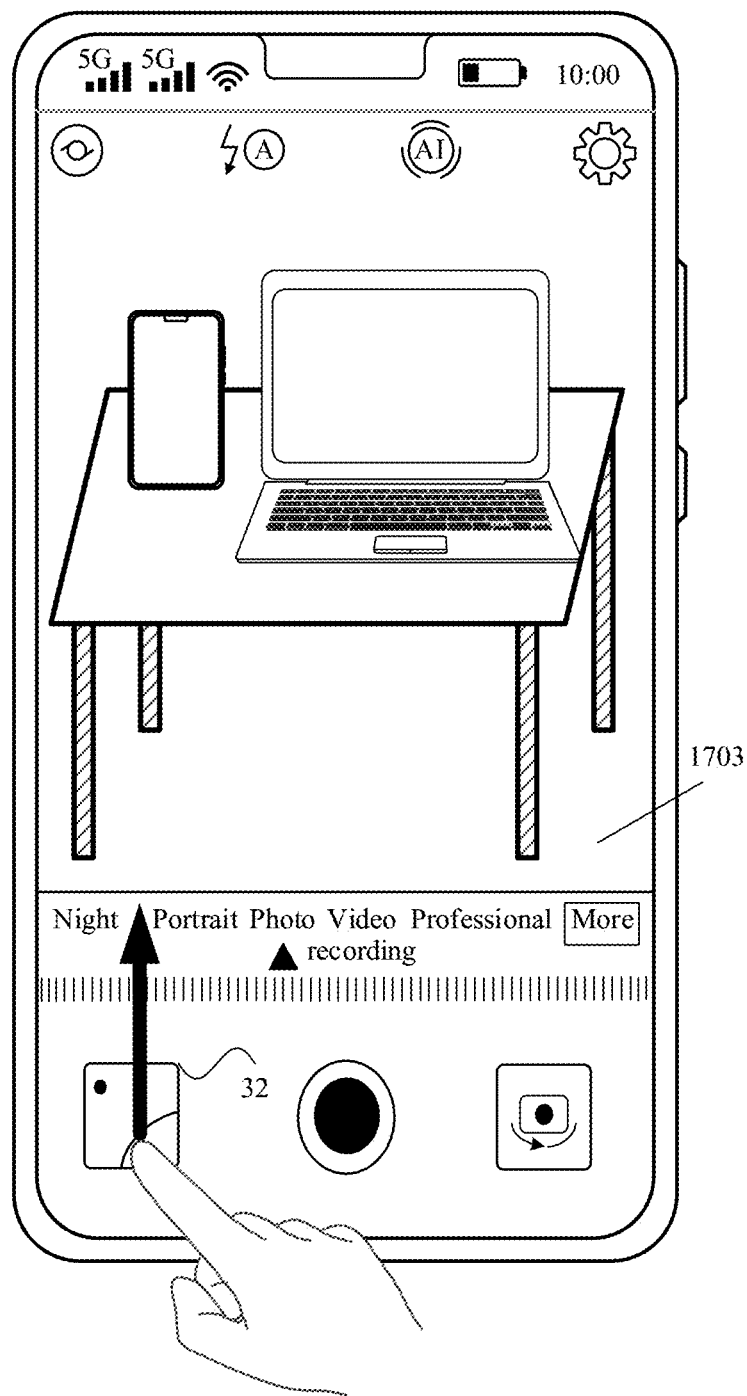
Figure 17D:
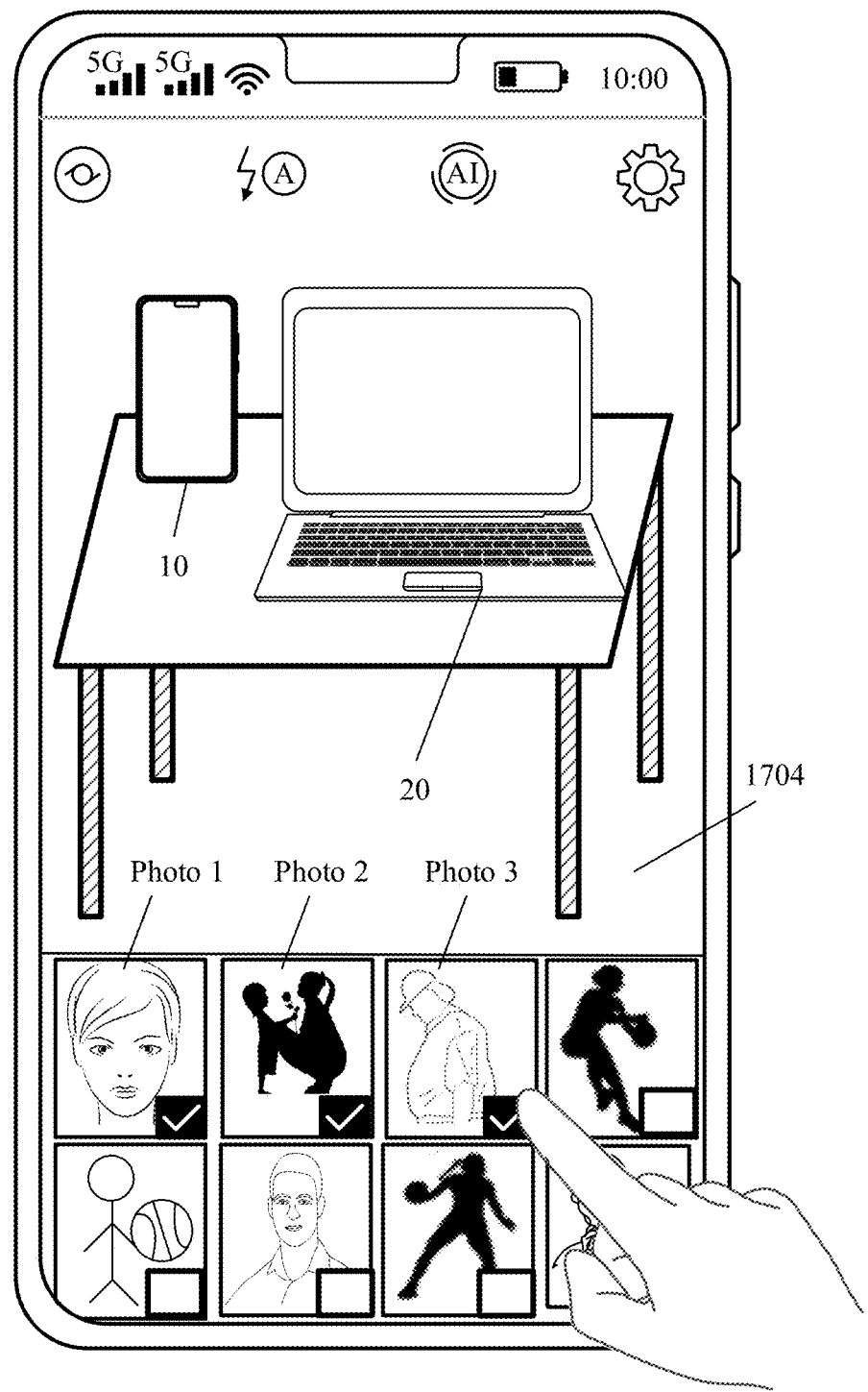

The user performs an operation shown in FIG. 17C, further, selects a local album icon 32, and drags the local album icon 32 upward along a direction indicated by an arrow. In response to the drag operation of the user, the mobile phone displays an interface 1704 shown in FIG. 17D. A photo list is displayed in the interface 1704. As shown in FIG. 17D, the photo list may display thumbnails of a plurality of photos, such as a photo 1, a photo 2, and a photo 3. Optionally, the photo list may be displayed in a bottom area of the interface 1704, and display of a preview image in the interface 1704 is not affected, so that it is ensured that the user can see content in the preview image.

In a possible case, the photos in the photo list may be arranged according to a photographing order of the user. For example, the photo 1 is a latest photo taken by the user, and photographing time of the photo 2 and photographing time of the photo 3 are earlier than photographing time of the photo 1.

Alternatively, the photos in the photo list may be arranged in another possible arrangement order. For example, if it is detected that a photographing place is a company, a photo whose photographing place is the company may be displayed in the photo list. This is not limited in embodiments of this disclosure.

In a possible case, after the user performs the operation shown in FIG. 17C to display the photo list, the first photo in the photo list may be selected by default. In other words, a lower right corner of the photo 1 in FIG. 17D is identified as a selected to-be-shared photo by default. If the user does not expect to share the photo 1, the user may tap a selection box in the lower right corner of the photo 1 to deselect the photo 1. In the same way, if the user expects to share the photo 1, the photo 2, and the photo 3 at the same time, the user may tap a selection box in a lower right corner of each photo to select a plurality of to-be-shared photos. Details are not described herein again.

After the user selects the to-be-shared photo 1, the photo 2, and the photo 3, the finger may touch and hold any area of the to-be-shared photo 1, the photo 2, and the photo 3. In response to the touch and hold operation of the user, the mobile phone displays an interface 1705 shown in FIG. 17E, and displays an icon 30 of a thumbnail photo in the interface 1705.

In addition, the mobile phone enables a device identification function, and identifies, based on a preview image presented in the current photographing preview interface 1705, whether the preview image includes another electronic device. Optionally, only a thumbnail of any one of the to-be-shared photo 1, the photo 2, and the photo 3 may be displayed on the icon 30 of the thumbnail photo. This is not limited in this embodiment of this disclosure.

Optionally, in this embodiment of this disclosure, a process of sharing a plurality of photos provided in this embodiment of this disclosure may be triggered by using another preset operation, or the mobile phone may be triggered by using another preset operation to identify an electronic device in the preview image, for example, the preset operation is not limited to selecting the local album icon 32 and dragging it upward, double-tapping the local album icon 32, or drawing a fixed pattern in the photographing preview interface 1703. This is not limited in this embodiment of this disclosure.

Figure 17E:
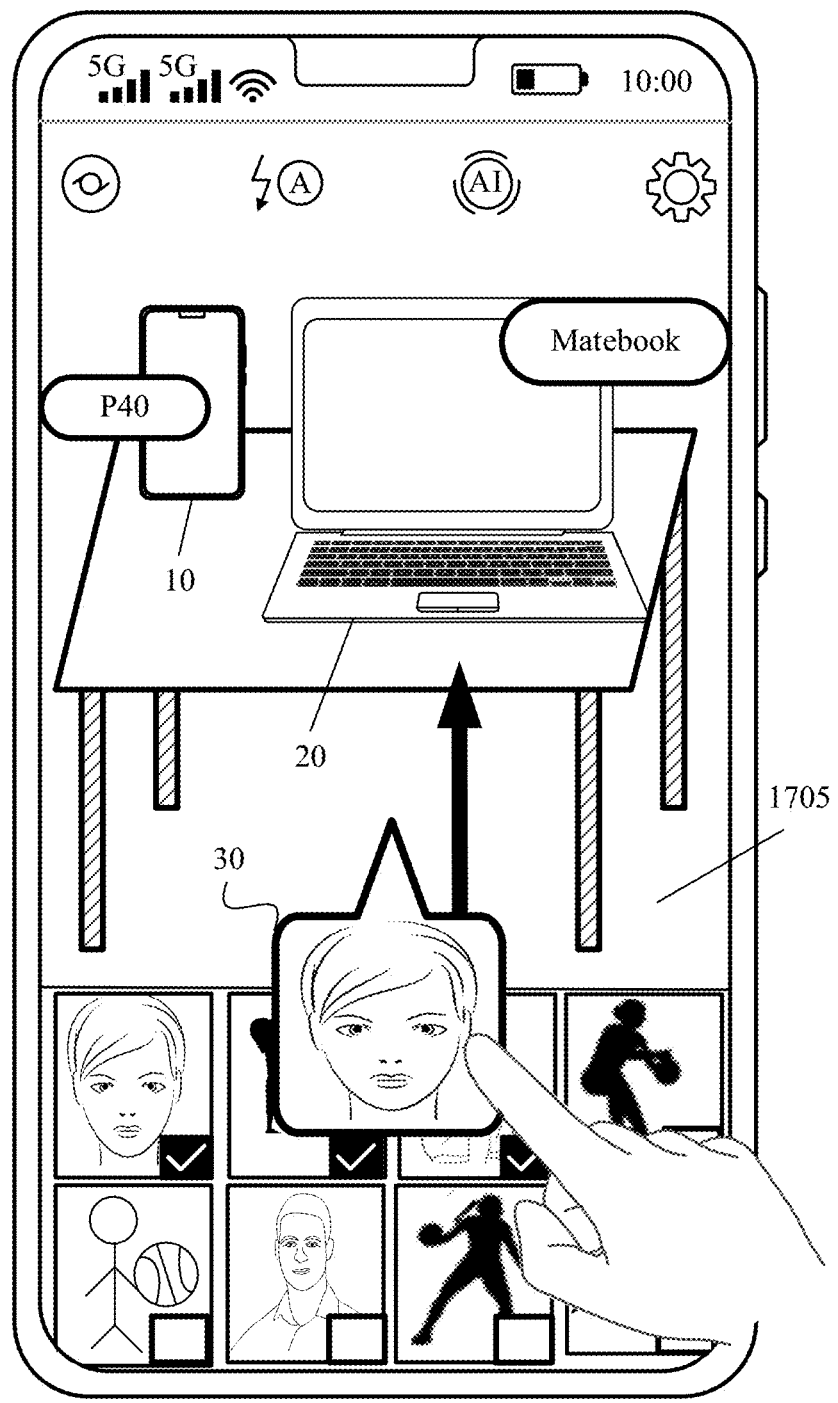

For example, as shown in FIG. 17E, if a currently presented preview image includes a mobile phone 10 and a PC 20 on a table, the mobile phone may identify the mobile phone 10 and the PC 20 in the preview image, and display, in the preview image, a name of the identified mobile phone 10 and a name of the identified PC 20. For example, the name of the mobile phone 10 is "P40", and the name of the PC 20 is "MATEBOOK". Optionally, the mobile phone may not display names of other electronic devices in the preview image that are identified, and only mark "device 1", "device 2", and the like. This is not limited in this embodiment of this disclosure.

After the mobile phone identifies P40 and MATEBOOK included in the preview image of the interface 1705, the user may drag, according to a requirement of the user, the icon 30 of the thumbnail photo to a to-be-shared target device.

Figure 17F:
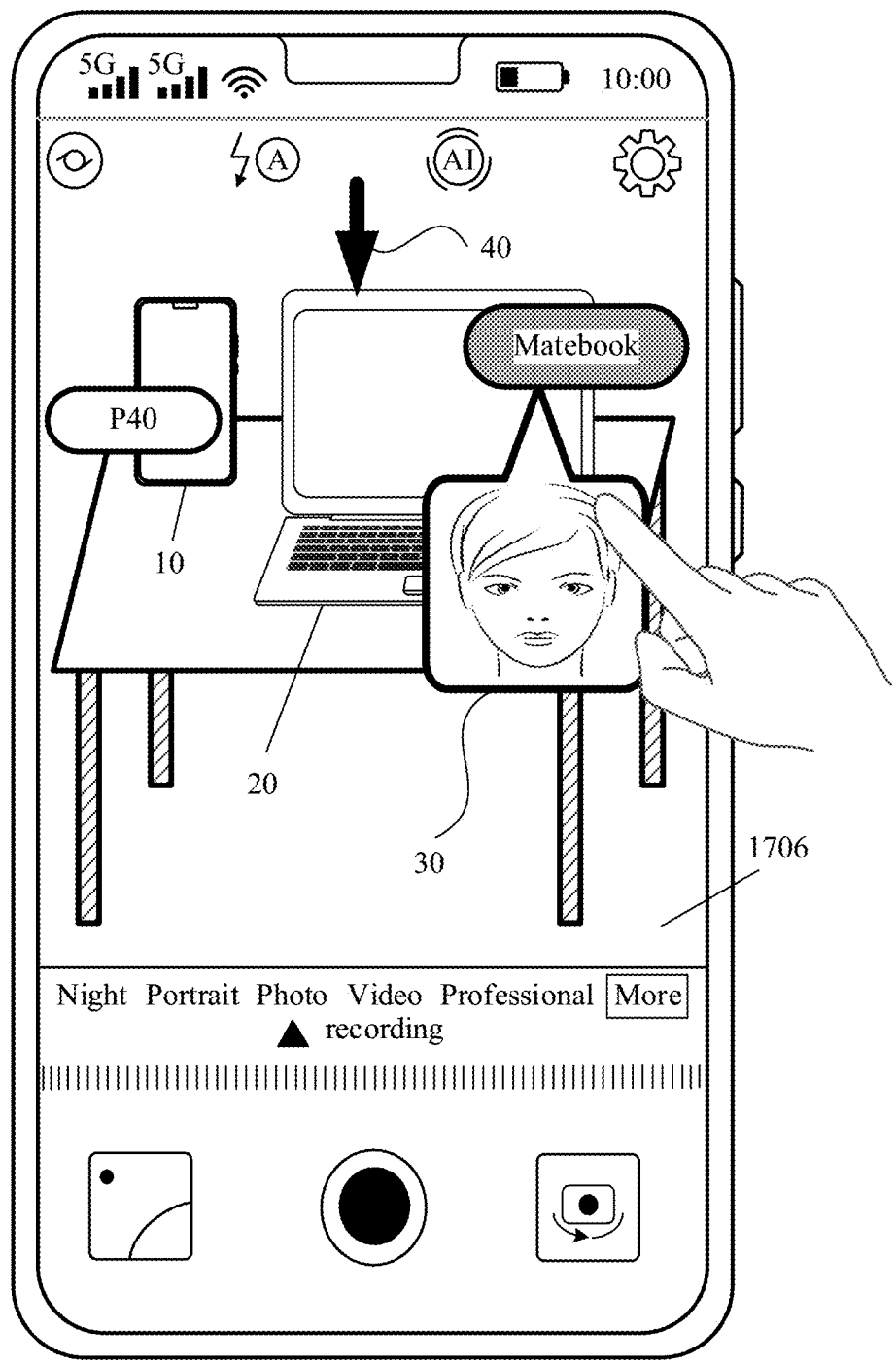

For example, as shown in FIG. 17F, icons of "P40" and "MATEBOOK" are displayed in the preview image. The user drags the icon 30 of the thumbnail photo to the icon area of MATEBOOK and releases the icon area, that is, the selected photo 1, the selected photo 2, and the selected photo 3 may be shared with MATEBOOK. Alternatively, the user drags the icon 30 of the thumbnail photo to any location in an area in which MATEBOOK is located and releases the icon, that is, the selected photo 1, the selected photo 2, and the selected photo 3 may be shared with MATEBOOK.

Optionally, the user drags the icon 30 of the thumbnail photo to a location of the MATEBOOK icon and then releases the icon. The MATEBOOK icon may be presented in different colors, or display other dynamic effects such as a size change, a jump, and a blinking light, to remind the user to share the currently taken photo with MATEBOOK identified in the preview image.

In a possible case, in a process in which the user drags the icon 30 of the thumbnail photo, a reminder control may be displayed in the preview image. For example, as shown in FIG. 17F, the reminder control may be an arrow 40 or the like, and the arrow 40 may be displayed statically, jumped, or flickered, to prompt the user to drag the icon 30 of the thumbnail photo to a location identified by the arrow 40, so as to implement a photo sharing function. A display manner of the reminder control is not limited in embodiments of this disclosure.

It should be noted herein that, in the description of the embodiment of FIG. 17A, FIG. 17B, FIG. 17C, FIG. 17D, FIG. 17E, and FIG. 17F, for an operation process, a possible implementation, and the like that are the same as those described in FIG. 14A, FIG. 14B, FIG. 14C, FIG. 14D, and FIG. 14E, and FIG. 15A, FIG. 15B, FIG. 15C, and FIG. 15D, refer to the foregoing corresponding descriptions. Details are not described herein again.

Similarly, in a process of sharing a plurality of photos, a receiving device in the preview interface may also be blocked. For a specific implementation process, refer to the related descriptions of FIG. 15A, FIG. 15B, FIG. 15C, and FIG. 15D. Details are not described herein again.

According to the foregoing method, in the photo shooting process, the user may enable, by using the preset operation, the device identification function and the positioning function of the mobile phone, and identify, with reference to the identification function and the positioning function of the mobile phone, another electronic device included in the preview image of the camera. The user may select a plurality of to-be-shared photos, and directly drag the plurality of to-be-shared photos to an area in which the other electronic device is located, so as to quickly share the photos with another surrounding electronic device. In this process, an operation procedure of sharing a photo is simplified, time of sharing the photo is shortened, and user experience is improved.

For the photo sharing process in FIG. 17A, FIG. 17B, FIG. 17C, FIG. 17D, FIG. 17E, and FIG. 17F, after the user drags the icon 30 of the thumbnail photo to PC 20 identified by the mobile phone, correspondingly, a receiving window of the photo may appear on PC 20.

Figure 18A:
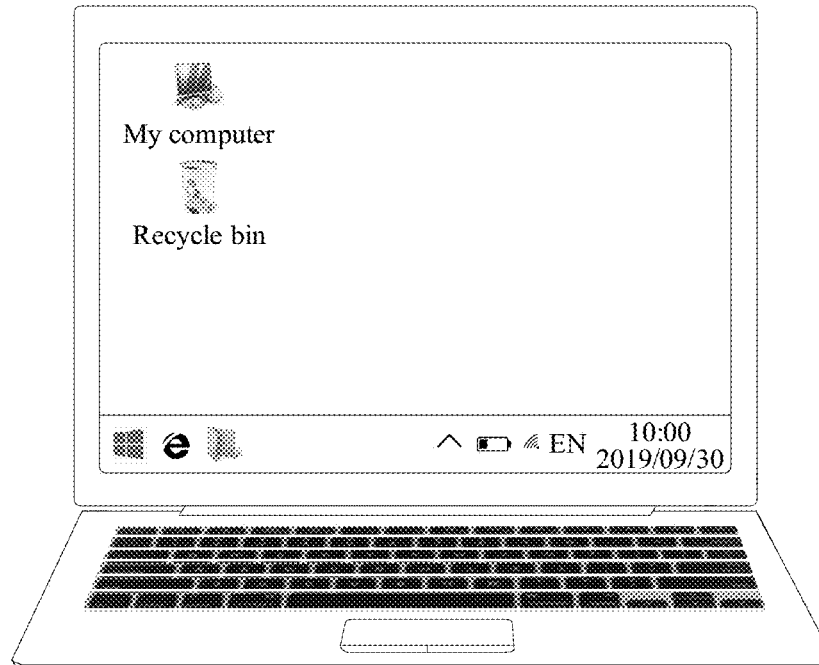
FIG. 18A and FIG. 18B are schematic diagrams of graphical user interfaces of another example of photo receiving according to an embodiment of this disclosure.
Figure 18B:
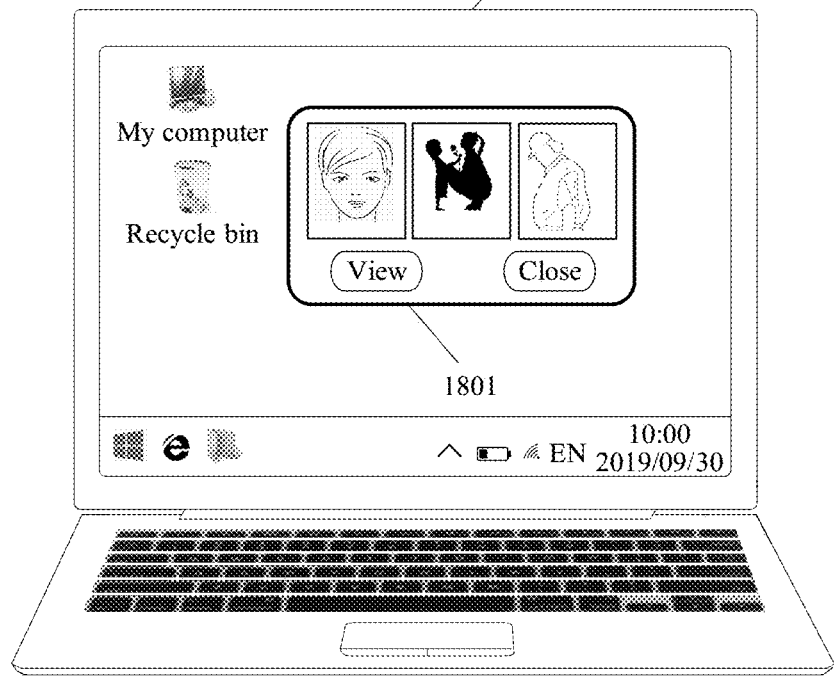

FIG. 18A and FIG. 18B are schematic diagram of graphical user interfaces of another example of photo receiving according to an embodiment of this disclosure. For example, FIG. 18A shows a possible interface of PC 20. It should be understood that PC 20 may display interfaces presented by using different systems such as a WINDOWS system and a HarmonyOS system, and the interface may be any running interface in a use process of PC 20. A display interface of PC 20 is not limited in this embodiment of this disclosure.

For example, MATEBOOK uses the WINDOWS system. After a user performs an operation of sharing three photos on a mobile phone, MATEBOOK may display a receiving window 1801 of a photo shown in FIG. 18B. Optionally, the receiving window 1801 of the photo may display thumbnails of a photo 1, a photo 2, and a photo 3 that are shared by the user. In addition, buttons such as "view" and "close" may be further provided for the user, so that the user can quickly view the shared photos.

Optionally, the receiving window 1801 of the photo may automatically disappear or hide to a status bar at the bottom of MATEBOOK after being displayed in the interface of the receiving device for preset duration. The user may view a photo sharing result by using an operation of tapping the status bar, or further close the photo sharing result in the status bar. For this process, refer to related operations in the conventional technology. Details are not described herein again.

It should be understood that, after the user drags the icon 30 of the thumbnail photo to MATEBOOK in the identified preview image and releases the icon 30 of the thumbnail photo, the mobile phone may transmit the currently taken photo to MATEBOOK. For example, a transmission manner between the mobile phone and MATEBOOK may be not limited to a plurality of possible high-rate communication manners such as BLUETOOTH transmission, WI-FI transmission, NFC transmission, and a future 5G mobile communications system. This is not limited in this embodiment of this disclosure.

It should be further understood that the shared photo may be a latest photo taken by the user by currently tapping the photographing shutter button, or may be a photo taken by the user before, or may be a picture from another source stored on the mobile phone of the user. This is not limited in this embodiment of this disclosure. In other words, the user may open a camera application, do not take a photo, directly touch and hold and drag a local album icon, and share, with the receiving device, a first photo whose photographing date is closest to current date in the local album. This is not limited in this embodiment of this disclosure.

In conclusion, according to the photo sharing method provided in embodiments of this disclosure, in a process of taking a photo or running a camera application, the user may enable a device identification function and a positioning function of an electronic device by using a preset operation. In addition, another electronic device included in the preview image of the camera is identified based in the identification function and the positioning function of the electronic device. The user may select one or more to-be-shared photos by using a shortcut operation, and directly drag the one or more to-be-shared photos to an area in which the other electronic device is located, to quickly share the one or more photos with another surrounding electronic device. In addition, in embodiments of this disclosure, for a plurality of scenarios such as a scenario in which there is another blocked electronic device in the preview image, a user-friendly interaction interface is provided for the user, so that the user can share one or more photos by using a shortcut operation. In this process, an operation procedure of sharing a photo is simplified, time of sharing the photo is shortened, and user experience is improved.

Figure 19A:
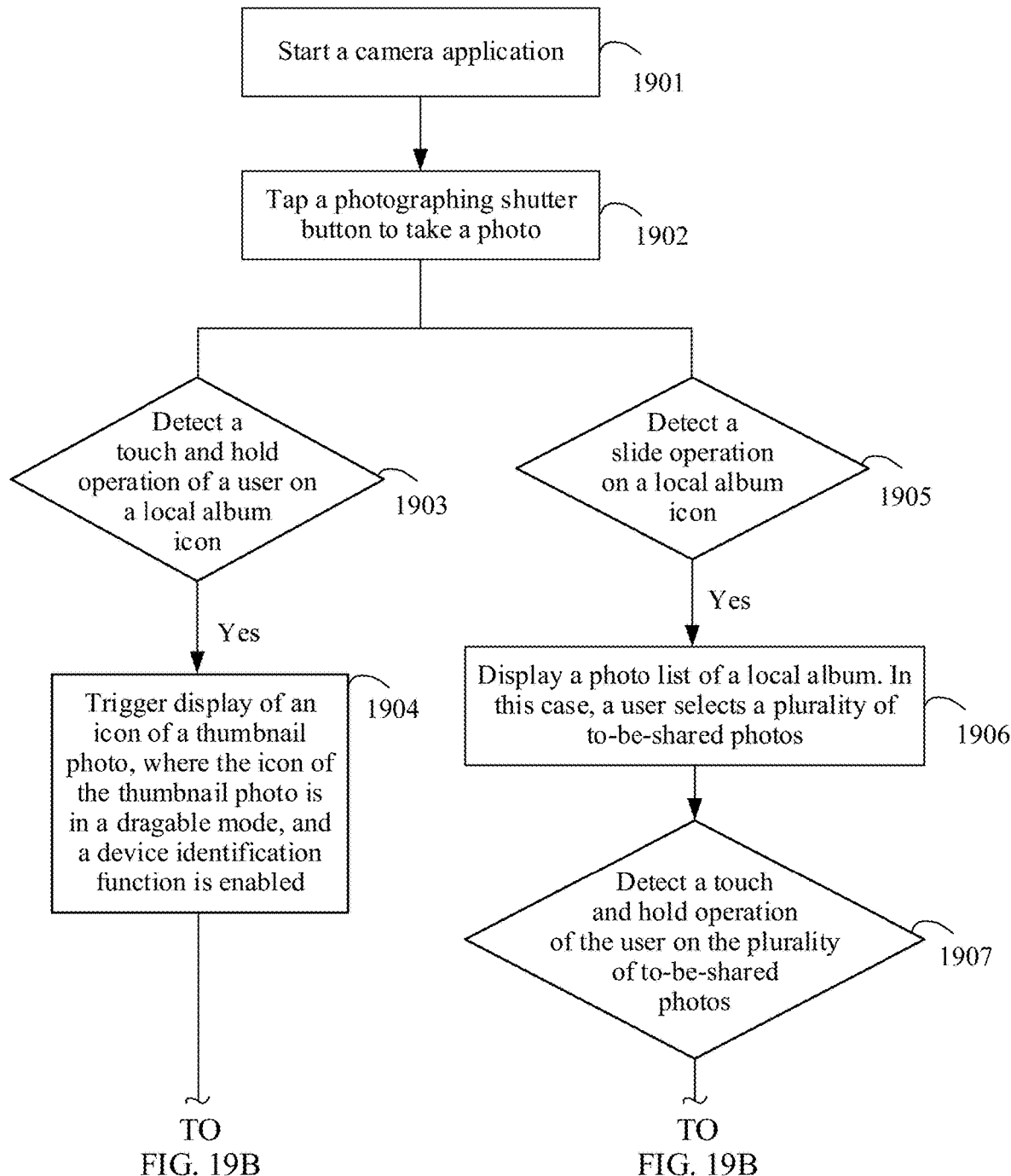
FIG. 19A and FIG. 19B are a schematic flowchart of an example of a photo sharing method according to an embodiment of this disclosure.
Figure 19B:
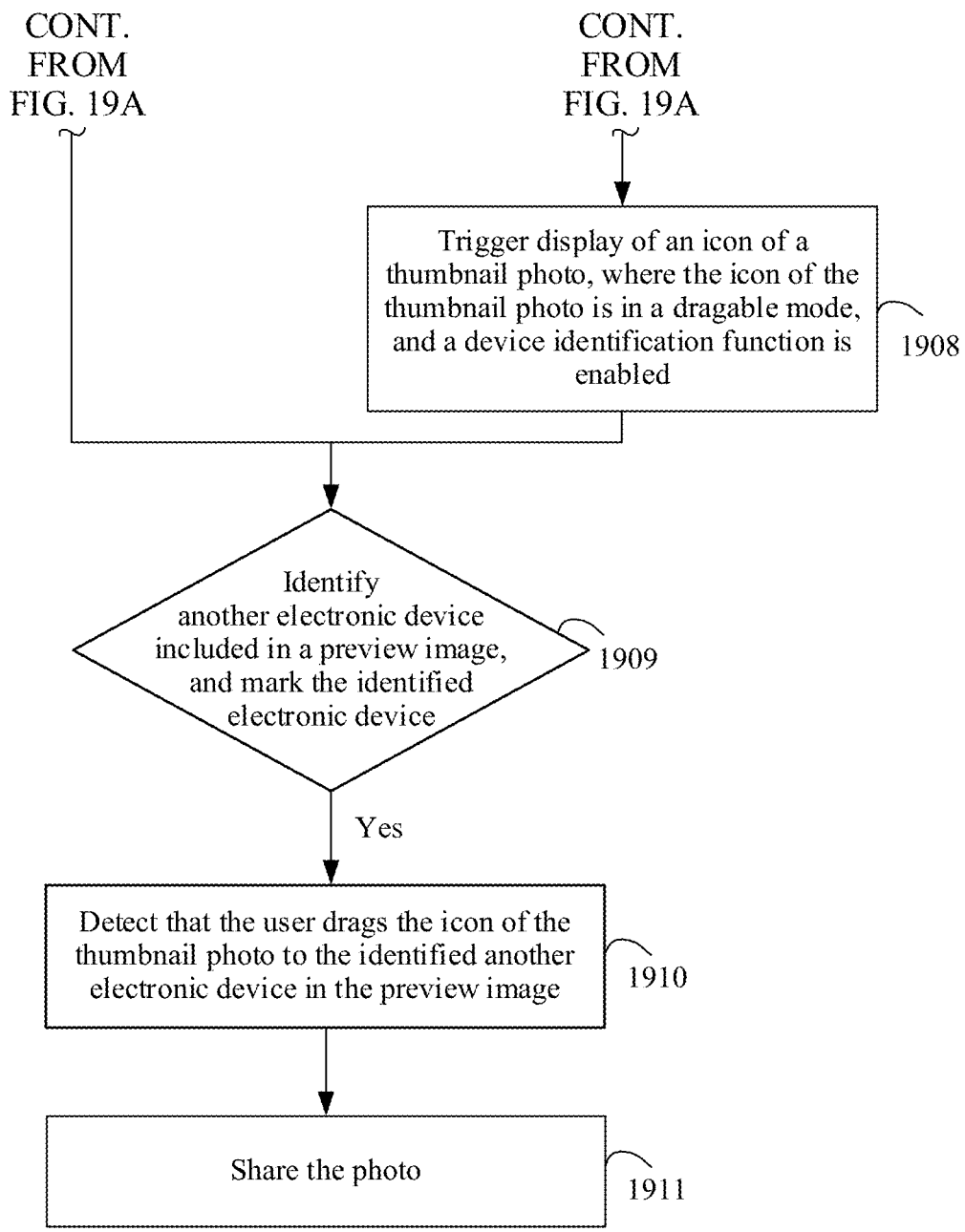

With reference to FIG. 14A, FIG. 14B, FIG. 14C, FIG. 14D, and FIG. 14E to FIG. 18B, the foregoing embodiment describes the photo sharing method from a user interaction layer. With reference to FIG. 19A and FIG. 19B, the following describes a photo sharing method provided in an embodiment of this disclosure from a software implementation policy layer. It should be understood that the method may be implemented in a structural electronic device (for example, a mobile phone, a tablet computer, or a computer) that is shown in FIG. 2 and FIG. 3 and that has a touchscreen, a camera assembly, and the like.

FIG. 19A and FIG. 19B are a schematic flowchart of an example of a photo sharing method according to an embodiment of this disclosure. A mobile phone is used as an example, and as shown in FIG. 19A and FIG. 19B, the method may include the following steps.

1901: Start a camera application.

Further, the mobile phone starts the camera application, and displays a photographing preview interface. For example, an implementation process of step 1901 may be shown in FIG. 14A or FIG. 17A.

1902: A user taps a photographing shutter button to take a photo.

It should be understood that, step 1902 is an optional step. Further, the photo sharing method may be applied to a scenario in which the user takes a photo. The to-be-shared photo may be a latest photo taken by the user by tapping the photographing shutter button, or may be a photo taken by the user before, or may be a picture from another source stored on the mobile phone of the user. This is not limited in this embodiment of this disclosure.

For example, when the to-be-shared photo is a photo currently taken by the user, as shown in FIG. 14B, a process of the following steps 1903 and 1904 continues to be performed.

1903: Detect a touch and hold operation performed by the user on a local album icon.

1904: When the touch and hold operation performed by the user on the local album icon is detected, trigger display of an icon of a thumbnail photo, where the icon of the thumbnail photo is in a draggable mode, and a device identification function is simultaneously enabled.

Optionally, in addition to the touch and hold operation performed by the user on the local album icon, in this embodiment of this disclosure, the photo sharing process provided in this embodiment of this disclosure may alternatively be triggered by using another preset operation, or the mobile phone may be triggered by using another preset operation to identify an electronic device in a preview image, for example, the preset operation is not limited to touching and holding the local album icon, double-tapping the local album icon, or drawing a fixed pattern in the photographing preview interface. This is not limited in this embodiment of this disclosure.

In a possible implementation, when the mobile phone does not detect the touch and hold operation performed by the user on the local album icon, the mobile phone may not identify an object in the preview image. For example, after detecting the touch and hold operation performed by the user on the local album icon, the mobile phone triggers identification of an object in the preview image, and marks names "P40" and "MATEBOOK" of the identified electronic devices, as shown in FIG. 14D. In this manner, it can be avoided that the mobile phone is always in a state of identifying an object in the preview image, thereby reducing power consumption of the mobile phone.

In another possible implementation, the mobile phone may always enable a device identification function. To be specific, the mobile phone continuously identifies an object in the preview image, and after detecting the touch and hold operation performed by the user on the local album icon, the mobile phone marks names "P40" and "MATEBOOK" of the identified electronic devices, as shown in FIG. 14D. In this manner, the mobile phone can determine an object included in the preview image in advance, and when the user enables a photo sharing function by touching and holding the local album icon, the mobile phone quickly display an identified electronic device name in an interface, thereby increasing a speed of identifying an object in the preview image by the mobile phone.

For a scenario of step 1901 to step 1904, a process of the following step 1909 to step 1911 may continue to be performed.

1909: Identify another electronic device included in the preview image, and mark the identified electronic device.

It should be understood that the mobile phone may communicate with another nearby electronic device, for example, in a plurality of possible manners such as BLUETOOTH, a WI-FI module, and NFC. In this case, the mobile phone may sense a nearby electronic device. Alternatively, the mobile phone determines, by using a wireless positioning technology such as UWB, that there is another electronic device nearby, identifies a type and the like of the electronic device, and may display the type of the electronic device in the photographing preview interface. In embodiments of this disclosure, a communication interaction manner and a positioning manner between the mobile phone and another nearby electronic device are not limited.

It should be further understood that the mobile phone may display, in the preview image, an icon that marks another electronic device in an area in which the electronic device is located, or display the icon in a blank area in the preview image, without blocking another object in the preview image. For a specific display manner, refer to the foregoing descriptions. Details are not described herein again.

1910: Detect that the user drags the icon of the thumbnail photo to the identified another electronic device in the preview image.

1911: Share the photo with the electronic device to which the user drags the icon of the thumbnail photo to reach.

Optionally, the user may drag the icon of the thumbnail photo to a location that marks an icon of another electronic device, and then release the icon. The icon may be presented in different colors, or may display another dynamic effect of a size change, a jump, or a blinking light, to remind the user to share the currently taken photo with the identified another electronic device in the preview image.

For example, as shown in FIG. 14E, when the user drags the icon 30 of the thumbnail photo to the location of the icon of P40, the color of the "P40" icon changes. In this case, the user releases the icon 30 of the thumbnail photo, so that the currently taken photo can be shared with P40.

Alternatively, for example, as shown in FIG. 17F, the user drags the icon 30 of the thumbnail photo to a location of the MATEBOOK icon and then releases the icon. The MATEBOOK icon may be presented in different colors, or display other dynamic effects such as a size change, a jump, and a blinking light, to remind the user to share the currently taken photo with MATEBOOK identified in the preview image.

In another possible scenario, the user may expect to share a plurality of photos, or a shared photo is not currently taken. For this scenario, a process of steps 1905 to 1911 may be performed.

1905: Detect a slide operation performed by the user on a local album icon.

1906: Display a photo list of a local album, and detect that the user selects a plurality of to-be-shared photos from the photo list.

For example, when the to-be-shared photo is a picture from another source stored on the mobile phone of the user, the user may start the camera application, do not take a photo, directly touch and hold and drag the local album icon, and find and select the to-be-shared photo in the photo list, as shown in FIG. 17D and FIG. 17E. This is not limited in this embodiment of this disclosure.

For example, as shown in FIG. 17C, after a slide operation performed by the user on the local album icon is detected, the photo list is displayed, and the first photo in the photo list may be selected by default. If the user does not expect to share the photo 1, the user may tap a selection box in the lower right corner of the photo 1 to deselect the photo 1. In the same way, if the user expects to share the photo 1, the photo 2, and the photo 3 at the same time, the user may tap a selection box in a lower right corner of each photo to select a plurality of to-be-shared photos. Details are not described herein again.

1907: Detect a touch and hold operation performed by the user on the plurality of to-be-shared photos.

1908: When the touch-and-hold operation performed by the user on the plurality of to-be-shared photos is detected, trigger display of an icon of a thumbnail photo, where the icon of the thumbnail photo is in a draggable mode, and a device identification function is simultaneously enabled.

Optionally, after the user selects the to-be-shared photo 1, the photo 2, and the photo 3, a finger of the user may touch and hold any area of the to-be-shared photo 1, the photo 2, and the photo 3, to implement dragging of the three photos.

1909: Identify another electronic device included in the preview image, and mark the identified electronic device.

1910: Drag the icon of the thumbnail photo to the identified another electronic device in the preview image.

1911: Share the photo with the electronic device to which the user drags the icon of the thumbnail photo to reach.

It should be noted herein that, for a procedure of the implementation process, refer to the foregoing specific descriptions of FIG. 14A, FIG. 14B, FIG. 14C, FIG. 14D, and FIG. 14E to FIG. 18B. For some same operation processes, possible implementations, and the like, refer to the foregoing corresponding descriptions. Details are not described herein again.

According to the foregoing method, in the photo shooting process, the user may enable, by using the preset operation, the device identification function and the positioning function of the mobile phone, and identify, with reference to the identification function and the positioning function of the mobile phone, another electronic device included in the preview image of the camera. The user may select a plurality of to-be-shared photos, and directly drag the plurality of to-be-shared photos to an area in which the other electronic device is located, so as to quickly share the photos with another surrounding electronic device. In this process, an operation procedure of sharing a photo is simplified, time of sharing the photo is shortened, and user experience is improved.

The foregoing describes implementation of the display interface and the method in this disclosure. The following uses a UWB wireless positioning technology as an example to describe in detail how the electronic device 100 performs ranging and angle measurement on another electronic device.

Figure 20:
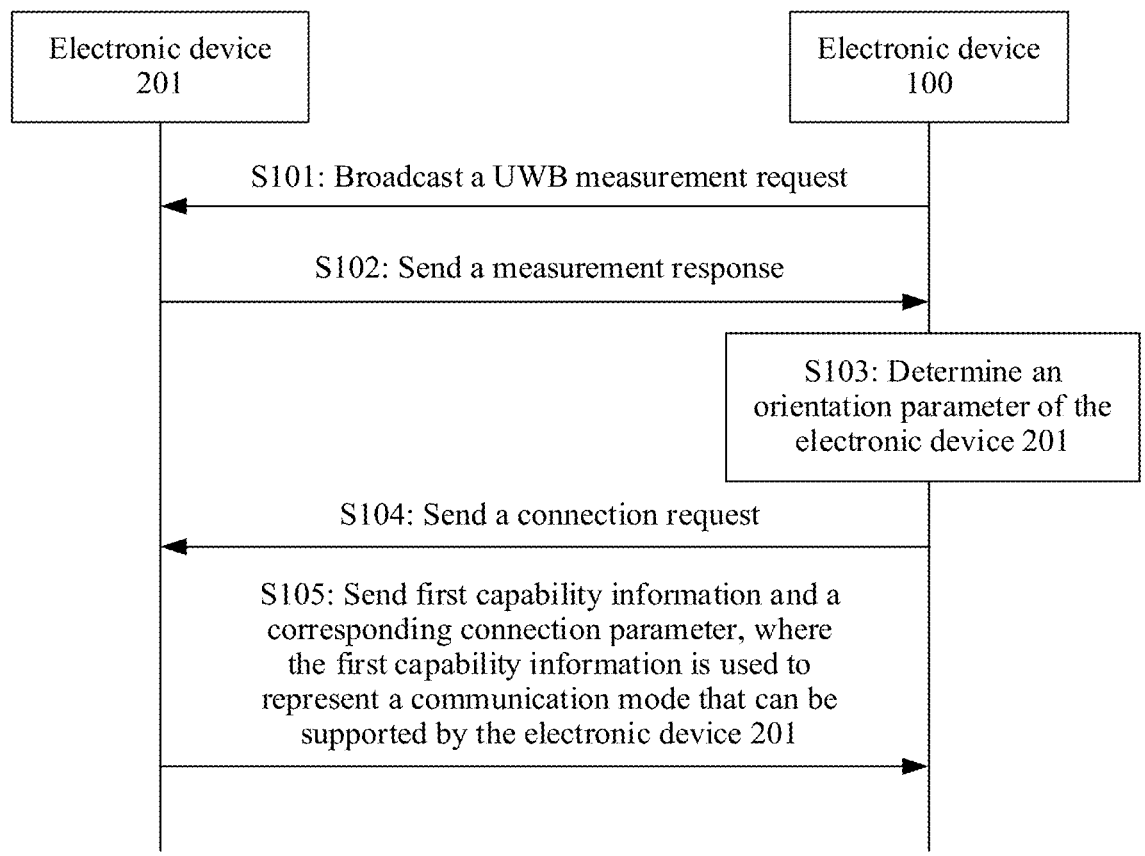
FIG. 20 is a flowchart of a positioning method according to an embodiment of this disclosure.

As shown in FIG. 20, the electronic device 100 and the electronic device 201 are used as an example. The electronic device 100 initiates a UWB measurement request. The electronic device 100 determines a distance between the electronic device 100 and the electronic device 201 based on a measurement response of the electronic device 201. Further, the foregoing device control method includes but is not limited to steps S101 to S105.

S101: The electronic device 100 broadcasts a UWB measurement request, and the electronic device 201 receives the UWB measurement request.

In some embodiments, the electronic device 100 initiates the UWB measurement request, and the electronic device 100 determines a distance between the electronic device 100 and the electronic device 201 by using a ranging algorithm 3.

Step S101 may further include the following. The electronic device 100 broadcasts a first measurement request at a moment T11, and records a sending moment of the first measurement request as T11. The first measurement request carries identity information (for example, an identifier (ID) and a media access control (MAC) address of the electronic device) of the electronic device 100. The electronic device 201 receives, at a moment T12, the first measurement request sent by the electronic device 100, and records a receiving moment of the first measurement request as T12.

S102: The electronic device 201 sends a first measurement response to the electronic device 100.

The electronic device 201 sends the first measurement response to the electronic device 201 at a moment T13. The first measurement request carries T12, T13, the identity information of the electronic device 100, and identity information of the electronic device 201. The electronic device 201 receives, at a moment T14, the first measurement response sent by the electronic device 100, and records a receiving moment of the first measurement response as the moment T14.

S103: The electronic device 100 determines an orientation parameter of the electronic device 201 based on the measurement response sent by the electronic device 201.

Further, the orientation parameter of the electronic device 201 may include one or more of a physical distance between the electronic device 201 and the electronic device 100, an AOA of a signal of the electronic device 201, and an RRSI of a signal sent by the electronic device 201. The following separately describes the three orientation parameters in detail.

1. Physical distance between the electronic device 201 and the electronic device 100. A time difference between the sending moment T11 of the first measurement request and the receiving moment T14 of the first measurement response is equal to Tround1, a time difference between the receiving moment T12 of the first measurement request and the sending moment T13 of the first measurement response is equal to Trelay1, and one-way flight time T may be represented as T=(Tround1−Trelay2)/2.

The electronic device 100 determines the one-way flight time of the signal according to the foregoing formula, and then may determine, according to a product of the one-way flight time T and a propagation speed C of the electromagnetic wave, that the physical distance D between the electronic device 100 and the electronic device 201 is C×T.

2. AOA of a signal of the electronic device 201. The electronic device 100 may calculate a receiving direction of a signal based on a phase difference between UWB antennas at different locations at which the first measurement response arrives, so as to determine a direction of the electronic device 201 relative to the electronic device 100.

Figure 21:
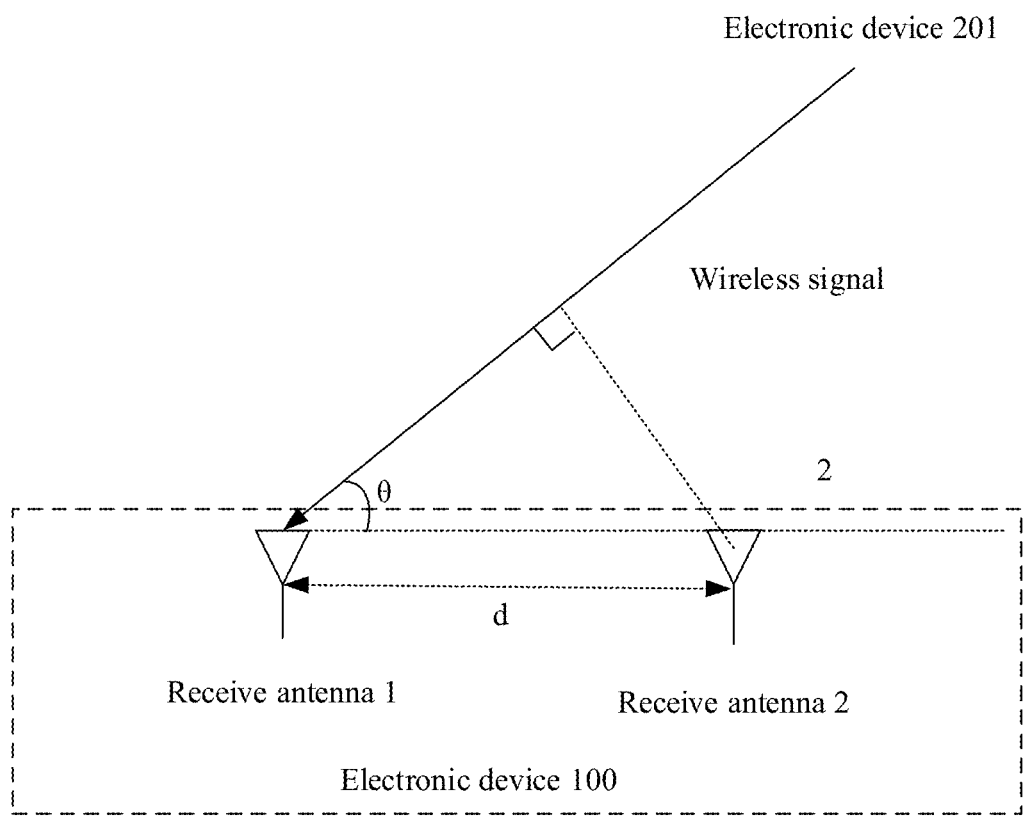
FIG. 21 is a schematic diagram of a principle of a positioning method according to an embodiment of this disclosure.

For example, as shown in FIG. 21, the electronic device 100 receives a wireless signal sent by the electronic device 201, and an AOA of a signal on the electronic device 100 (namely, an incident angle θ of the wireless signal relative to a connection line between a receive antenna 1 and a receive antenna 2) may be determined based on a phase difference φ of the signal on the receive antenna 1 and the receive antenna 2 of the electronic device 100. φ may be represented as follows:

$$\varphi = 2*\pi*d*\frac{\cos(\theta)}{\lambda} + \phi(\theta)$$

λ is a wavelength, and φ(θ) is an antenna hardware phase difference. The incident angle θ, namely, the AOA of the signal of the electronic device 201, may be determined by using the foregoing formula. For example, if the incident angle θ of the electronic device is 60 degrees, the electronic device 201 is in a clockwise 30-degree direction of the electronic device 100.

3. RRSI of a signal sent by the electronic device 201. The electronic device 100 determines, based on an average value of RRSIs corresponding to the first measurement request and the first measurement response, the RRSI of the signal sent by the electronic device 201. In some embodiments, the electronic device 100 determines, based on the RRSIs corresponding to the first measurement request and the first measurement response, the RRSI of the signal sent by the electronic device 201.

In this embodiment of this disclosure, whether there is an obstruction between the electronic device 100 and the electronic device 201 may be determined based on the RRSI of the signal sent by the electronic device 201.

It may be understood that, in a non line-of-sight (NLOS) propagation condition with an obstruction, signal attenuation is relatively large, and in a line-of-sight (LOS) propagation condition without an obstruction, signal attenuation is relatively small. Under the same propagation condition, the longer the distance, the greater the signal attenuation. In this embodiment of this disclosure, whether an obstruction exists between the electronic device 100 and the electronic device 201 may be determined based on the RRSIs of the first measurement request and the first measurement response, and the physical distance between the electronic device 201 and the electronic device 100.

In some embodiments, a preset RRSI of the signal that is sent by the electronic device 201 and that is received by the electronic device 100 may be determined based on the distance between the electronic device 100 and the electronic device 201. When the RRSI of the received signal sent by the electronic device 201 is less than the preset RRSI, it is determined that there is an obstruction between the electronic device 100 and the electronic device 201. When the RRSI of the received signal sent by the electronic device 201 is not less than the preset RRSI, it is determined that there is no obstruction between the electronic device 100 and the electronic device 201.

In some embodiments, the orientation parameter of the electronic device 201 may include a physical distance between the electronic device 100 and the electronic device 201, an AOA of a signal, and a first identity. The first identity of the electronic device 201 is used to represent whether there is an obstruction between the electronic device 100 and the electronic device 201. For example, if the first identity is equal to 1, it indicates that there is an obstruction, and if the first identity is equal to 0, it indicates that there is no obstruction.

S104: The electronic device 100 sends a connection request to the electronic device 201, and the electronic device 201 receives the connection request sent by the electronic device 100.

S105: The electronic device 201 sends first capability information and a corresponding connection parameter to the electronic device 100, where the first capability information is used to represent a communication mode that can be supported by the electronic device 201.

In some embodiments, when the first capability information represents a WI-FI communication mode, the corresponding connection parameter may include parameters such as a device ID and a pairing key. The electronic device 100 may establish a WI-FI connection to the electronic device 201 based on the foregoing connection parameter by using a connection process in the IEE802.11 standard.

In some embodiments, when the first capability information represents a BLUETOOTH communication mode, the corresponding connection parameter may include parameters such as a key, an encryption mode, and a service set identifier (SSID). The electronic device 100 may establish a BLUETOOTH connection to the electronic device 201 based on the foregoing connection parameter by using a connection process in the Institute of Electrical and Electronics Engineers (IEE) 802.15.1 standard.

In some embodiments, when the first capability information represents a WI-FI communication mode and a BLUETOOTH communication mode, the electronic device 100 may preferably use a connection process in the IEE802.11 standard to establish a WI-FI connection to the electronic device 201 based on the foregoing connection parameter.

In some embodiments, the first measurement request may further carry second capability information, and the second capability information is used to represent all communication modes that can be supported by the electronic device 100, for example, BLUETOOTH and WI-FI. The first measurement response may further carry the first capability information and a corresponding connection parameter. The second capability information includes the first capability information, and the second capability information is determined by the electronic device 201 based on the second capability information. In this way, after step S103, the electronic device 100 may directly establish a connection to the electronic device 201 based on the first capability information and the corresponding connection parameter in the first measurement response, and does not need to send a connection request again.

In some embodiments, the electronic device 100 may alternatively initiate a measurement request a plurality of times, and obtain a one-way flight time average value and an AOA average value based on a plurality of measurement requests and a plurality of measurement responses, to reduce distance and angle measurement errors.

In this disclosure, the foregoing UWB positioning method is not limited, and location information of the electronic device 201 relative to the electronic device 100 is further obtained in another manner. For example, the electronic device 100 broadcasts a UWB measurement request. The measurement request includes sending time. After receiving the measurement request, the electronic device 201 determines a time difference based on the sending time and time at which the electronic device 201 receives the measurement request, to calculate a distance (the distance is equal to the time difference multiplied by a propagation speed of an electromagnetic wave) between the electronic device 201 and the electronic device 100. The electronic device 201 calculates an angle of arrival of the measurement request based on the received measurement request, and may determine an orientation angle of the electronic device 201 relative to the electronic device 100. The electronic device 201 sends a detection response to the electronic device 100. The detection response includes the identity of the second electronic device 201 and the first location information. The electronic device 100 receives the detection response, and obtains and determines the orientation parameter of the electronic device 201 relative to the electronic device 100.

In this disclosure, the measurement request (the first measurement request) may alternatively be referred to as a detection request, and the measurement response (the first measurement response) may alternatively be referred to as a detection response.

In this disclosure, positioning is not limited to be performed in an UWB manner, and may be further performed in a BLUETOOTH, WI-FI, or GPS manner.

Figure 22:
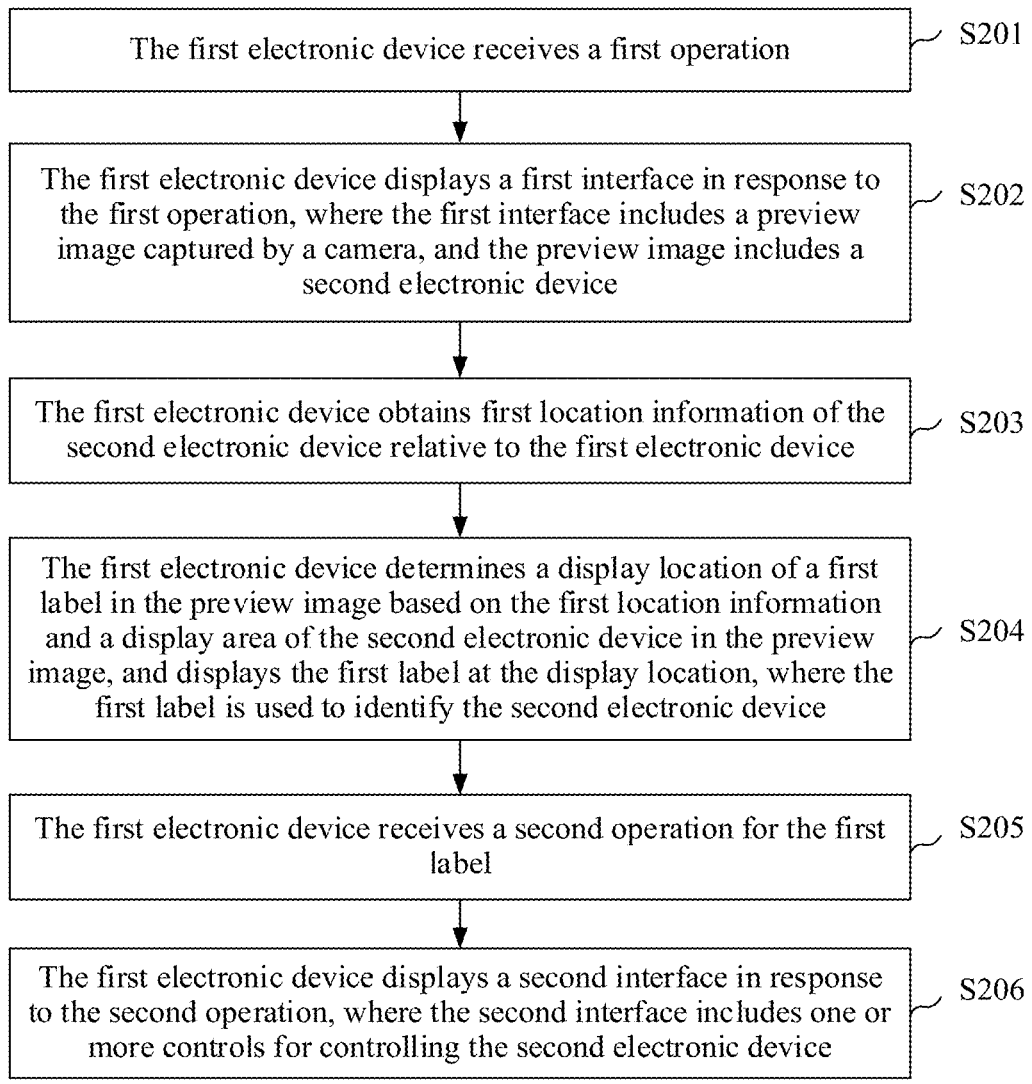
FIG. 22 is a schematic flowchart of a device identification method according to an embodiment of this disclosure.

This disclosure provides a device identification method, applied to a first electronic device having a camera. As shown in FIG. 22, the method includes the following steps.

S201: The first electronic device receives a first operation.

Figure 7B:
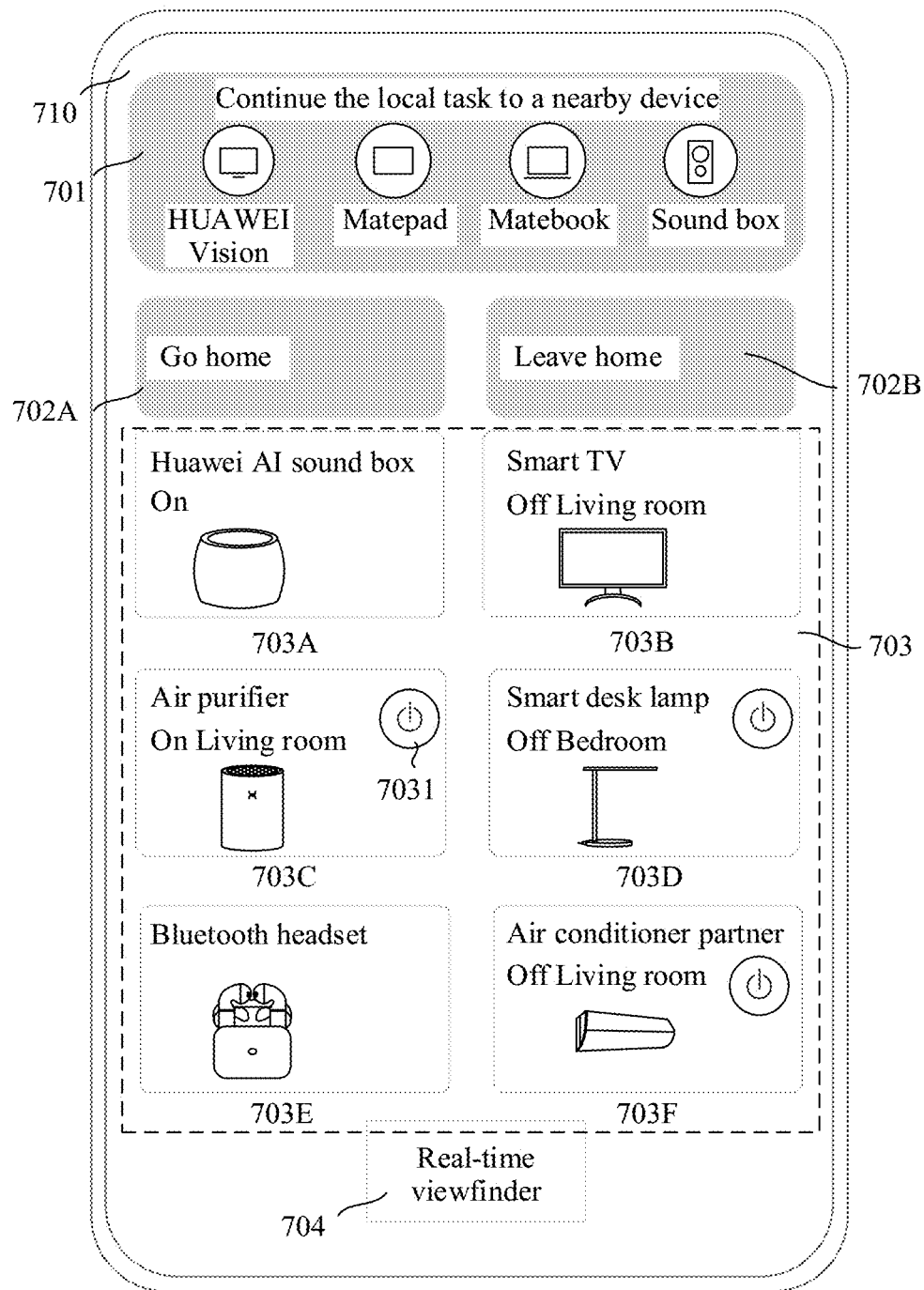
Figure 7C:
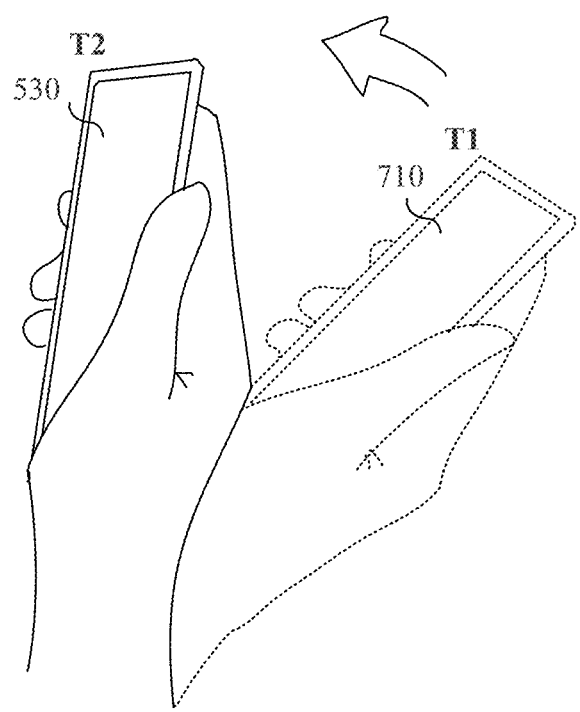

The first operation may be any one or more user operations in FIG. 5A to FIG. 5D, or may be any one or more user operations in FIG. 7A to FIG. 7C. For detailed content, refer to the embodiment shown in FIG. 5A to FIG. 5D or FIG. 7A to FIG. 7C. Details are not described herein again.

S202: The first electronic device displays a first interface in response to the first operation, where the first interface includes a preview image captured by the camera, and the preview image includes a second electronic device.

The first interface may be the foregoing viewfinder interface 530. The second electronic device may be, for example, the electronic device 201 corresponding to the device image 532 in FIG. 5G.

S203: The first electronic device obtains first location information of the second electronic device relative to the first electronic device.

S204: The first electronic device determines a display location of a first label in the preview image based on the first location information and a display area of the second electronic device in the preview image, and displays the first label at the display location, where the first label is used to identify the second electronic device.

The second electronic device may be, for example, the electronic device 201 corresponding to the device image 532 in FIG. 5G, and the first label may be, for example, the device icon 5321.

S205: The first electronic device receives a second operation for the first label. The second operation may be a user operation for the device icon 5321 in FIG. 5G.

S206: The first electronic device displays a second interface in response to the second operation, where the second interface includes one or more controls for controlling the second electronic device. The second interface may be the display interface in FIG. 5H. The second interface may be superimposed on the first interface for display, or the electronic device may jump from the first interface to display the second interface. In this disclosure, a correspondence between the first label and the second electronic device is presented in real time in an augmented reality display manner, and interaction between the first electronic device and the second electronic device is implemented by using the first label, thereby implementing coordination control between a plurality of devices, and improving user experience.

In some possible implementations, that the first electronic device obtains first location information of the second electronic device relative to the first electronic device further includes the following. The first electronic device broadcasts a detection request, where the detection request includes an identity of the first electronic device, and the first electronic device determines the first location information of the second electronic device and the first electronic device based on a detection response when the first electronic device receives the detection response sent by the second electronic device based on the detection request, where the detection response includes an identity of the second electronic device. In this manner, the first location information includes a relative location of the second electronic device relative to the first electronic device, for example, a distance, a direction, or an angle. The first electronic device may calculate a distance between the second electronic device and the first electronic device (the distance is equal to a time difference multiplied by a propagation speed of an electromagnetic wave) based on the time difference between time of sending the detection request and time of receiving the detection response. The first electronic device calculates an angle of arrival of the detection response based on the detection response, and then may determine an orientation angle of the second electronic device relative to the first electronic device.

Optionally, the detection response includes the identity of the second electronic device and the first location information. The first electronic device determines the first location information of the second electronic device and the first electronic device based on the detection response. Further, the second electronic device calculates a relative location of the second electronic device relative to the first electronic device based on the received detection request. The detection request includes sending time. The second electronic device determines a time difference based on the sending time and time at which the second electronic device receives the detection request, to calculate the distance between the second electronic device and the first electronic device. The second electronic device calculates an angle of arrival of the detection request based on the received detection request, and then may determine the orientation angle of the second electronic device relative to the first electronic device. The second electronic device sends the detection response to the first electronic device. The detection response includes the identity of the second electronic device and the first location information.

In some possible implementations, the display location of the first label in the preview image partially or completely overlaps the display area of the second electronic device in the preview image. The first label may be displayed in the display area of the second electronic device, may be displayed at an edge of the display area of the second electronic device, or may be displayed at a location close to the display area of the second electronic device.

In some possible implementations, the method further includes the following. The first electronic device obtains second location information of a third electronic device relative to the first electronic device, the first electronic device detects that the third electronic device is not included in the preview image, and determines, based on the second location information, that the third electronic device is in a viewfinder range of the camera, and the first electronic device determines a display location of a second label in the preview image based on the second location information, where the second label is used to indicate one or more pieces of the following information: identity information of the third electronic device, an obstruction of the third electronic device, and the second location information. In this manner, when the first electronic device detects that a relative location of the third electronic device is in the viewfinder range of the camera, but the preview image does not include an image of the third electronic device, the first electronic device determines that the third electronic device is blocked, and outputs the second label of the third electronic device, to indicate one or more of the identity information of the third electronic device, the obstruction, and a blocked location in the preview interface.

The second label may be, for example, the icon 803 in FIG. 8C, the image of the third electronic device is not in the first interface, and the third electronic device is blocked by the device image 533.

In some possible implementations, the method further includes the following. The first electronic device detects that the third electronic device is not included in the preview image, and determines, based on the second location information, that the third electronic device is not in the viewfinder range of the camera, and the first electronic device determines a display location of a third label in the preview image based on the second location information, where the third label is used to indicate one or more pieces of the following information: the identity information of the third electronic device and the second location information. In this manner, when the first electronic device detects that the relative location of the third electronic device is outside the viewfinder range of the camera, and the preview image does not include the image of the third electronic device, the first electronic device determines that the third electronic device is not in a viewfinder frame, and outputs the second label of the third electronic device, to indicate one or more of the identity information of the third electronic device and a relative location (a direction, an angle, a distance, or the like) relative to the first electronic device.

The third label may be, for example, the icon 802 in FIG. 8B, the image of the third electronic device is not in the first interface, and the third electronic device is outside a viewfinder range of the camera.

In some possible implementations, the preview image includes an image of a fourth electronic device, and after that the first electronic device displays a first interface, the method further includes the following. The first electronic device determines, based on the preview image, that a device type of the fourth electronic device is a first type, the first electronic device determines, in an electronic device associated with or bound to an account of the first electronic device, a first target device whose device type is the first type, and the first electronic device displays a fourth label, where the fourth label is used to indicate that the image of the fourth electronic device is associated with the first target device. In this manner, when the first electronic device cannot detect location information of the fourth electronic device, and the image of the fourth electronic device is in the preview image, the first electronic device identifies the device type of the fourth electronic device according to the image recognition technology, and detects whether a target device of the device type exists in devices that log in to a same account (for example, a HUAWEI account) as the first electronic device. If yes, the first electronic device considers that the target device is the fourth electronic device, and the first electronic device outputs the fourth label that identifies the target device.

The third label may be, for example, the icon 805 in FIG. 8D, the image of the fourth electronic device is in the first interface, and the first electronic device cannot position a location of the fourth electronic device.

In some possible implementations, the preview image includes an image of a fifth electronic device, and after that the first electronic device displays a first interface, the method further includes the following. The first electronic device determines, based on the preview image, that a device type of the fifth electronic device is a second type, the first electronic device obtains third location information of the first electronic device, where the first electronic device stores a correspondence between an electronic device and location information, the first electronic device determines, based on the correspondence and the third location information, a second target device whose device type is the first type, where location information of the target device is the same as the third location information, and the first electronic device displays a fifth label, where the fifth label is used to indicate that the image of the fifth electronic device is associated with the second target device. In this manner, when the first electronic device cannot detect location information of the fifth electronic device, and the image of the fifth electronic device is in the preview image, because the first electronic device stores a correspondence between an electronic device and location information (for example, a smart sound box and a living room, a smart desk lamp and a bedroom, a computer and a company, or the like), the first electronic device identifies a device type of the fifth electronic device according to the image recognition technology based on a current geographical location of the first electronic device, and then detects whether a target device of the device type exists in devices that are at a same geographical location as the first electronic device. If yes, the first electronic device considers that the target device is the fifth electronic device, and the first electronic device outputs the fifth label that identifies the target device.

In some possible implementations, the first user interface further includes a first icon, the first icon is associated with to-be-shared data, and the method further includes the following. The first electronic device receives a third operation, where the third operation is an operation for the first label and/or the first icon, and the first electronic device sends the to-be-shared data to the second electronic device in response to the third operation. The third operation includes but is not limited to a drag operation, a tap operation, or the like. A data sharing manner is provided, the second electronic device that needs to be shared is selected in the first interface, and the to-be-shared data is sent to the second electronic device. This simplifies user operations for data sharing, intuitively displays device information, and improves user experience.

For example, the first icon may be the icon 902 or the icon 903 in FIG. 9B, or the first icon may be the thumbnail 1111 in FIG. 11D, or the first icon may be a picture 1205 in FIG. 12B.

In some possible implementations, before that the first electronic device receives a third operation, the method further includes the following. The first electronic device displays the first label in a first display form in the first interface based on data type of the to-be-shared data. The first label in the first display form is used to prompt a user that the second electronic device supports output of the to-be-shared data. The first display form may be highlighting (changing brightness, a color, or the like) a display area of the first label. The first display form may be, for example, the display form of the device icon 5311, the device icon 5331, and the device icon 5341 in FIG. 10C.

In some possible implementations, the preview image includes an image of a third electronic device and a third label, the third label is associated with the third electronic device, and the method further includes the following. The first electronic device receives a fourth operation, where the fourth operation is an operation for the first label and/or a third icon, and the first electronic device outputs a prompt message in response to the fourth operation, where the prompt message is used to prompt a user that the third electronic device does not support output of the to-be-shared data. The prompt message may be, for example, the information displayed in the prompt box 1100 in FIG. 10B.

In embodiments of this disclosure, the first electronic device receives the first operation, displays the first interface, starts the camera, and displays, in the first interface in real time, an image captured by the camera. The first electronic device identifies, according to an image recognition technology, an electronic device in the image and a device type (for example, a sound box, a computer, or a tablet computer) of the electronic device, for example, the second electronic device. In addition, the first electronic device obtains location information of the second electronic device relative to the first electronic device according to a wireless positioning technology (for example, UWB positioning, BLUETOOTH positioning, WI-FI positioning, or the like), where the location information includes one or more of a distance, a direction, or an angle. The first electronic device determines the display location of the first label of the second electronic device in the preview image based on the location information, where the first label is used to identify the second electronic device, for example, identify a device name or a device type of the second electronic device, and the display location of the first label is related to a display location of the second electronic device. When the first electronic device detects a user operation for the first label, the first electronic device outputs the second interface, where the second interface includes the one or more controls for controlling the second electronic device, and the second interface may be superimposed on the first interface for display, or the electronic device may jump from the first interface to display the second interface. In this disclosure, a correspondence between the first label and the second electronic device is presented in real time in an augmented reality display manner, and interaction between the first electronic device and the second electronic device is implemented by using the first label, thereby implementing coordination control between a plurality of devices, and improving user experience.

In embodiments of this disclosure, a software system of the electronic device (for example, the electronic device 100) may use a layered architecture, an event-driven architecture, a microkernel architecture, a microservice architecture, or a cloud architecture. In embodiments of this disclosure, an ANDROID system with a layered architecture is used as an example to describe a software structure of the electronic device 100. The ANDROID system is merely a system example of the electronic device 100 in embodiments of this disclosure. This disclosure may be further applicable to another type of operating system, such as IOS, WINDOWS, and HarmonyOS. This is not limited in this disclosure. The following uses only the ANDROID system as an example of the operating system of the electronic device 100.

Figure 23:
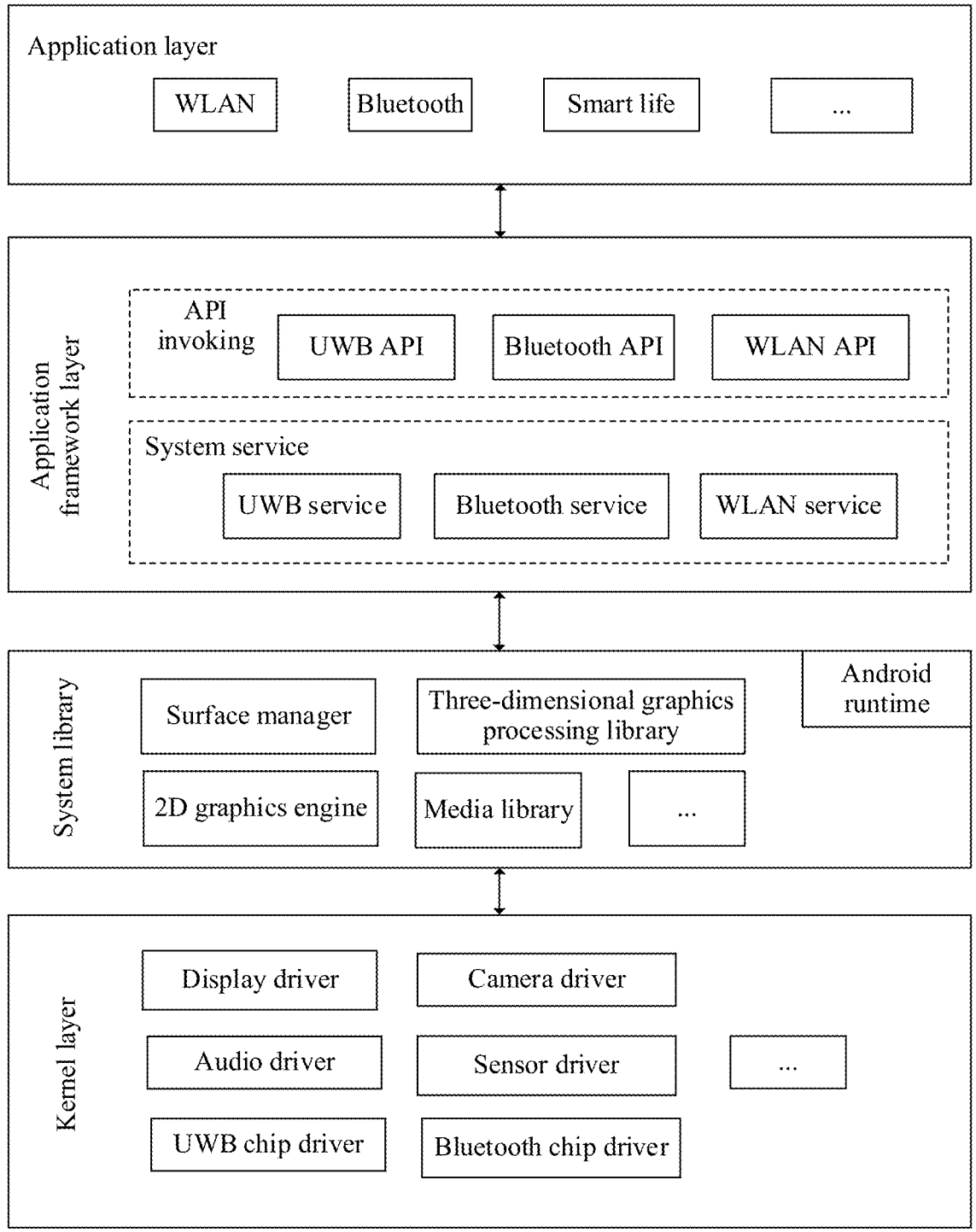
FIG. 23 is a schematic diagram of a software architecture according to an embodiment of this disclosure.

FIG. 23 is a block diagram of an example of a software structure of an electronic device according to an embodiment of this disclosure. The electronic device may determine an orientation parameter (for example, a distance, a signal AOA, and an RRSI) of a nearby device by using a UWB positioning technology, determine a display location of an image of the nearby device in a viewfinder interface based on orientation parameters of a plurality of nearby devices, display a device icon of the nearby device, and trigger the device icon, so as to implement interaction between the electronic device and the nearby device. The electronic device may establish a wireless communication connection to the target device by using one or more wireless communication protocols of UWB, BLUETOOTH, WLAN, and infrared, to transmit data.

As shown in FIG. 23, software is divided into several layers by using a layered architecture, and each layer has a clear role and task. Layers communicate with each other by using a software interface. In some embodiments, the ANDROID system is divided into an application layer, an application framework layer, a protocol stack, and a kernel layer from top to bottom.

The application layer includes a series of application packages, such as smart life, BLUETOOTH, and WLAN, and may further include applications such as a camera, a gallery, a call, music, and a video.

The smart life app is a software program that can select and control various smart home devices in a home, and is installed on an electronic device used by a user. The smart life app may be an application installed before delivery of the electronic device, or may be an application downloaded from a network or obtained from another device by the user in a process of using the electronic device.

The application framework layer provides an application programming interface (API) and a programming framework for an application at the application layer. The application framework layer includes some predefined functions.

As shown in FIG. 23, the application framework layer may mainly include an API and a system service. The API is used to implement communication between the application layer and the protocol stack, the HAL, or the kernel layer. For example, communication between "smart life" and the kernel layer may be provided. The API may include one or more of a UWB API, a BLUETOOTH API, a WLAN API, and an infrared API. Correspondingly, the system service may include one or more of a UWB service, a BLUETOOTH service, a WLAN service, and an infrared service. The electronic device 100 may invoke the corresponding system service by invoking one or more of the UWB API, the BLUETOOTH API, the WLAN API, and the infrared API, to detect an orientation parameter of a device near the electronic device 100. Alternatively, the corresponding system service may be invoked by invoking one or more of the UWB API, the BLUETOOTH API, the WLAN API, and the infrared API, to establish a wireless communication connection to a nearby device and transmit data.

The UWB service may further include one or more services, for example, a UWB positioning service. The UWB positioning service may include orientation parameter measurement, where the orientation parameter measurement includes one or more of distance measurement, AOA measurement, and RRSI measurement. For example, the electronic device 100 invokes the UWB positioning service by using the UWB API, to detect the orientation parameter of the device near the electronic device 100.

The ANDROID runtime includes a kernel library and a virtual machine. The ANDROID runtime is responsible for scheduling and management of the ANDROID system.

The kernel library includes two parts: a performance function that needs to be invoked by the JAVA language, and an ANDROID kernel library.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a 3D graphics processing library (for example, OpenGL for embedded systems (ES)), and a two-dimensional (2D) graphics engine (for example, a Skia Graphics Library (SGL)).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, such as MPEG-4 Part 10 Advanced Video Coding (MPEG-4 AVC/H.264), MPEG-1 Audio Layer III or MPEG-2 Audio Layer III (MP3), Advanced Audio Coding (AAC), Adaptive Multi-Rate (AMR), Joint Photographic Experts Group (JPEG/JPG), and Portable Network Graphics (PNG).

The 3D graphics processing library is configured to implement 3D graphics drawing, image rendering, composition, layer processing, and the like.

The 2D graphics engine is a drawing engine for 2D drawing.

The kernel layer is a layer between hardware and software. The kernel layer may include one or more of a UWB chip driver, a BLUETOOTH chip driver, and a WLAN driver, and may further include a display driver, a camera driver, an audio driver, a sensor driver, and the like. The kernel layer is configured to perform a corresponding operation in response to a function invoked by the system service in the application framework layer. For example, in response to the UWB measurement instruction sent by the UWB positioning service by invoking the UWB protocol stack, the UWB chip driver sends a UWB measurement request by using a hardware device (for example, a UWB chip).

In an example of this disclosure, the software structure framework may be on the electronic device 100, or may be on the electronic device 201, the electronic device 202, the electronic device 203, or the electronic device 204.

The following uses the device identification scenario in the embodiment as an example to describe working procedures of software and hardware of the electronic device 100.

The acceleration sensor and/or the gyroscope sensor detect/detects an uplift operation (for example, FIG. 7C), and a corresponding hardware interrupt is sent to the kernel layer. The kernel layer processes the tap operation into an original input event. The original input event is stored at the kernel layer. The application framework layer obtains the original input event from the kernel layer, and identifies that the input event is a pairing and connection to the electronic device (for example, the electronic device 201). A smart life application invokes the UWB API at the application framework layer to start the UWB positioning service. The UWB positioning service sends a UWB measurement instruction to a UWB HAL interface at the HAL by invoking the UWB protocol stack. The UWB HAL sends a UWB measurement request to the kernel. The kernel layer drives, according to the UWB measurement request, the UWB chip to broadcast the measurement request (for example, a first measurement request) by invoking the UWB chip driver, and records a timestamp of sending the UWB measurement request by using the UWB time management module.

In some embodiments, after determining the target device, the UWB service at the application framework layer sends a connection request to the kernel layer by invoking the UWB protocol stack. The UWB chip at the kernel layer drives the UWB chip to send the connection request to the electronic device 201, to request to establish a UWB communication connection and transmit data. Optionally, the UWB service at the application framework layer may further invoke a BLUETOOTH service, a WLAN service, or an infrared service, to send the connection request to the electronic device 201. For example, the UWB service starts the BLUETOOTH service, and invokes a BLUETOOTH protocol stack by using the BLUETOOTH service, to send the first connection request to the kernel layer. The BLUETOOTH chip at the kernel layer drives the BLUETOOTH chip to send the connection request to the electronic device 201, to request to establish a BLUETOOTH communication connection and transmit data.

When an integrated unit is used, the electronic device 100 may include a processing module, a storage module, and a communications module. The processing module may be configured to control and manage actions of the electronic device, for example, may be configured to support the electronic device in performing the steps performed by the display unit, the detection unit, and the processing unit. The storage module may be configured to support the electronic device to store program code, data, and the like. The communications module may be configured to support communications between the electronic device and another device.

The processing module may be a processor or a controller, and may implement or execute various example logical blocks, modules, and circuits described with reference to content disclosed in this disclosure. The processor may be alternatively a combination for implementing a computing function, for example, a combination including one or more microprocessors or a combination of a digital signal processor (DSP) and a microprocessor. The storage module may be a memory. The communications module may be a device that interacts with another electronic device, such as a radio frequency circuit, a BLUETOOTH chip, or a WI-FI chip.

In an embodiment, when the processing module is a processor and the storage module is a memory, the electronic device in this embodiment may be a device having the structure shown in FIG. 2.

An embodiment further provides a computer-readable storage medium. The computer-readable storage medium stores computer instructions. When the computer instructions are run on an electronic device, the electronic device is enabled to perform the related method steps, to implement the photo sharing method in the foregoing embodiments.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to embodiments of this disclosure are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DIGITAL VIDEO DISC (DVD)), a semiconductor medium (for example, a solid-state drive), or the like.

A person of ordinary skill in the art may understand that all or some of the procedures of the methods in the embodiments may be implemented by a computer program instructing related hardware. The program may be stored in the computer-readable storage medium. When the program is executed, the procedures in the method embodiments may be included. The foregoing storage medium includes any medium that can store program code, such as a read-only memory (ROM), a RAM, a magnetic disk, or an optical disc.

What is claimed is:

1. A method implemented by a first electronic device, wherein the method comprises:
   receiving a first operation;
   capturing, by a camera of the first electronic device, a preview image, wherein the preview image comprises an image of a second electronic device;
   displaying a first interface in response to the first operation, wherein the first interface comprises the preview image;
   obtaining first location information of the second electronic device relative to the first electronic device;
   receiving a second operation;
   determining, based on the first location information and a display area of the second electronic device in the preview image, that the second operation is related to the second electronic device; and
   displaying a second interface in response to the second operation,
   wherein the second interface comprises one or more controls for controlling the second electronic device.

2. The method according to of claim 1, wherein obtaining the first location information comprises:
   broadcasting a detection request comprising a first identity of the first electronic device;
   receiving a detection response from the second electronic device based on the detection request, wherein the detection response comprises a second identity of the second electronic device; and
   determining the first location information based on the detection response.

3. The method of claim 1, further comprising:
   determining a display location of a first label in the preview image based on the first location information and the display area, wherein the first label identifies the second electronic device;
displaying the first label at the display location; and
further determining, based on a touching of the first label, that the second operation is related to the second electronic device.

4. The method of claim 3, wherein the display location partially or completely overlaps the display area.

5. The method of claim 1, further comprising:
obtaining, second location information of a third electronic device relative to the first electronic device;
detecting that the third electronic device is not represented in the preview image;
determining, based on the second location information and in response to detecting that the third electronic device is not represented in the preview image, that the third electronic device is in a viewfinder range of the camera; and
determining a first display location of a first label in the preview image based on the second location information, wherein the first label indicates one or more of identity information of the third electronic device, an obstruction of the third electronic device, or the second location information.

6. The method of claim 5, further comprising:
determining, based on the second location information and in response to detecting that the third electronic device is not represented in the preview image, that the third electronic device is not in the viewfinder range; and
determining a second display location of a second label in the preview image based on the second location information, wherein the second label indicates one or more of the identity information or the second location information.

7. The method of claim 1, wherein the preview image comprises an image of a third electronic device, and wherein after a displaying the first interface, the method further comprises:
determining, based on the preview image, that a device type of the third electronic device is a first type;
determining, in a fourth electronic device associated with or bound to an account of the first electronic device, a target device of the first type; and
displaying a label indicating that the image of the fourth electronic device is associated with the target device.

8. The method of claim 1, wherein the preview image comprises an image of a third electronic device, and wherein after a displaying the first interface, the method further comprises:
determining, based on the preview image, that a device type of the third electronic device is a second first type;
obtaining second location information of the first electronic device using a correspondence that is between an electronic device and location information and that is stored in the first electronic device;
determining, based on the correspondence and the second location information, a target device of the first type, wherein third location information of the target device is the same as the second location information; and
displaying a label indicating that the image is associated with the target device.

9. The method of claim 3, wherein the first interface further comprises a first icon associated with to-be-shared data, and wherein the method further comprises:
receiving a third operation for the first label or the first icon; and
sending the to-be-shared data to the second electronic device in response to the third operation.

10. The method of claim 9, wherein before receiving the third operation, the method further comprises: displaying the first label in a first display form in the first interface based on data type of the to-be-shared data, and wherein the first label in the first display form prompts a user that the second electronic device supports output of the to-be-shared data.

11. The method of claim 9, wherein the preview image comprises an image of a third electronic device and a second label, wherein the second label is associated with the third electronic device, and wherein the method further comprises:
receiving a fourth operation for the second label or the first icon; and
outputting a prompt message in response to the fourth operation, wherein the prompt message prompts a user that the third electronic device does not support output of the to-be-shared data.

12. An electronic device comprising:
camera configured to capture a preview image, wherein the preview image comprises an image of a first target device; and
a processor coupled to the camera and configured to:
receive a first operation;
display a first interface in response to the first operation, wherein the first interface comprises the preview image;
obtain first relative location information between the electronic device and the first target device;
receive a second operation;
determine based on the first relative location information and a display area of the first target device, that the second operation is related to the first target device; and
display a second interface in response to the second operation,
wherein the second interface comprises one or more controls for controlling the first target device.

13. The electronic device of claim 12, wherein the processor is further configured to:
broadcast a detection request comprising a first identity of the electronic device;
receive a detection response from the first target device based on the detection request, wherein the detection response comprises a second identity of the first target device; and
determine the first relative location information based on the detection response.

14. The electronic device of claim 12, wherein the processor is further configured to:
determine a display location of a first label in the preview image based on the first relative location information and the display area, wherein the first label identifies the first target device;
display the first label at the display location; and
further determine, based on a touching of the first label, that the second operation is related to the first target device.

15. The electronic device of claim 14, wherein the display location partially or completely overlaps the display area.

16. The electronic device of claim 14, wherein the first interface further comprises an icon associated with to-be-shared data, and wherein the processor is further configured to:
receive a third operation for the first label or the icon; and send the to-be-shared data to the first target device in response to the third operation.

17. The electronic device of claim 12, wherein the camera comprises a viewfinder range, and wherein the processor is further configured to:
   obtain second relative location information of a second target device;
   detect that the second target device is not represented in the preview image;
   determine, based on the second relative location information and in response to detecting that the second target device is not represented in the preview image, that the second target device is in the viewfinder range; and
   determine a first display location of a first label in the preview image based on the second relative location information, wherein the first label indicates one or more of identity information of the second target device, an obstruction of the second target device, or the second relative location information.

18. The electronic device of claim 17, wherein the processor is further configured to:
   determine, based on the second relative location information and in response to detecting that the second target device is not represented in the preview image, that the second target device is not in the viewfinder range; and
   determine a second display location of a second label in the preview image based on the second relative location information, wherein the second label indicates one or more of the identity information or the second relative location information.

19. The electronic device of claim 12, wherein the preview image comprises an image of a third target device, and wherein after displaying the first interface, the processor is further configured to:
   determine, based on the preview image, that a device type of the third target device is a first type;
   determine, in a fourth target device associated with or bound to an account of the electronic device, identity information of a device of the first type; and
   display a label indicating that the image is associated with the identity information.

20. The electronic device of claim 12, wherein the preview image comprises an image of a second target device, and wherein the processor is further configured to:
   determine, based on the preview image, that a device type of the second target device is a first type;
   obtain first location information of the electronic device using a correspondence between a second electronic device and second location information;
   determine, based on the correspondence and the first location information, identity information of a device of the first type; and
   display a label indicating that the image is associated with the identity information.

* * * * *

UNITED STATES PATENT AND TRADEMARK OFFICE
CERTIFICATE OF CORRECTION

PATENT NO. : 12,170,836 B2
APPLICATION NO. : 18/164170
DATED : December 17, 2024
INVENTOR(S) : Jie Xu et al.

Page 1 of 1

It is certified that error appears in the above-identified patent and that said Letters Patent is hereby corrected as shown below:

In the Claims

Claim 10, Column 78, Line 4: "further comprises: displaying the" should read "further comprises displaying the"

Signed and Sealed this
Twenty-eighth Day of January, 2025

Coke Morgan Stewart
*Acting Director of the United States Patent and Trademark Office*